(12) United States Patent
Zhang et al.

(10) Patent No.: US 12,691,444 B2
(45) Date of Patent: Jul. 28, 2026

(54) WATER SOFTENING DEVICE

(71) Applicants: FOSHAN MIDEA CHUNGHO WATER PURIFICATION EQUIPMENT CO., LTD., Foshan (CN); MIDEA GROUP CO., LTD., Foshan (CN)

(72) Inventors: Bo Zhang, Foshan (CN); Pu Qing, Foshan (CN); Zhipeng Hao, Foshan (CN); Chenghuan Hu, Foshan (CN); Ziming Gong, Foshan (CN); Rensheng Huang, Foshan (CN); Yuedong Zheng, Foshan (CN); Yumin Liao, Foshan (CN)

(73) Assignees: FOSHAN MIDEA CHUNGHO WATER PURIFICATION EQUIPMENT CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 374 days.

(21) Appl. No.: 18/564,603

(22) PCT Filed: Apr. 13, 2023

(86) PCT No.: PCT/CN2023/088192
§ 371 (c)(1),
(2) Date: Nov. 27, 2023

(87) PCT Pub. No.: WO2023/231603
PCT Pub. Date: Dec. 7, 2023

(65) Prior Publication Data
US 2025/0083138 A1 Mar. 13, 2025

(30) Foreign Application Priority Data
May 30, 2022 (CN) .......................... 202210605793.4

(51) Int. Cl.
*B01J 49/75* (2017.01)
*C02F 1/42* (2023.01)

(52) U.S. Cl.
CPC ................. *B01J 49/75* (2017.01); *C02F 1/42* (2013.01); *C02F 2201/004* (2013.01);
(Continued)

(58) Field of Classification Search
CPC ....... B01J 49/75; C02F 1/42; C02F 2201/004; C02F 2201/007; C02F 2303/16; C02F 2303/22; C02F 2001/425
(Continued)

(56) References Cited

FOREIGN PATENT DOCUMENTS

| CN | 108286166 A | 7/2018 |
| CN | 211595102 U | 9/2020 |
| | (Continued) | |

OTHER PUBLICATIONS

First office action received in the priority Chinese application 202210605793.4, mailed on Mar. 1, 2023.
(Continued)

*Primary Examiner* — Hayden Brewster
(74) *Attorney, Agent, or Firm* — K&L Gates LLP

(57) ABSTRACT

The present disclosure provides a water softening device. The water softening device includes a box body, an inner frame assembly, a top cover assembly, a regeneration assembly and a water softening assembly. A first accommodating chamber is formed inside the box body, a box opening communicating with the first accommodating chamber is formed at a top of the box body, the inner frame assembly is provided at the box opening of the box body; the top cover assembly is provided on an upper part of the inner frame assembly and connected to the inner frame assembly; the regeneration assembly is provided inside the first accommodating chamber and is detachably connected to the top (Continued)

cover assembly; and the water softening assembly is provided inside the first accommodating chamber and detachably connected to the inner frame assembly.

12 Claims, 38 Drawing Sheets

(52) U.S. Cl.
CPC .... *C02F 2201/007* (2013.01); *C02F 2303/16* (2013.01); *C02F 2303/22* (2013.01)

(58) Field of Classification Search
USPC ........................................................ 210/190
See application file for complete search history.

(56) References Cited

FOREIGN PATENT DOCUMENTS

| | | | |
|---|---|---|---|
| CN | 112374575 | A | 2/2021 |
| CN | 213037505 | U | 4/2021 |
| CN | 213865496 | U | 8/2021 |
| CN | 114940529 | A | 8/2022 |
| CN | 114988521 | A | 9/2022 |
| CN | 114988522 | A | 9/2022 |
| CN | 115072833 | A | 9/2022 |
| CN | 217458921 | U | 9/2022 |
| CN | 217458922 | U | 9/2022 |
| CN | 217458923 | U | 9/2022 |
| CN | 217458924 | U | 9/2022 |
| CN | 217458927 | U | 9/2022 |
| CN | 217458929 | U | 9/2022 |
| CN | 115504540 | A | 12/2022 |
| CN | 115676970 | A | 2/2023 |
| JP | 2012170922 | A | 9/2012 |
| WO | 2019228398 | A1 | 12/2019 |

OTHER PUBLICATIONS

International search report received in the priority international application PCT/CN2023/088192, mailed Jul. 14, 2023.
Extended European Search Report received in 23806167.5; mailed Jul. 26, 2024.

110

501
530

500

WATER SOFTENING DEVICE

CROSS-REFERENCE TO RELATED APPLICATION

The present disclosure is a national phase of international application PCT/CN2023/088192, filed on Apr. 13, 2023, which claims priority to Chinese patent application No. 202210605793.4 filed on May 30, 2022, entitled "Water Softening Device", which is hereby incorporated by reference in its entirety.

FIELD

The present disclosure relates to the field of water softening technologies, in particular to a water softening device.

BACKGROUND

With the continuous improvement of people's living levels, various water softening products are constantly emerging. Due to the influence of a top cover assembly, the installation and disassembly of internal components of a water softening product will be affected during the installation and maintenance of the water softening product in the related art, resulting in inconvenience in installation and maintenance of the water softening product.

SUMMARY

The present disclosure aims to address at least one of the problems in the related art. Therefore, the present disclosure provides a top cover assembly that effectively overcomes the inconvenience in installation and maintenance of a water softening product.

A water softening device according to the present disclosure includes:

a box body, where a first accommodating chamber is formed inside the box body, and a box opening communicating with the first accommodating chamber is formed at a top of the box body;

an inner frame assembly, provided at the box opening of the box body;

a top cover assembly, provided on an upper part of the inner frame assembly and connected to the inner frame assembly;

a regeneration assembly, provided inside the first accommodating chamber and detachably connected to the top cover assembly; and a water softening assembly, provided inside the first accommodating chamber and detachably connected to the inner frame assembly.

The water softening device according to the embodiment of the present disclosure is assembled modularly. During installation, the regeneration assembly is placed in the first accommodating chamber and detachably connected to the top cover assembly, and the water softening assembly is placed in the first accommodating chamber and detachably connected to the inner frame assembly, an assembly of the water softening device is simplified with advantages of easy installation and disassembly, as well as high production efficiency.

According to an embodiment of the present disclosure, the top cover assembly includes:

a first frame body, provided with a first opening and a second opening;

a first top cover component, where the first top cover component is connected to the first frame body through a flexible member, and is switchable between an open state and a closed state; and a second top cover component, where the second top cover component is connected to the first frame body and covers the second opening, where in the closed state, the first top cover component covers the first opening; and in the open state, the first top cover component is located above the second top cover component, and an included angle between the first top cover component and the second top cover component is less than a predetermined angle.

According to an embodiment of the present disclosure, the flexible member is detachably connected to at least one of the first frame body and the first top cover component.

According to an embodiment of the present disclosure, the top cover assembly further includes:

an ejector rod component, provided on the first frame body, where the ejector rod component is switchable between a stretched state and a retracted state, where in the retracted state, the first top cover component covers the first opening; and in the stretched state, the ejector rod component abuts against the first top cover component, and an opening gap exists between an opening side of the first top cover component and the first frame body.

According to an embodiment of the present disclosure, the top cover assembly further includes:

a grille component, including an outer frame and circular partitions, where the outer frame is provided at the second opening, the circular partitions are sequentially provided from inside to outside at intervals, the outer frame is annularly provided outside the circular partitions, and passages through which salt particles pass are formed between each adjacent two circular partitions, as well as between the outer frame and an outermost circular partition.

According to an embodiment of the present disclosure, each of the passages is provided with spokes, each adjacent two circular partitions are connected through the spokes and the outer frame is connected to an outermost circular partition through the spokes, and the spokes in each of the passages are uniformly spaced around a circumference of the circular partition.

According to an embodiment of the present disclosure, an upper surface of the top cover assembly is inclined downwards in a first direction.

According to an embodiment of the present disclosure, the second top cover component is connected to the first frame body through a crank arm component, and a flip angle of the second top cover component relative to the first frame body is greater than 90°.

According to an embodiment of the present disclosure, the regeneration assembly is connected to the first frame body through a salt well mounting component.

According to an embodiment of the present disclosure, the salt well mounting component includes:

a clamp;

a connecting arm, connected to a side of the clamp, where an axial direction of the clamp is parallel to a length direction of the connecting arm, and the connecting arm is connected to the first frame body; and a limit member, provided on the connecting arm, where the clamp surrounds outside the regeneration assembly, and the limit member is used to limit a movement of the regeneration assembly towards an end of the connecting arm.

According to an embodiment of the present disclosure, the limit member has an adjustable position in a length direction of the connecting arm.

According to an embodiment of the present disclosure, the limit member includes a limit block and a bolt, the limit block is movable along the length direction of the connecting arm, and the bolt is connected to the limit block and abuts against the connecting arm.

According to an embodiment of the present disclosure, the inner frame assembly includes an inner frame body and a flexible fixing disc, where the inner frame body is detachably connected to the box opening of the box body and the top cover assembly, respectively; the inner frame body is provided with a third opening communicating with a receiving cavity, and the flexible fixing disc is provided at the third opening and detachably connected to the inner frame body; and the flexible fixing disc is sleeved on the water softening assembly.

According to an embodiment of the present disclosure, the flexible fixing disc is provided with a central hole and notches, where the water softening assembly includes a resin tank, and an upper end of the resin tank is sleeved on the central hole, the notches are provided along a circumference of the central hole, and opening ends of the notches are formed on a wall of the central hole.

The above one or more of the embodiments of the present disclosure have at least one of the following effects.

The water softening device according to the embodiment of the present disclosure is assembled modularly. During installation, the regeneration assembly is placed in the first accommodating chamber and detachably connected to the top cover assembly, and the water softening assembly is placed in the first accommodating chamber and detachably connected to the inner frame assembly, an assembly of the water softening device is simplified with advantages of easy installation and disassembly, as well as high production efficiency.

Additional embodiments of the present disclosure will be set forth in part in the description which follows and, in part, will be apparent from the description, or may be learned by practice of the presented disclosure.

BRIEF DESCRIPTION OF THE DRAWINGS

In order to provide a clearer explanation of the embodiments, a brief description will be given to the accompanying drawings required in the embodiments. It is evident that the accompanying drawings in the following description are only some embodiments of the present disclosure.

REFERENCE NUMERALS

Figure 1:
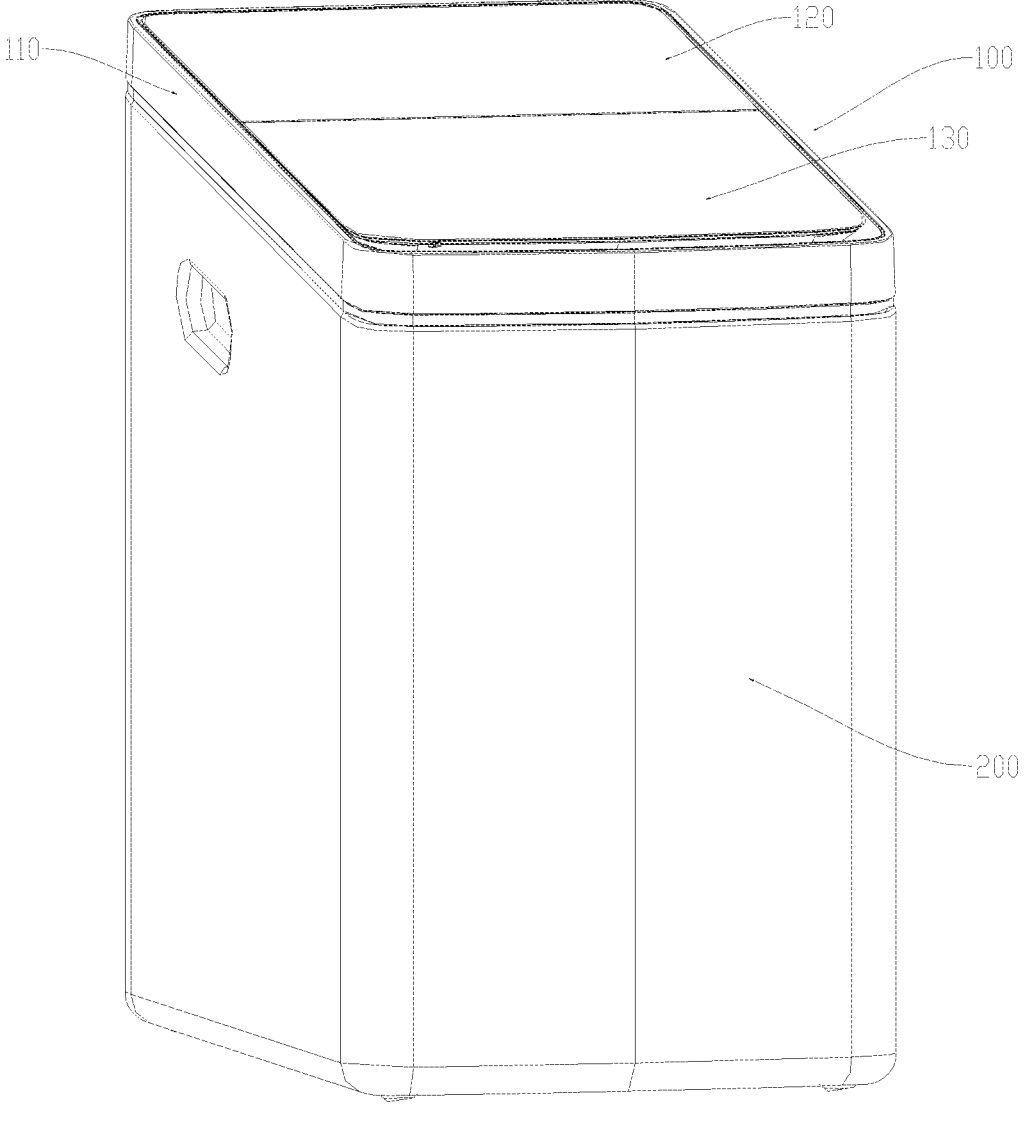
FIG. 1 is a three-dimensional schematic structural diagram of a water softening device according to an embodiment of the present disclosure.

100: top cover assembly; 110: first frame body; 111: step; 112: flexible member; 113: snap slot; 114: limit block; 120: first top cover component; 122: first housing; 123: second housing; 125: positioner; 126: first sealing portion; 127: second sealing portion; 128: third sealing portion; 129: first sealing surface; 130: second top cover component; 131: second sealing surface; 132: third sealing surface; 133: light-transmitting panel; 134: raised edge; 135: groove; 140: ejector rod component; 141: first elastic member; 142: ejector rod; 143: mounting hole limit portion; 144: ejector rod limit portion; 145: chute; 146: strip-shaped separation slot; 147: first positioning post; 150: locking component; 151: button; 152: button limit portion; 153: second elastic member; 154: second snap tongue; 160: first limit portion; 161: second limit portion; 162: third limit portion; 163: fourth limit portion; 164: crank arm; 165: long-arm segment; 166: short-arm segment; 167: stop portion; 168: damping shaft; 169: fixing seat; 200: box body; 300: inner frame assembly; 310: inner frame body; 311: first snap slot; 312: first snap tongue; 313: second snap slot; 314: second snap tongue; 315: partition; 320: flexible fixing disc; 321: first positioning hole; 322: first plug; 323: central hole; 324: first notch; 325: fixing chute; 326: electric control box; 327: salt level sensor; 328: snap seat; 400: water softening assembly; 401: resin tank; 500: salt well; 600: control assembly; 501: salt well mounting component; 101: first accommodating chamber; 102: second accommodating chamber; 11*a*: first side; 11*b*: second side; 1101: second opening; 1102: first opening; 1103: circular concave surface; 1104: circular limit plate; 1141: first stop segment; 1142: second stop segment; 1105: crank arm slot; 1151: first slot wall; 1152: second slot wall; 1106: flow guide slot; 1107: guide slot; 1120: flow guide member; 1121: guide plate; 1211: arc-shaped segment; 1122: side plate; 1133: mounting plate; 1332: snap claw; 1333: second notch; 1334: first positioning block; 1335: second positioning block; 1134: first sidewall; 1135: second sidewall; 1136: third sidewall; 170: grille component; 410: outer frame; 411: first end; 412: second end; 413: limit segment; 420: circular partition; 421: flow guide segment; 430: passage; 440: spoke; 510: clamp; 511: snap opening; 512: reinforcing rib; 520: connecting arm; 521: reverse rack; 530: limit member; 531: limit block; 5311: limit tooth; 5312: paddle; 532: bolt; 533: clamping claw; 5331: limit claw; 540: mounting structure; 541: mounting portion; 5411: first mounting hole; 542: limit portion; 550: fastener.

DETAILED DESCRIPTION

The following will provide a further detailed description for the embodiments of the present disclosure in conjunction with the accompanying drawings. The following embodiments are used to illustrate the present disclosure, but is unable to be used to limit the scope of the present disclosure.

In the description of the embodiments of the present disclosure, it should be noted that terms "center", "longitudinal", "transverse", "upper", "lower", "front", "rear", "left", "right", "vertical", "horizontal", "top", "bottom", "inside", "outside" and other indications of orientation or positional relationships are based on the orientation or positional relationships shown in the accompanying drawings, and the terms are only for the convenience of describing the embodiments of the present disclosure and simplifying the description, rather than indicating or implying that the apparatus or elements referred to must have a specific orientation, nor be constructed and operated in a specific orientation. Thus, the terms are unable to be interpreted as a limitation of the embodiments of the present disclosure. In addition, terms "first" "second" and "third" are only used for the purpose of description and is unable to be interpreted as indicating or implying relative importance.

In the description of the embodiments of the present disclosure, it should be noted that unless otherwise specified and limited, terms "connect" and "connected" should be understood broadly. For example, the terms may indicate fixedly connected, detachably connected, or integratedly connected; mechanical connected or electrically connected; directly connected or indirectly connected through intermediate media.

In the embodiments of the present disclosure, unless otherwise specified and limited, a first feature may be in direct contact with a second feature or the first and second features may be in indirect contact through intermediate media if the first feature is "above" or "below" the second feature. In one embodiment, the first feature may be directly or diagonally above the second feature, or the first feature is horizontally higher than the second feature if the first feature is "above", "on", or "on top of" the second feature. The first feature may be directly or diagonally below the second feature, or the first feature is horizontally lower than the second feature if the first feature is "under", "below", or "beneath" the second feature.

In the description of the present specification, the description of terms "an embodiment", "some embodiments", "example", "specific example", or "some examples" is to combine specific features, structures, materials, or attributes, and the specific features, structures, materials, or attributes are included in at least one embodiment or example of the embodiments of the present disclosure. In the present specification, the schematic description of the above terms does not necessarily refer to the same embodiments or examples. In one embodiment, the specific features, structures, materials, or attributes described may be combined in an appropriate manner in any one or more embodiments or examples.

Figure 2:
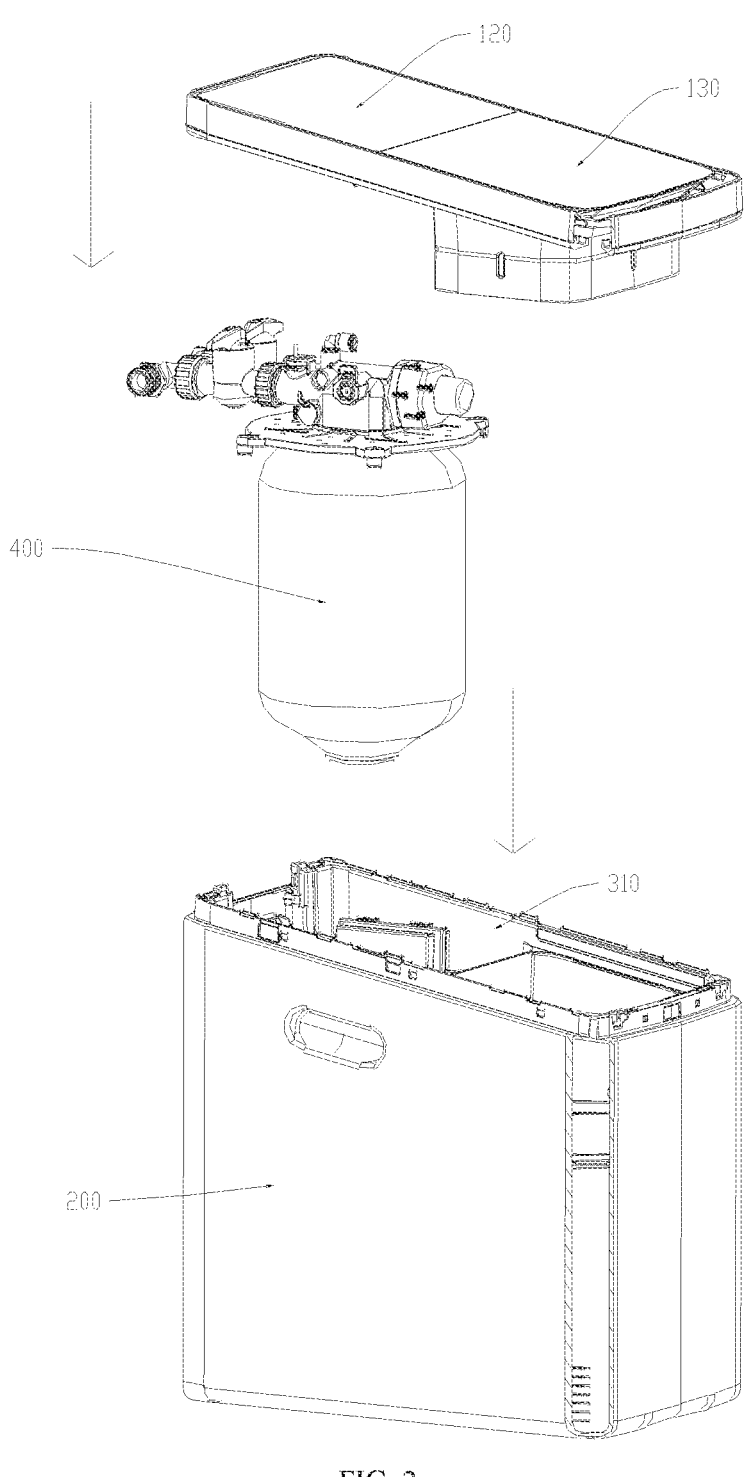
FIG. 2 is an exploded schematic structural diagram of a water softening device according to an embodiment of the present disclosure.
Figure 29:
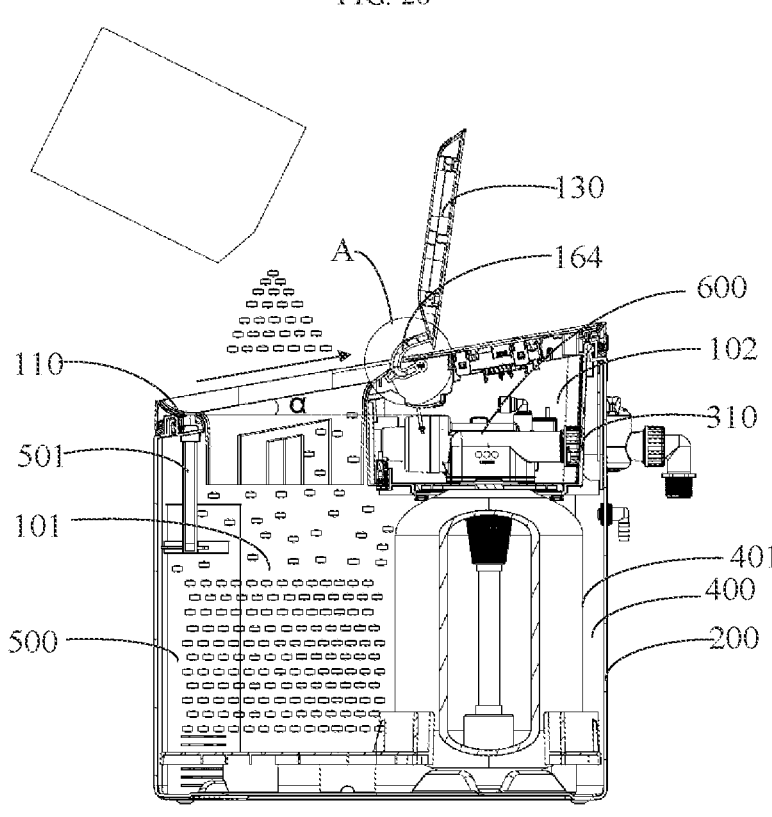
FIG. 29 is a first schematic structural diagram of a water softening device according to an embodiment of the present disclosure.

As shown in FIG. 2 and FIG. 29, a water softening device includes a box body 200, an inner frame assembly 300, a top cover assembly 100, a regeneration assembly and a water softening assembly 400. A first accommodating chamber 101 is formed inside the box body 200, and a box opening communicating with the first accommodating chamber 101 is formed at a top of the box body 200. The inner frame assembly 300 is provided at the box opening of the box body 200, and the top cover assembly 100 is provided on an upper part of the inner frame assembly 300 and connected to the inner frame assembly 300. The regeneration assembly is provided inside the first accommodating chamber 101 and detachably connected to the top cover assembly 100. The water softening assembly 400 is provided inside the first accommodating chamber 101 and detachably connected to the inner frame assembly 300.

The water softening device according to an embodiment of the present disclosure is assembled modularly. During installation, the regeneration assembly is placed in the first accommodating chamber 101 and detachably connected to the top cover assembly 100, and the water softening assembly 400 is placed in the first accommodating chamber 101 and detachably connected to the inner frame assembly 300, an assembly of the water softening device is simplified with advantages of easy installation and disassembly, as well as high production efficiency.

As shown in FIG. 1, the water softening device includes the top cover assembly 100 and the box body 200, where the box body 200 is provided with a first accommodating chamber 101, and a box opening communicating with the first accommodating chamber 101 is formed at a top of the box body 200. The top cover assembly 100 covers the box opening, and an upper surface of the top cover assembly 100 is inclined downwards.

The water softening device according to an embodiment of the present disclosure, by inclining the upper surface of the top cover assembly 100 downwards, an opening side of the top cover assembly is high and an opposite side is low. Since users and maintenance personnel stand on a lower side of the top cover assembly, this arrangement may facilitate maintenance personnel and users to view; mount and disassemble components inside the water softening device, and facilitate the installation and maintenance of the water softening device.

The top cover assembly includes a first frame body 110, a first top cover component 120 and a second top cover component 130. The first frame body 110 is provided at the box opening, the first frame body 110 is provided with a first opening and a second opening in a first direction, and the first direction is a length direction of the first frame body 110. The first top cover component 120 is connected to the first frame body 110 and covers the first opening. The second top cover component 130 is connected to the first frame body 110 and coves the second opening. An upper surface of the first top cover component 120 and an upper surface of the second top cover component 130 form an upper surface of the top cover assembly.

The upper surface of the top cover assembly 100 is inclined downwards in the first direction. Since the first opening and the second opening are provided in sequence along the first direction, when the upper surface of the top cover assembly 100 is inclined downwards along the first direction, the two openings of the top cover assembly 100 are in different heights, which facilitates installation and maintenance of the water softening device.

The upper surface of the top cover assembly 100 may be inclined downwards in the first direction as a whole or partially. For example, the upper surface of the first top cover component 120 may be inclined downwards in the first direction.

In the water softening device according to an embodiment of the present disclosure, when the first top cover component 120 is opened, maintenance personnel is facilitated to view; mount, and disassemble the components inside the water softening device. of the installation and maintenance of the water softening device is facilitated by inclining the upper surface of the first top cover component 120 downwards in the first direction.

As shown in FIG. 1, FIG. 2, FIG. 6 and FIG. 7, the water softening device further includes the inner frame assembly 300. The box opening is inclined downwards in the first direction, and the inner frame assembly 300 is inclined downwards in the first direction at the box opening and detachably connected to the top cover assembly 100.

The top cover assembly 100 further includes the second top cover component 130, and the second top cover component 130 is connected to the first frame body 110. The first frame body 110 is provided with the second opening, the second opening is provided at a side of the first opening, the first opening and the second opening are provided sequentially along the first direction, and the second top cover component 130 covers the second opening. A maximum flip angle of the second top cover component 130 relative to the first frame body 110 is greater than 90° to disassemble and install components inside the box body 200.

The water softening device according to an embodiment of the present disclosure provides the inner frame assembly 300 at the box opening of the box body 200, and the inner frame assembly 300 is detachably connected to the top cover assembly 100. When maintaining the water softening device, the entire top cover assembly 100 may be removed by simply separating the top cover assembly 100 from the inner frame assembly 300. The users or the maintenance personnel may directly maintain through the box opening to avoid the impact of the top cover assembly 100 on the maintenance of the water softening device, which has the advantage of easy installation and maintenance.

Figure 6:
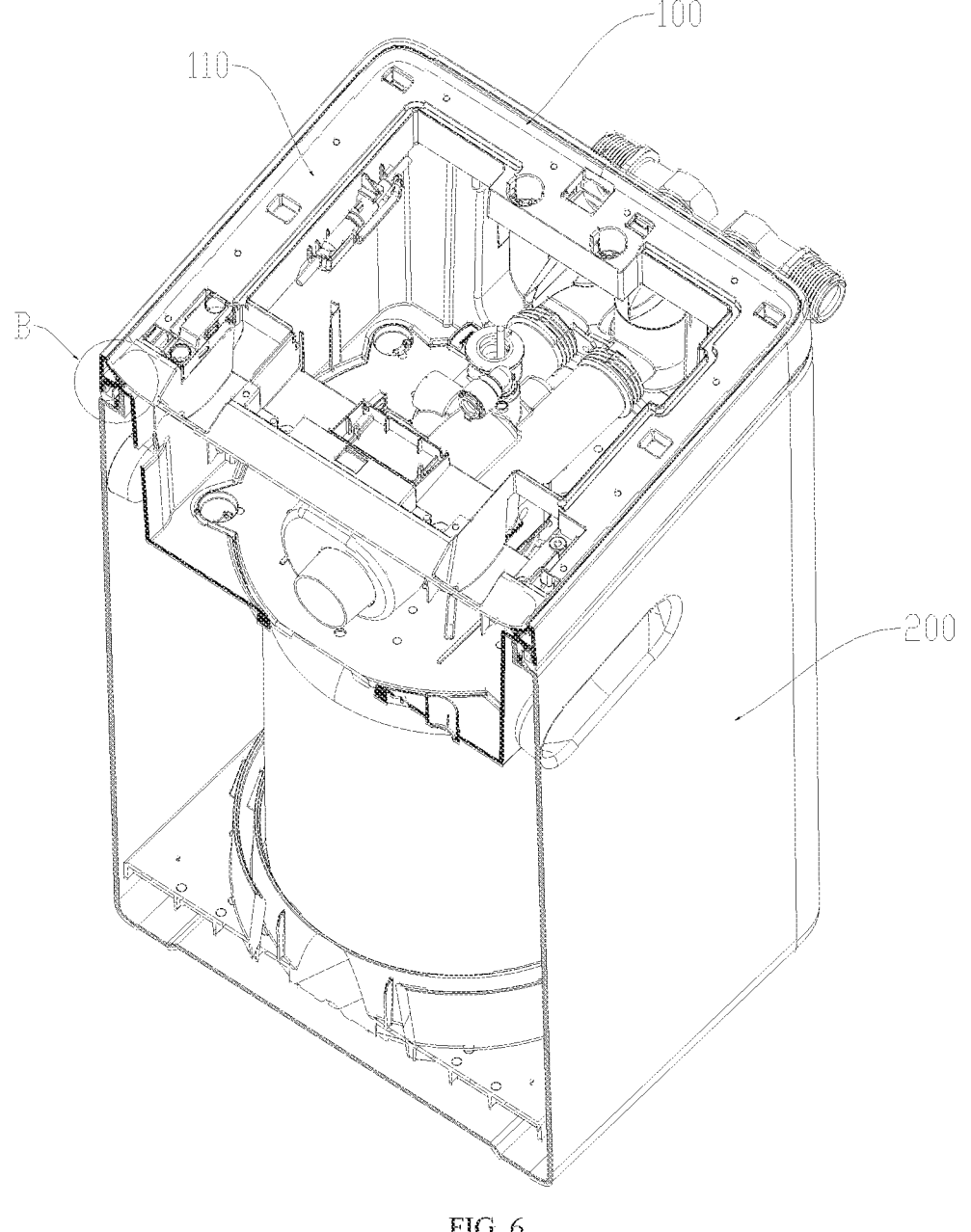
FIG. 6 is a schematic diagram of a cross-sectional assembly relationship between a first frame body and an inner frame assembly according to an embodiment of the present disclosure.
Figures 7, 8:
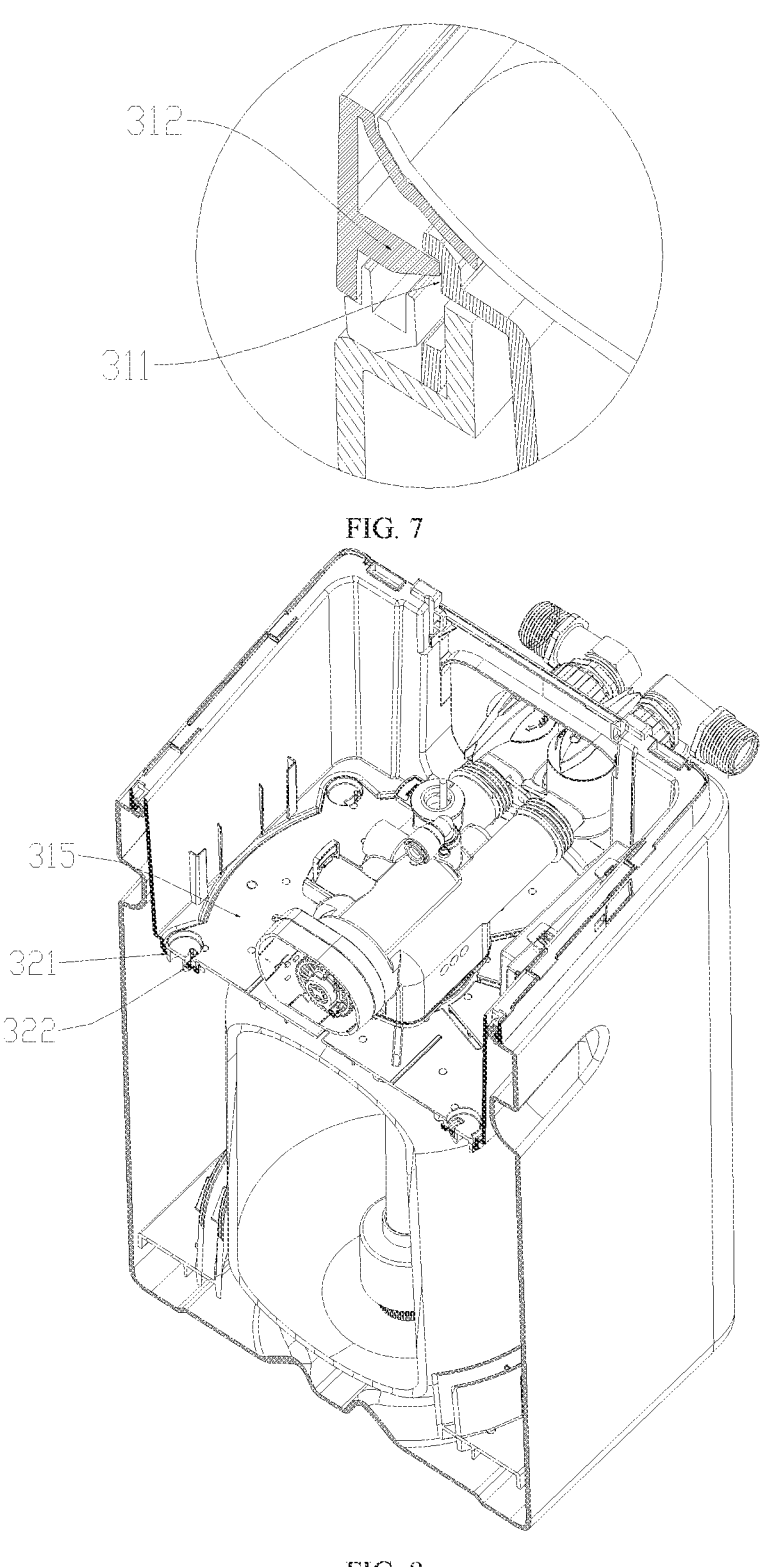
FIG. 7 is a partially enlarged schematic structural diagram of position B in FIG. 6.
FIG. 8 is a schematic diagram of a cross-sectional assembly relationship between a flexible fixing disc and an inner frame assembly according to an embodiment of the present disclosure.

As shown in FIG. 6 and FIG. 7, the inner frame assembly 300 includes an inner frame body 310. The inner frame body 310 is used to connect the box body 200 with the top cover assembly 100, and is further used to provide an installation foundation for the water softening assembly 400, as well as for parts such as an electric control box 326. A side of the inner frame body 310 is provided with first snap slots 311 provided at intervals. The top cover assembly 100 includes the first frame body 110 and the first top cover component 120. The first frame body 110 is provided with first snap tongues 312, and the first snap tongues 312 are matched with the first snap slots 311 by a snap-fit in one-to-one correspondence. The top cover assembly 100 is connected, through matching the first snap tongues 312 with the first snap slots 311 by a snap-fit, to the inner frame assembly 300 without using a screw; which simplifies the assembly of the top cover assembly 100.

The side of the inner frame body 310 is provided with first snap tongues 312, and the first frame body 110 is provided with first snap slots 311. The first snap tongues 312 are matched with the first snap slots 311 by a snap-fit in one-to-one correspondence to detachably connect the top cover assembly 100 with the inner frame assembly 300.

Figures 9, 10:
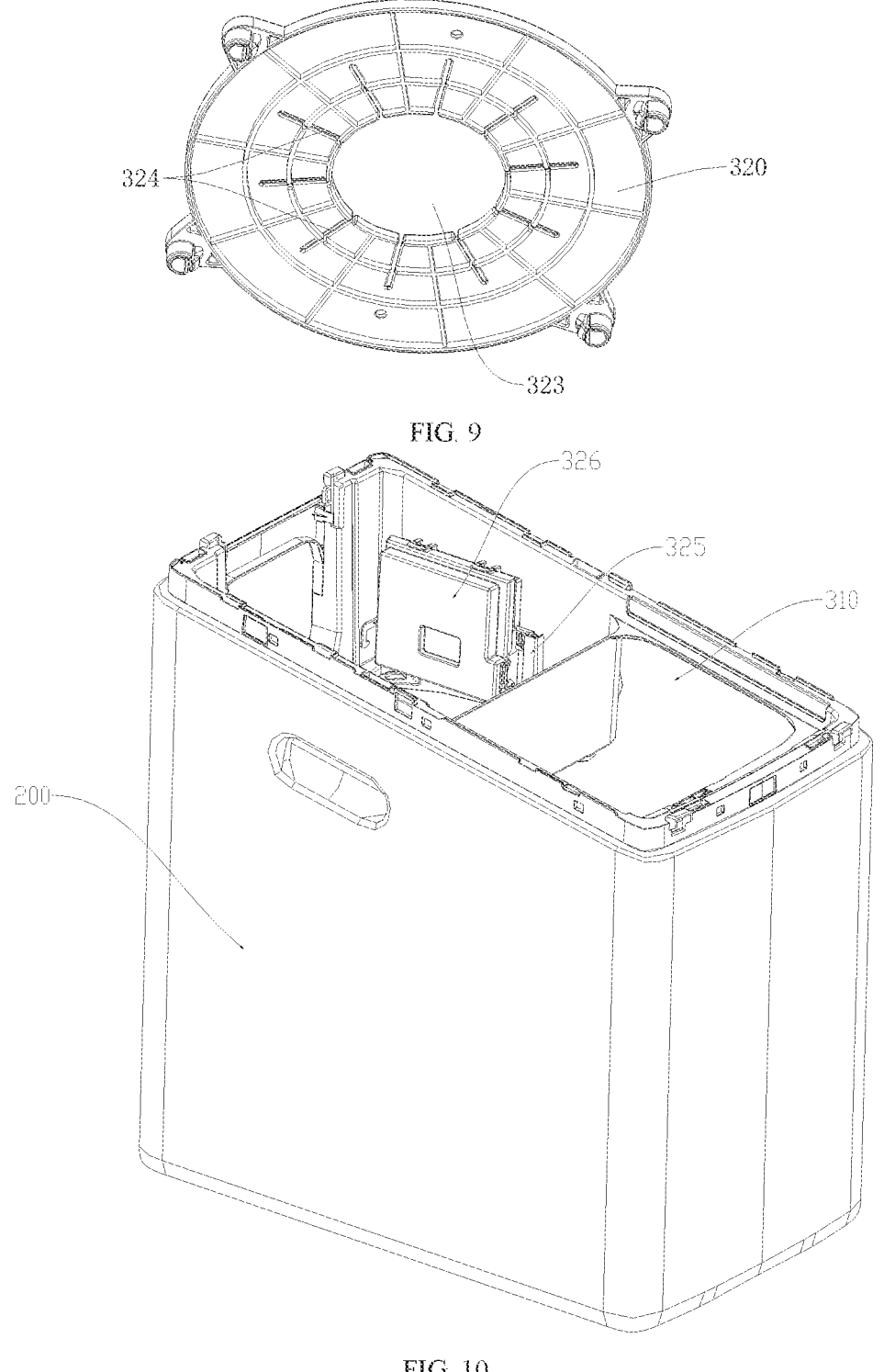
FIG. 9 is a schematic structural diagram of a flexible fixing disc according to an embodiment of the present disclosure.
FIG. 10 is a schematic diagram of an assembly relationship between an electronic control box and an inner frame assembly according to an embodiment of the present disclosure.

As shown in FIG. 8 and FIG. 9, the inner frame assembly 300 further includes a flexible fixing disc 320. The flexible fixing disc 320 is used to fix the water softening assembly 400. The inner frame body 310 is provided with a third opening communicating with the first accommodating chamber, and the flexible fixing disc 320 is provided at the third opening and detachably connected to the inner frame body 310. It is convenient to mount and disassemble the water softening assembly 400 by detachably connecting the flexible fixing disc 320 to the inner frame body 310, which simplifies the assembly of the water softening assembly 400, and enhances the user experience.

It should be noted that various implementation may be adopted to achieve a detachable connection between the flexible fixing disc 320 and the inner frame body 310. For example, it may be connected by a buckle, or it may be matched insertedly by a plug and a positioning hole.

As shown in FIG. 9, the inner frame body 310 is provided with first positioning holes 321, and the flexible fixing disc 320 is provided with first plugs 322. The first plug 322 is embedded in a corresponding first positioning hole 321 and connected to a side of the first positioning hole 321 by a snap-fit.

As shown in FIG. 8 and FIG. 9, the inner frame body 310 is provided with first plugs 322, the flexible fixing disc 320 is provided with first positioning holes 321. The first plug 322 is embedded in a corresponding first positioning hole 321 and connected to a side of the first positioning hole 321 by a snap-fit. The above implementation facilitates the installation and disassembly of the water softening assembly 400 by inserted matching of the first plugs 322 and the first positioning holes 321, which further enhances the user experience.

As shown in FIG. 9, the first plug 322 includes a guide portion and a snap-fit portion respectively connected to the flexible fixing disc 320. The snap-fit portion is provided at a side of the guide portion, and a side of the snap-fit portion away from the guide portion is provided with a snap tongue. When a part of the first plug 322 is inserted into the first positioning hole 321, a side of the snap-fit portion towards the guide portion is attached to the guide portion. An outer diameter of the first plug 322 decreases, and the first plug 322 may be easily inserted into the first positioning hole 321. When the first plug 322 is fully inserted into the first positioning hole 321, a gap is formed between a side of the snap-fit portion towards the guide portion and the guide portion. The outer diameter of the first plug 322 increases, and the snap tongue of the snap-fit portion is connected with an edge of the first positioning hole 321 by a snap-fit to prevent the first plug 322 from falling off from the first positioning hole 321.

As shown in FIG. 9, the flexible fixing disc 320 is provided with a central hole 323 and first notches 324. The central hole 323 is located in a center of the flexible fixing disc 320, and the central hole 323 is a circular hole. The central hole 323 is used to sleeve the water softening assembly 400 to fix the flexible fixing disc 320 on the water softening assembly 400. First notches 324 are arranged along a circumference of the central hole 323, and opening ends of the first notches 324 are formed on a wall of the central hole 323. The first notches 324 communicate with the central hole 323 through the opening end. By providing the first notches 324, the wall of the central hole 323 may be deformed under force, making a size of the central hole 323 larger and facilitating the installation and disassembly of the water softening assembly 400. The water softening assembly 400 includes a resin tank 401, and an upper end of the resin tank 401 is sleeved at the central hole 323.

During installation, the flexible fixing disc 320 is sleeved on the water softening assembly 400 through the central hole 323, and the flexible fixing disc 320 is pressed downwards. The wall of the central hole 323 is bent upwards in a thickness direction of the flexible fixing disc 320, and the size of the central hole 323 increases, causing the flexible fixing disc 320 to be sleeved at a predetermined position on an upper end of the water softening assembly 400, to connect the flexible fixing disc 320 and the water softening assembly 400. A bottom of the water softening assembly 400 is placed at a bottom of the box body 200, and the flexible fixing disc 320 is connected to the inner frame body 310, which may fix the water softening assembly 400. During disassembly, the flexible fixing disc 320 is lifted vertically. Thus, the wall of the central hole 323 is bent downward in the thickness direction of the flexible fixing disc 320, and the size of the central hole 323 increases, and the flexible fixing disc 320 is separated from the water softening assembly 400.

As shown in FIG. 9, the first notches 324 are in a strip shape and extends radially along the central hole 323. A length of the first notch 324 is less than a diameter of the flexible fixing disc 320.

As shown in FIG. 9, first notches 324 are uniformly distributed in the circumference of the central hole 323, and the uniform distribution of first notches 324 may make the wall of the central hole 323 more uniformly stressed when deformed.

As shown in FIG. 9, a reinforcing structure is provided on a surface of the flexible plate body, and the reinforcing structure may improve the structural strength of the flexible fixing disc 320.

As shown in FIG. 9, the reinforcing structure includes a first reinforcing rib, the first reinforcing rib extends along the circumference of the central hole 323, and the first reinforcing rib is coaxial with the central hole 323.

It may also be understood that the reinforcing structure includes a second reinforcing rib, the second reinforcing rib extends along a radius of the central hole 323, and the second reinforcing rib may enhance a radial strength of the flexible plate body. The second reinforcing rib and the first reinforcing rib are integrated to form a mesh reinforcing rib, and the mesh reinforcing rib may further improve the overall structural strength of the flexible plate body.

Figure 3:
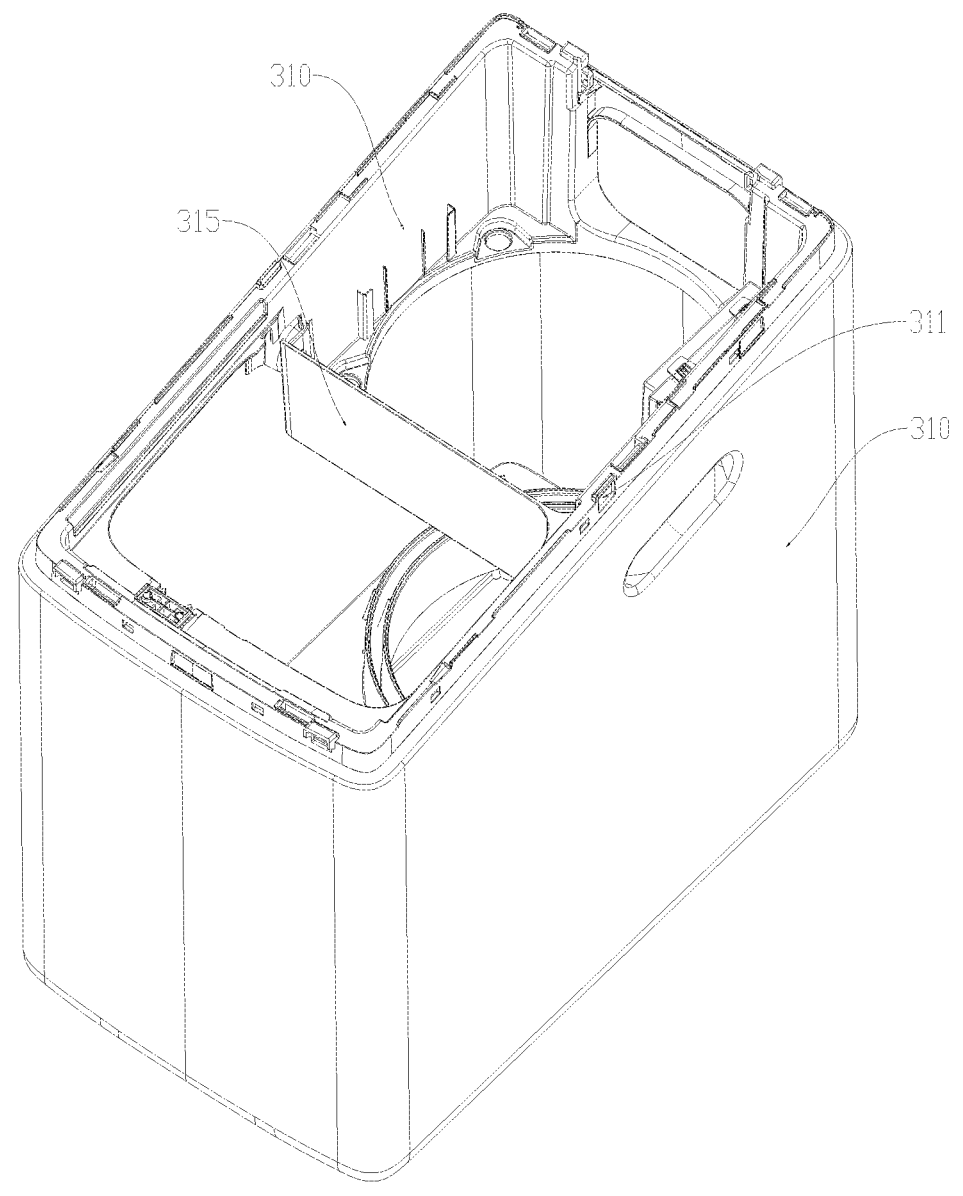
FIG. 3 is a schematic diagram of an assembly relationship between a box body and an inner frame assembly according to an embodiment of the present disclosure.
Figure 4:
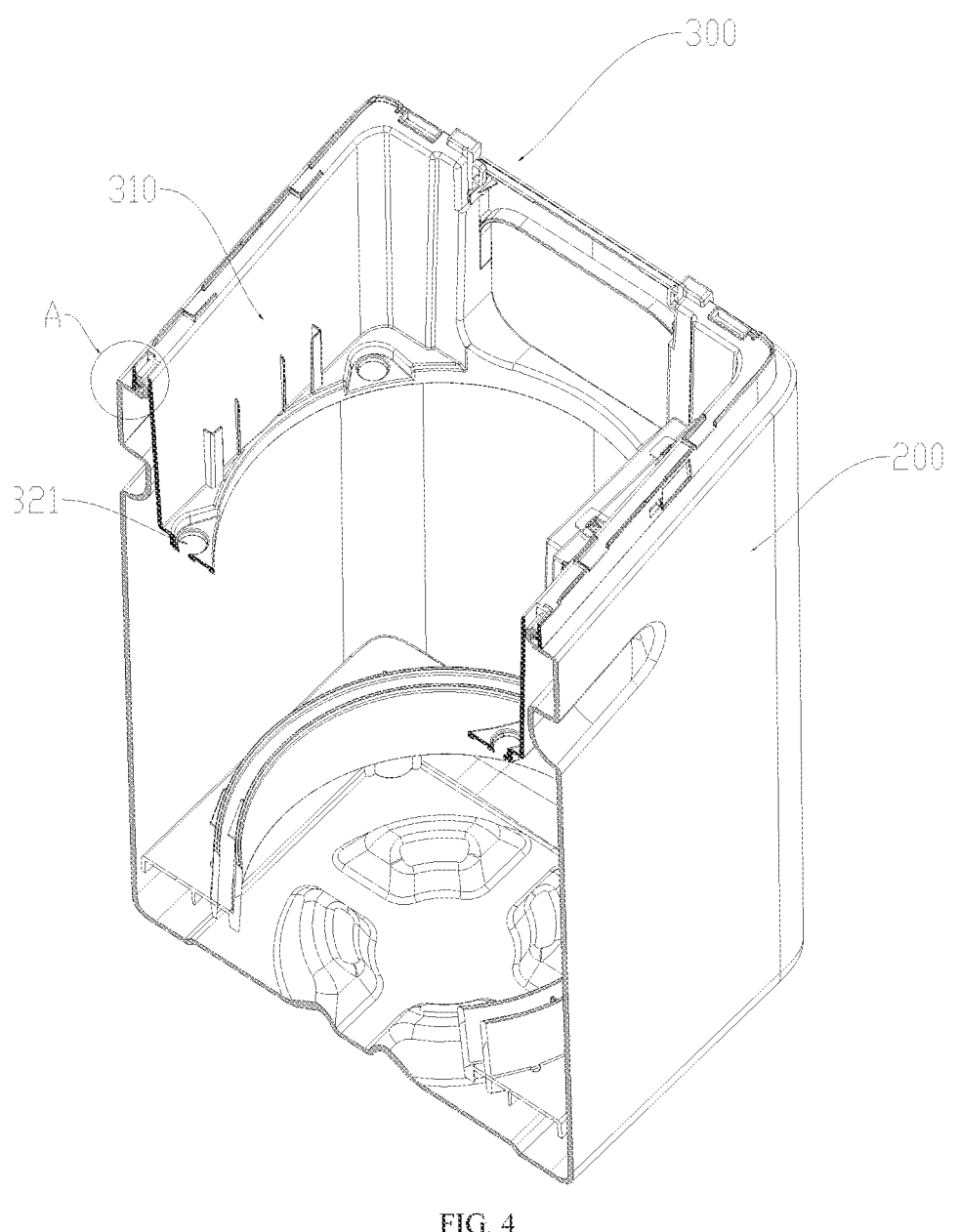
FIG. 4 is a schematic diagram of a cross-sectional assembly relationship between a box body and an inner frame assembly according to an embodiment of the present disclosure.
Figure 5:
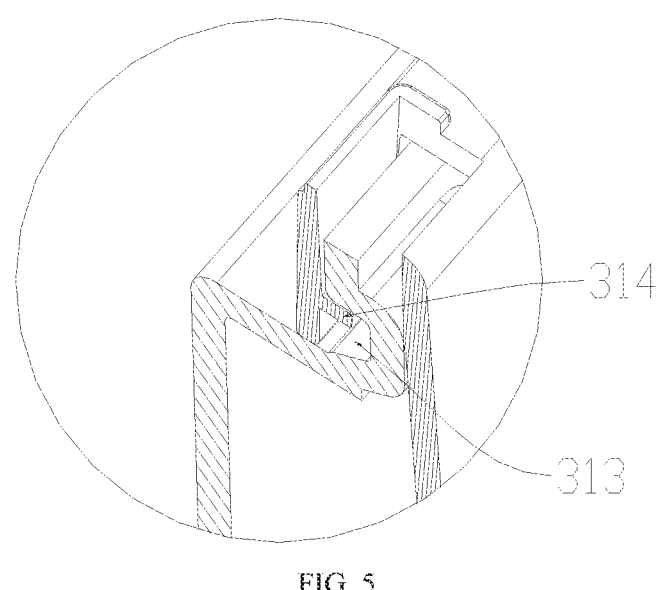
FIG. 5 is a partially enlarged schematic structural diagram of position A in FIG. 4.

As shown in FIG. 3, FIG. 4 and FIG. 5, the inner frame assembly 300 is detachably connected to the box body 200, that is, the inner frame body 310 is detachably connected to the box body 200. The inner frame body 310 may be detachably connected to the box body 200 without using a screw; and the assembly of the water softening device is simplified.

Second snap slots 313 are provided on the side of the inner frame body 310 at intervals. Second snap tongues 314 are provided at intervals on a side of the box opening, the snap tongues 314 are in one-to-one correspondence with the second snap slots 313 and the second snap slots 313 are matched with the corresponding second snap tongues 314 by a snap-fit.

As shown in FIG. 3, FIG. 4 and FIG. 5, second snap tongues 314 are provided on the side of the inner frame body 310, and second snap slots 313 are provided on the side of the box opening to match the second snap tongue 314 by a snap-fit. The inner frame body 310 matches the second snap slot 313 of the box opening through the second snap tongue 314 by a snap-fit.

Figure 11:
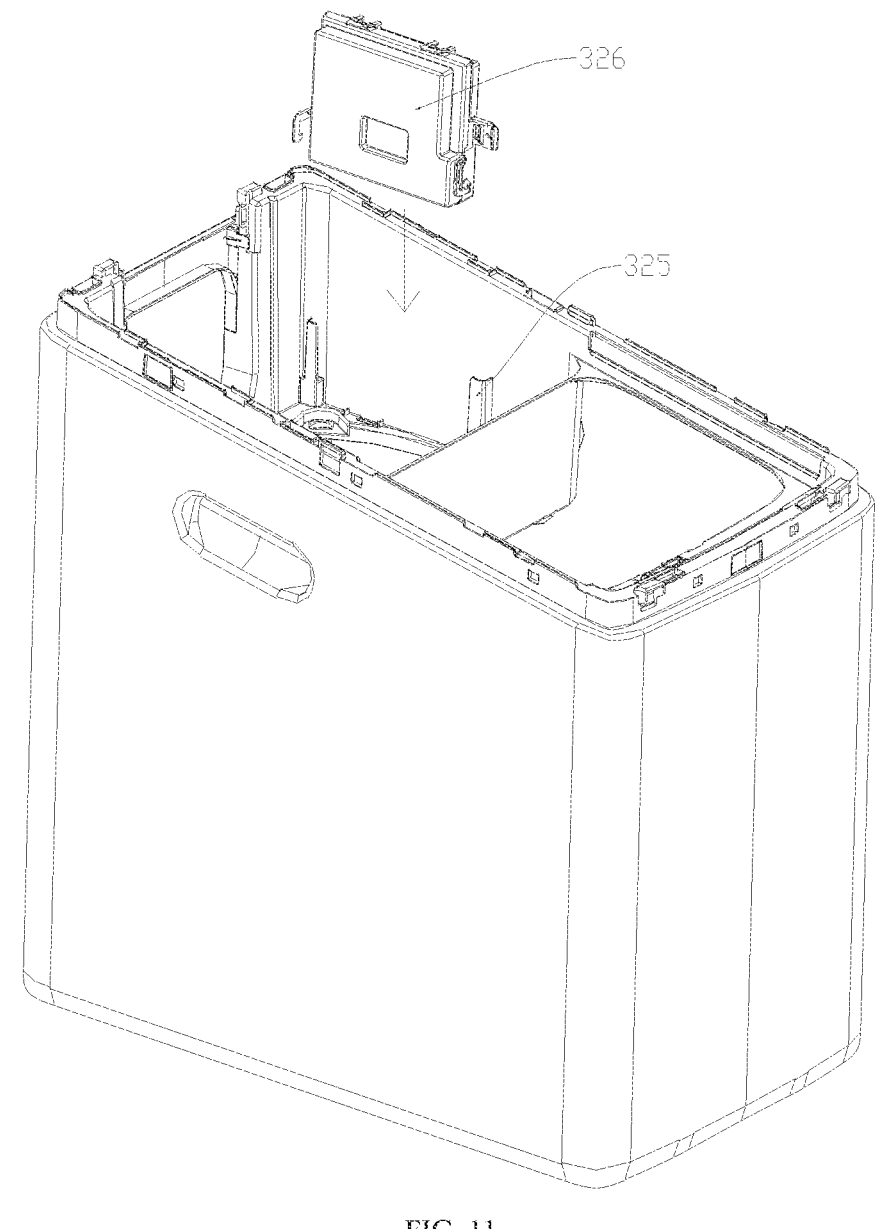
FIG. 11 is a schematic diagram of the installation of an electronic control box according to an embodiment of the present disclosure.
Figure 12:
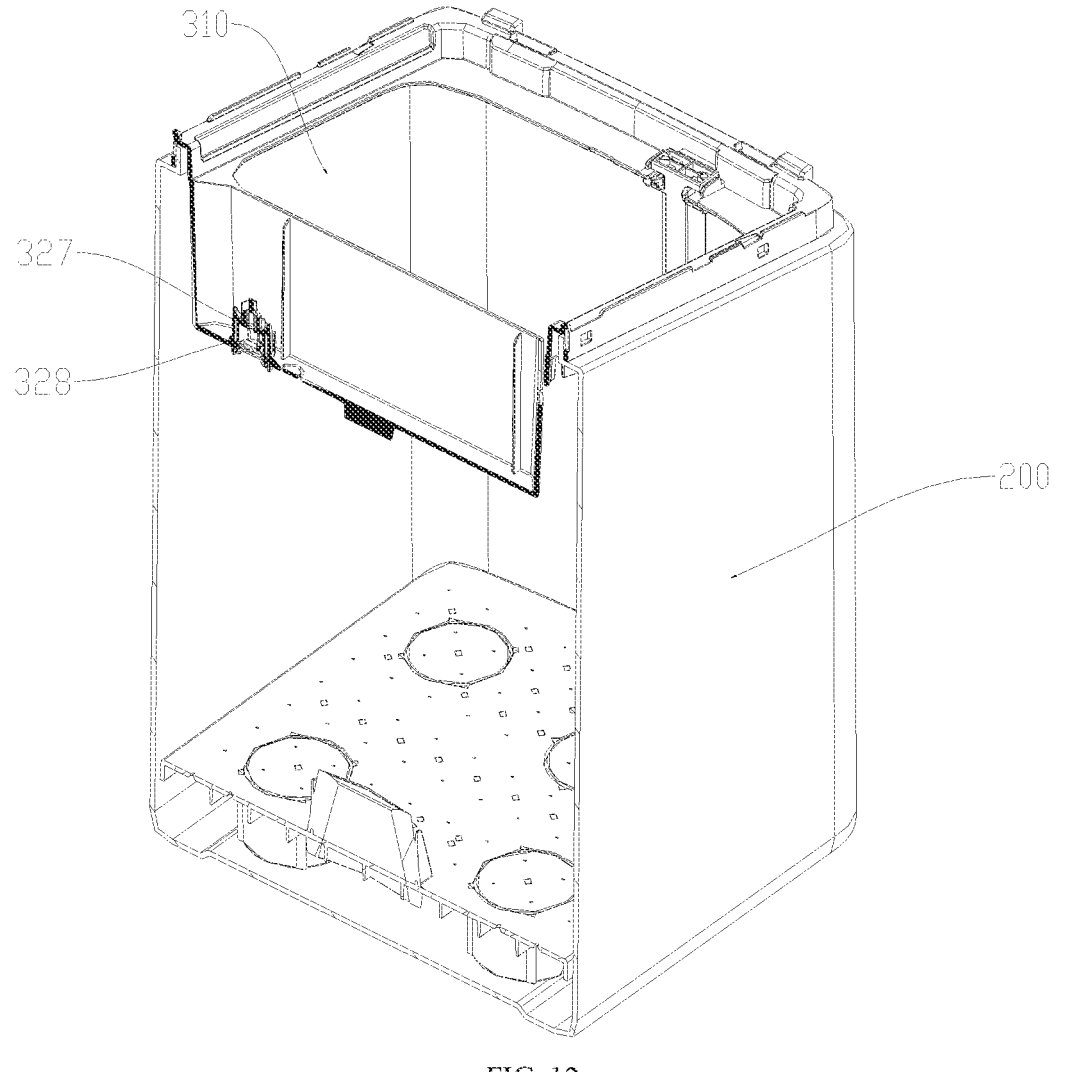
FIG. 12 is a schematic diagram of an assembly relationship between a salt level sensor and an inner frame assembly according to an embodiment of the present disclosure.

As shown in FIG. 10, FIG. 11 and FIG. 12, the inner frame body 310 also forms a fourth opening communicating with the first accommodating chamber, and a partition 315 connected to the inner frame body 310 is provided between the fourth opening and the third opening. The partition 315 separates the third opening from the fourth opening. The fourth opening is provided with a salt pouring grille, and the third opening is provided with the electric control box 326 and a salt level sensor 327. To facilitate the installation of the electronic control box 326, a fixing chute 325 is provided on an inner wall of the third opening, and fixing blocks are respectively provided on both sides of the electronic control box 326, the fixing blocks is snapped in a corresponding fixing chute 325. The inner wall of the third opening is further provided with a snap seat 328, and the salt level sensor 327 is matched with the snap seat 328 by a snap-fit.

Figures 13, 14:
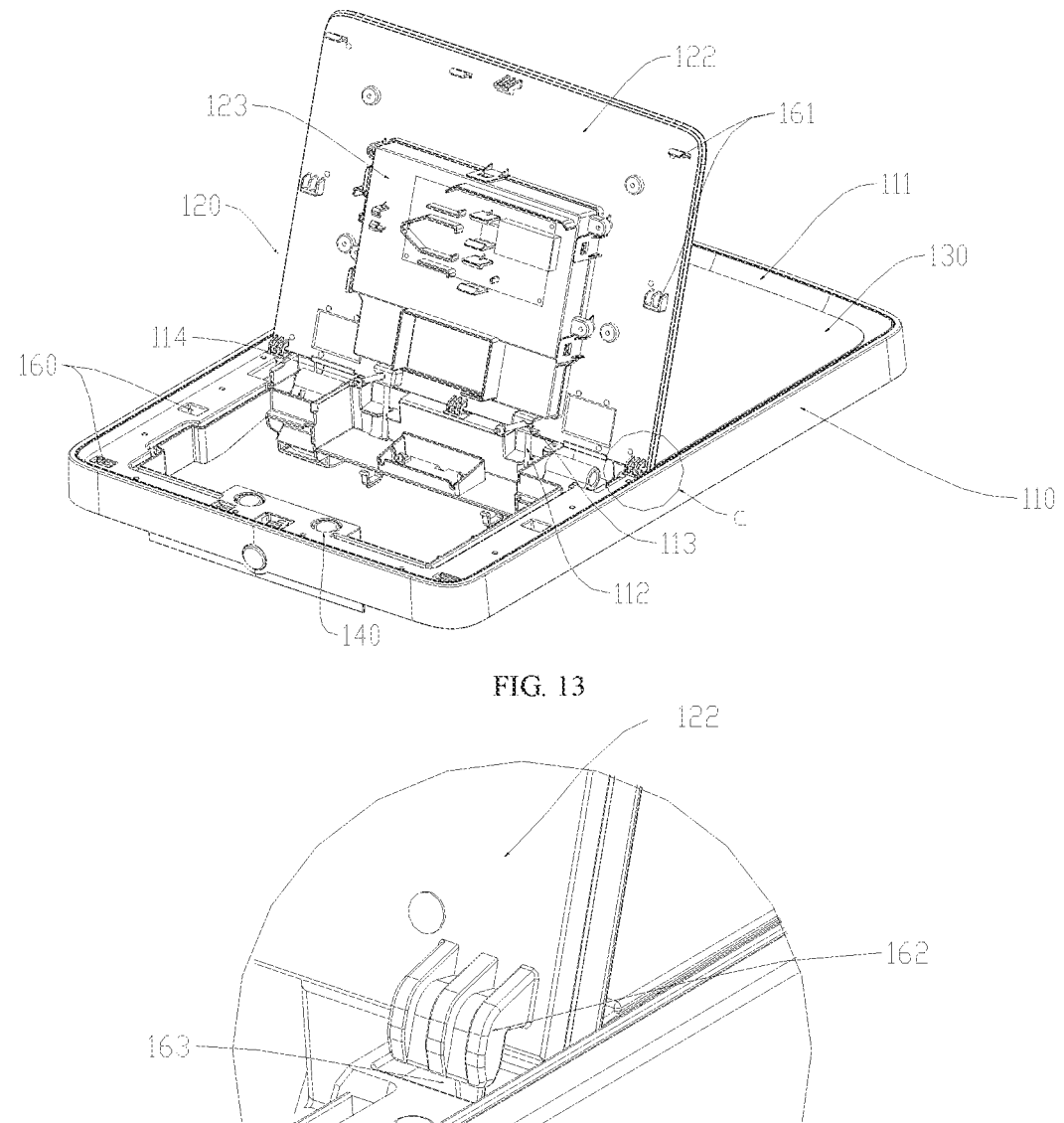
FIG. 13 is a first structural diagram of a first top cover component in an open state according to an embodiment of the present disclosure.
FIG. 14 is a partially enlarged schematic structural diagram of position C in FIG. 13.

As shown in FIG. 13, the top cover assembly 100 includes the first frame body 110 and the first top cover component 120. The first frame body 110 is provided with the first opening and a first limit portion 160. The first top cover component 120 is connected to the first frame body 110, and the first top cover component 120 is provided with a second limit portion 161. The first top cover component 120 is switchable between an open state and a closed state. In the closed state, the first top cover component 120 covers to the first opening, and the first limit portion 160 is matched limitedly with the second limit portion 161 in a first direction a and a second direction b in a plane where the first top cover component 120 is located; and in the open state, an opening side of the first top cover component 120 is away from the first opening, and the first limit portion 160 is separated from the second limit portion 161.

In the closed state, by providing the first limit portion 160 on the first frame body 110 and the second limit portion 161 on the first top cover component 120, the first top cover component 120 covers to the first opening, and the first limit portion 160 is matched limitedly with the second limit portion 161 in the first direction a and the second direction b in the plane where the first top cover component 120 is located, the first top cover component 120 is prevented from moving in the first direction a or the second direction b in the plane where the first top cover component 120 is located, which may further result in an uneven gap between the first top cover component 120 and the first frame body 110.

Figures 15, 16:
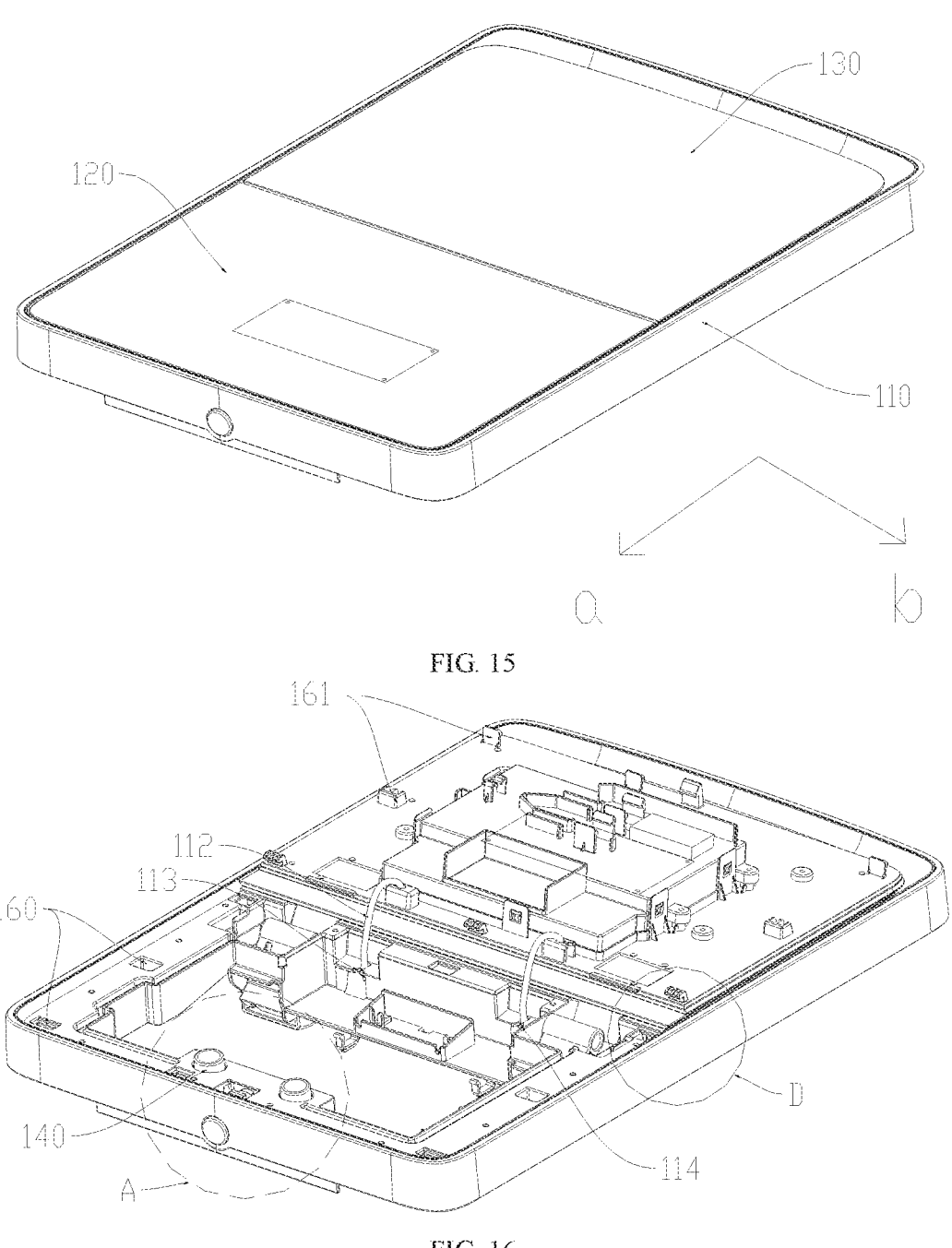
FIG. 15 is a schematic structural diagram of a first top cover component in a close state according to an embodiment of the present disclosure.
FIG. 16 is a second structural diagram of a first top cover component in an open state according to an embodiment of the present disclosure.
Figures 17, 18:
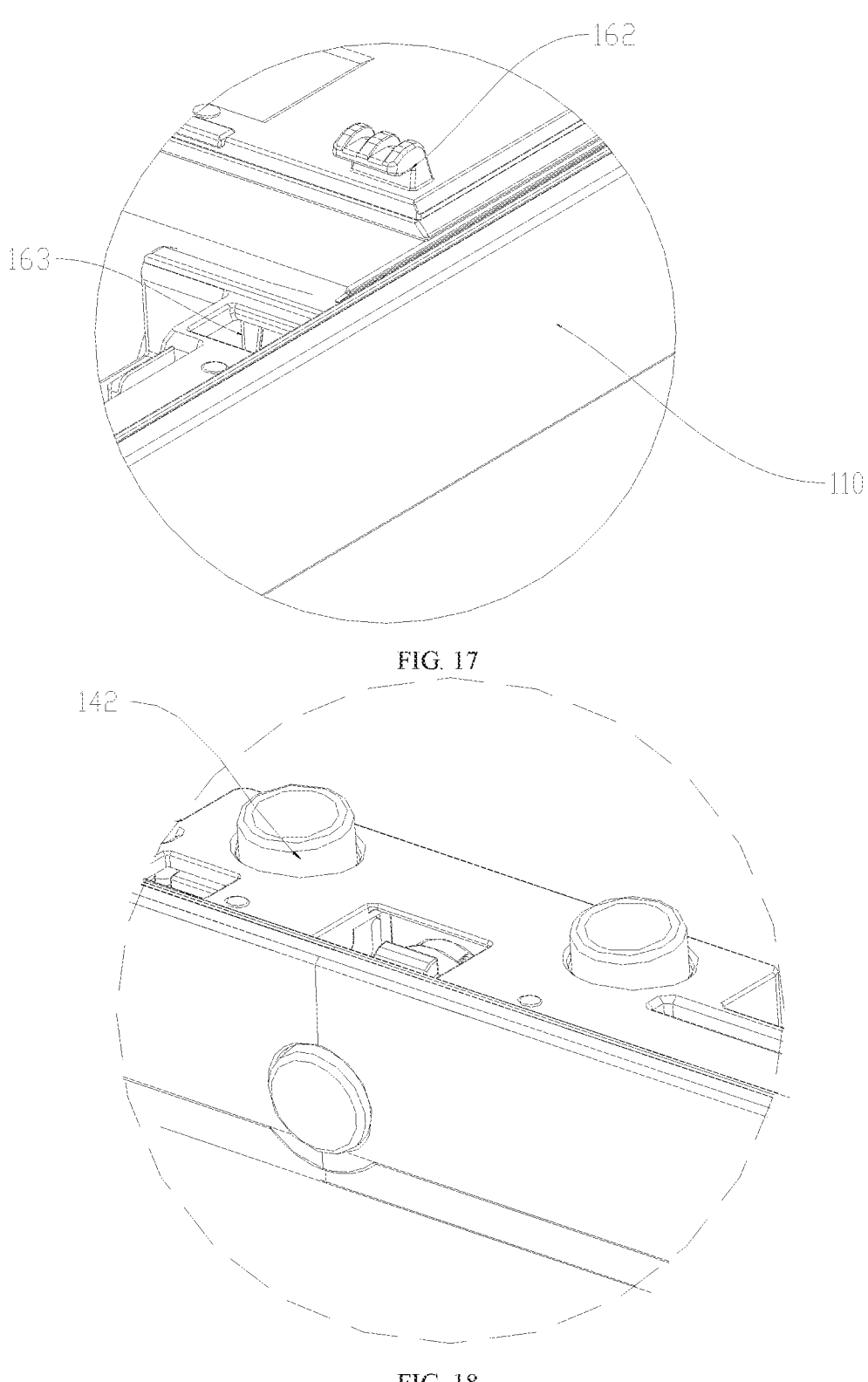
FIG. 17 is a partially enlarged schematic structural diagram of position D in FIG. 16.
FIG. 18 is a partially enlarged schematic structural diagram of position A in FIG. 16.

As shown in FIG. 13 and FIG. 16, the first limit portion 160 includes first limit holes, the holes are provided at a side of the first frame body 110 towards the first top cover component 120 at intervals, and the first limit hole is a rectangular hole. The second limit portion 161 includes limit blocks 114, the limit blocks are located on a side of the first top cover component 120 towards the first frame body 110 in a closed state, that is, the limit block 114 are located on a first side of a first housing 122, limit blocks 114 are provided at intervals, the limit block 114 is in one-to-one correspondence with the first limit hole, and the limit block 114 is integrally formed with the first housing 122. In the closed state, the limit block 114 is embedded in a corresponding first limit hole. Since the first limit portion 160 is matched limitedly with the second limit portion 161 in the first direction and the second direction b in the plane where the first top cover component 120 is located, the first top cover component 120 is unable to move. Therefore, the gap between the first top cover component 120 and the first frame body 110 is fixed and uniform.

It should be noted that the second limit portion 161 is not limited to the limit block 114, but may also be a snap tongue, or a combination of the limit block 114 and the snap tongue. When the first housing 122 is a rectangular plate structure, the first direction and the second direction b are perpendicular, the first direction a is a length direction of the first frame body 110, and the second direction b is a width direction of the first frame body 110. The first direction a may also be non-perpendicular to the second direction b, and in such case the first housing 122 is circular, elliptical, or other shape.

As shown in FIG. 13, FIG. 14, FIG. 16 and FIG. 17, the first top cover component 120 is further provided with a third limit portion 162, and the first frame body 110 is further provided with a fourth limit portion 163 corresponding to the third limit portion 162. In the closed state, the first limit portion 160 is limitedly matched with the second limit portion 161 in a direction perpendicular to a plane where the first top cover component 120 is located. Since a bottom of the first top cover component 120 is supported by the first frame body 110, the direction perpendicular to the plane where the first top cover component 120 is located is a vertical upward direction. Through limitedly matching the third limit portion 162 with the fourth limit portion 163, a side of the first top cover component 120 opposite to an opening side is unable to move upwards.

As shown in FIG. 13, FIG. 14, FIG. 16 and FIG. 17, the third limit portion 162 is provided on the side of the first top cover component 120 opposite to the opening side. The third limit portion 162 includes three hook-like structures, and the three hook-like structures are integrally formed with the first housing 122. The fourth limit portion 163 includes three second limit holes in one-to-one correspondence with the hook-like structures. In the closed state, the hook-like structure is embedded in the second limit hole and is connected to an inner wall of the second limit hole by a snap-fit. Since the opening side of the first top cover component 120 locks the first top cover component 120 through a locking component 150, a side of the first top cover component 120 opposite to the opening side is limitedly matched with the fourth limit portion 163 through the third limit portion 162, and the first top cover component 120 is fixed.

The second top cover component 130 is detachably connected to the first frame body 110, and the second top cover component 130 is switchable between a closed position and an open position. In the closed position, the second top cover component 130 covers the second opening; and in the open position, the second top cover component 130 is away from the second opening.

It should be noted that the second top cover component 130 may be detachably connected to the first frame body 110 through a crank arm 164 or a flexible connector, and may also through other detachable connections.

Figure 28:
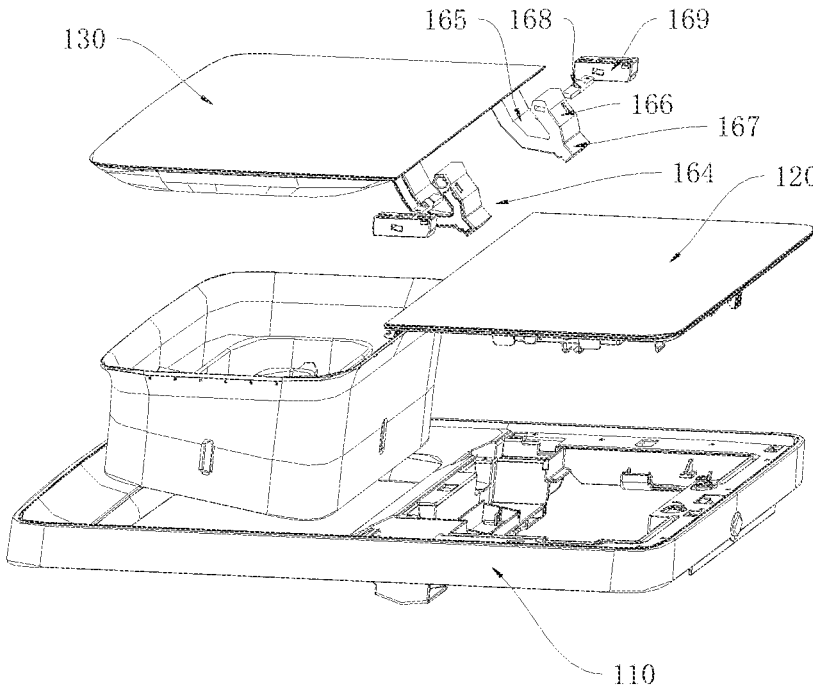
FIG. 28 is a first structural diagram of a top cover assembly according to an embodiment of the present disclosure.

As shown in FIG. 28, the second top cover component 130 is connected to the first frame body 110 through the crank arm component, and a flip angle of the second top cover component 130 relative to the first frame body 110 is greater than 90°. It is convenient to maintain the water softening device through the flip angle of the second top cover component 130 relative to the first frame body 110 is greater than 90°.

As shown in FIG. 28, the crank arm component includes the crank arm 164. A first end of the crank arm 164 is connected to the second top cover component 130, and a second end of the crank arm 164 is matched rotatably with the first frame body 110, and is detachably connected to the first frame body 110. By detachably connecting the second end of the crank arm 164 to the first frame body 110, the second end of the crank arm 164 may be separated, if necessary, from the first frame body 110, which facilitates the installation and disassembly of the second top cover component 130.

As shown in FIG. 28, the crank arm 164 includes a long-arm segment 165 and a short-arm segment 166. The long-arm segment 165 is arc-shaped, and the short-arm segment 166 is linear. A first end of the long-arm segment 165 is connected to the second top cover component 130, a second end of the long-arm segment 165 is connected to a first end of the short-arm segment 166, and a second end of the short-arm segment 166 is matched rotatably with the first frame body 110. A distance between the second end of the short-arm segment 166 and the first end of the long-arm segment 165 is less than a distance between the first end of the short-arm segment 166 and the first end of the long-arm segment 165. Since the long-arm segment 165 and the short-arm segment 166 forms an arc-shaped structure, when the second top cover component 130 is in the open position, a side of the first top cover component 120 opposite to the open side is located between the long-arm segment 165 and the short-arm segment 166, and the crank arm 164 may avoid the obstruction of the side of the first top cover component 120 opposite to the open side, and the second top cover component 130 can be opened by a large angle.

As shown in FIG. 28, the crank arm 164 is provided with a stop portion 167, and the stop portion 167 is integrally formed with the crank arm 164. The first frame body 110 is provided with an abut portion (not shown). In the closed position, the stop portion 167 is separated from the abut portion. In the open position, the stop portion 167 abuts against the abut portion. By matching the stop portion 167 with the abut portion, the second top cover component 130 may be supported in the open position, and the stability of the second top cover component 130 in the open position is improved.

As shown in FIG. 28, the stop portion 167 is provided outside the long-arm segment 165 and close to the second end of the long-arm segment 165.

As shown in FIG. 28, the crank arm component further includes a damping shaft 168, an end of the damping shaft 168 is connected insertedly to the second end of the short-arm segment 166, and another end of the damping shaft 168 is connected insertedly to the first frame body 110.

It should be noted that the connection mode between the damping shaft 168, the short-arm segment 166 and the first frame body 110 is not limited to insertion, but may also be a connection using a buckle, a pin, or other connections.

As shown in FIG. 28, the crank arm component further includes a fixing seat 169, the first frame body 110 is provided with a mounting slot, the fixing seat 169 is fixed to the mounting slot through a screw; the fixing seat 169 is provided with a square hole, and the another end of the damping shaft 168 is plugged into the square hole. Similarly, the second end of the short-arm segment 166 is further provided with a square hole, and the end of the damping shaft 168 is plugged into the square hole at the second end of the short-arm segment 166.

The first top cover component 120 is connected to the first frame body 110 through a flexible member 112, and the first top cover component 120 is switchable between the open state and the closed state. The second top cover component 130 is connected to the first frame body 110 and is provided at a side of the first opening. In the closed state, the first top cover component 120 covers the first opening; and in the open state, the first top cover component 120 is located above the second top cover component 130, and an included angle between the first top cover component 120 and the second top cover component 130 is less than a predetermined angle.

By connecting the first top cover component 120 to the first frame body 110 through the flexible member 112, in the open state, the first top cover component 120 is located above the second top cover component 130, and the included angle between the first top cover component 120 and the second top cover component 130 is less than the predetermined angle. A large opening angle may be formed between the first cover component 120 and the first opening. There is no need to disassemble the first cover component 120 during the installation and maintenance of the water softening device, the efficiency and the user experience thereof are improved, and product competitiveness is enhanced.

It may be understood that an end of the flexible member 112 is detachably connected to the first frame body 110, and the other end of the flexible member 112 is fixedly connected to the first top cover component 120.

It may be understood that an end of the flexible member 112 is fixedly connected to the first frame body 110, and another end of the flexible member 112 is detachably connected to the first top cover component 120.

It may be understood that an end of the flexible member 112 is detachably connected to the first frame body 110, and the other end of the flexible member 112 is detachably connected to the first top cover component 120.

It should be noted that the detachable connection may be either a snap-fit connection or a buckle connection.

As shown in FIG. 13, both a first side of the first housing 122 and a middle frame of the first frame body 110 are provided with snap slots 113, and two ends of the flexible member 112 are respectively snapped to the corresponding snap slots 113.

It should be noted that the snap slot 113 may also be provided only on the first side of the first housing 122 or on the middle frame of the first frame body 110.

The limit block 114 is provided at an end of the flexible member 112 snapped to the snap slot 113. The limit block 114 is limitedly matched with the snap slot 113. The width of the snap slot 113 is less than a width of the limit block 114, and the limit block 114 is unable to pass through the snap slot 113. It is convenient to mount and disassemble the first housing 122 by matching the snap slot 113 with the flexible member 112 by a snap-fit.

It may be understood that a size of the first opening is 240 mm*160 mm, and the predetermined angle is 0°, i.e., in the open state, the first top cover component 120 is attached to an upper surface of the second top cover component 130, and the opening angle of the first top cover component 120 reaches 180°.

It may be understood that a limit portion is form on a side of the second top cover component 130 away from the first opening or on a side of the first frame body 110 away from the first opening. In the closed state, the first top cover component 120 covers the first opening; in the open state, the first top cover component 120 is provided on an upper part of the second top cover component 130 and is limitedly matched with the limit portion.

By providing a limit portion on the side of the second top cover component 130 away from the first opening or on the side of the first frame body 110 away from the first opening, when the first top cover component 120 is in the open state, the first top cover component 120 is located on the upper part of the second top cover component 130. By matching limitedly the limit portion with the first top cover component 120, the first cover component 120 is effectively prevented from sliding, and the user experience and product competitiveness are enhanced.

The limit portion is a step 111 formed at the first frame body 110 on a side away from the first opening. In the open state, the first top cover component 120 abuts against the step 111. Since a height of the first frame body 110 on the side away from the first opening is larger than the height of an upper surface of the second top cover component 130, the step 111 is formed at a part of the first frame body 110 on the side away from the first opening higher than the upper surface of the second top cover component 130.

It should be noted that the formation mode of the step 111 is not limited to the aforementioned mode. When the height of the side of the first frame body 110 away from the first opening is the same as the height of the upper surface of the second top cover component 130, an upwardly raised step 111 may be formed on the side of the first frame body 110 away from the first opening. The step 111 may be continuous or arranged at intervals.

The limit portion is a raised edge 134 formed at a side of the second top cover component 130 away from the first opening. In the open state, the first top cover component 120 abuts against the raised edge 134. The raised edge 134 is formed at the side of the first housing 122 away from the first opening, and the raised edge 134 is integrally formed with the first housing 122. The raised edge 134 may be continuous or composed of protrusions arranged at intervals.

As shown in FIG. 13, FIG. 15, FIG. 16, and FIG. 18, the top cover assembly further includes an ejector rod component 140, the ejector rod component 140 is switchable between a stretched state and a retracted state. In the retracted state, the first top cover component 120 covers the first opening; in the stretched state, the ejector rod component 140 abuts against the first frame body 110 or the first top cover component 120, and an opening gap is formed between the opening side of the first top cover component 120 and the first frame body 110.

By providing the ejector rod component 140, the ejector rod component 140 is in a stretched state, and the ejector rod component 140 abuts against the first frame body 110 or the first top cover component 120 when the first top cover component 120 needs to be opened, and an opening gap is formed between the opening side of the first top cover component 120 and the first frame body 110. The opening gap may facilitate users to open the first top cover component 120 by hand, which enhances the user experience and improves product competitiveness.

As shown in FIG. 16, the first frame body 110 is a rectangular frame body, a middle frame is formed in the middle of the first frame body 110, the first opening is formed on a side of the middle frame, and the second opening is formed on another side of the middle frame. The second opening is covered by the second top cover component 130. When the first top cover component 120 is in a closed state, an upper edge of the first frame body 110 is flush with the opening side of the first top cover component 120, and the gap between them is small, and it inconvenient to open the first top cover component 120 by hand. Therefore, the ejector rod component 140 needs to be provided. The opening gap is formed between the opening side of the first top cover component 120 and the first frame body 110 through the ejector rod component 140, which conveniently opens the first top cover component 120.

Figures 21, 22:
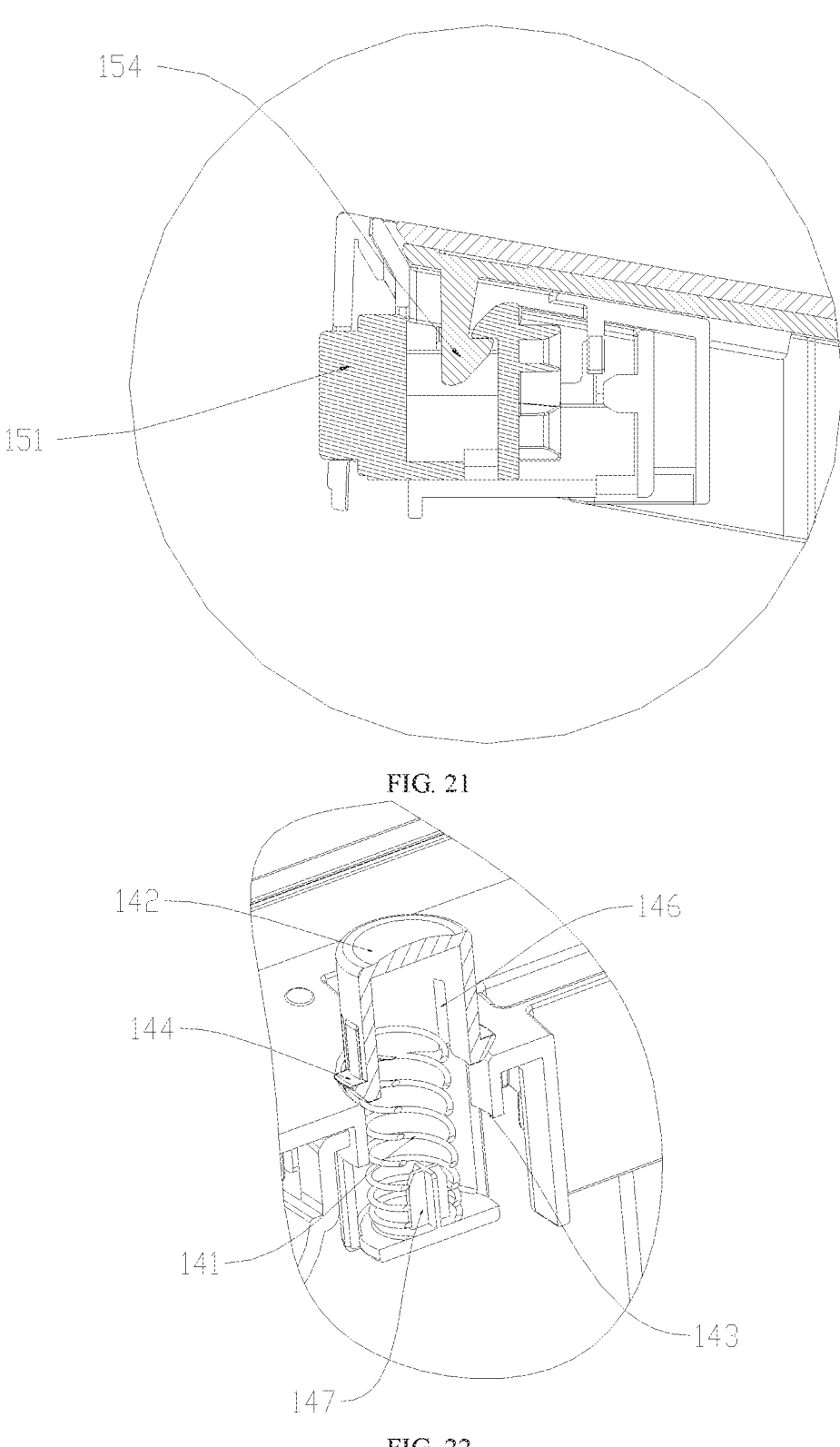
FIG. 21 is a second cross-sectional structural diagram of a locking component according to an embodiment of the present disclosure.
FIG. 22 is a first cross-sectional structural diagram of an ejector rod component according to an embodiment of the present disclosure.
Figure 23:
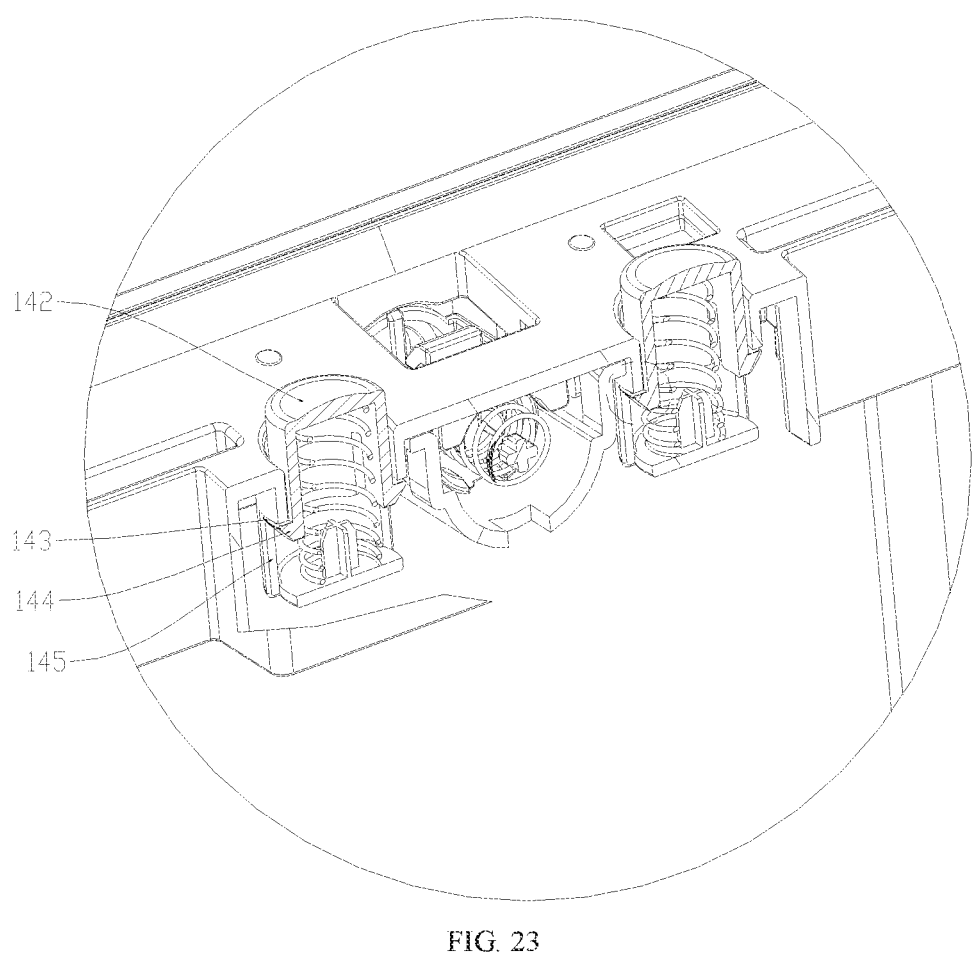
FIG. 23 is a second cross-sectional structural diagram of an ejector rod component according to an embodiment of the present disclosure.

As shown in FIG. 16, FIG. 22 and FIG. 23, two first mounting holes are formed on a side of the first frame body 110 towards the first top cover component 120. The top cover assembly includes two ejector rod components 140, and the ejector rod components 140 are mounted in the corresponding first mounting hole in one-to-one correspondence. The ejector rod component 140 includes a first elastic member 141 and an ejector rod 142. The first elastic member 141 is provided inside the corresponding first mounting hole, the first elastic member 141 is a compression spring, and a first end of the first elastic member 141 abuts against a bottom wall of the first mounting hole. The ejector rod 142 is provided inside the first mounting hole, and the ejector rod 142 is connected to a second end of the first elastic member 141. In the retracted state, the ejector rod 142 is retracted into the first mounting hole, and the first elastic member 141 is in a first compressed state; and in the stretched state, the ejector rod 142 stretches from the first mounting hole and contacts the first top cover component 120, and the first elastic member 141 is in a second compressed state.

It should be noted that in the retracted state, the ejector rod 142 may abut against the first top cover component 120 or not. When the top cover assembly is provided with the locking component 150, the ejector rod 142 abuts against the first top cover component 120. Since the locking component 150 locks the first top cover component 120, the first top cover component 120 will not be ejected by the ejector rod 142. When the top cover assembly is not provided with a locking component 150, the ejector rod component 140 may further include a locking mechanism. In the retracted state, the ejector rod 142 is locked by the locking mechanism in the first mounting hole, and the ejector rod 142 does not abut against the first top cover component 120. In the stretched state, the locking mechanism unlocks the ejector rod 142, and the ejector rod 142 stretches out of the first mounting hole and abuts against the first top cover component 120.

It should be noted that the number of ejector rod component 140 is not limited to two, the number may also be one, three or more.

The first mounting hole is formed at the opening side of the first top cover component 120, and the first elastic member 141 is provided inside the first mounting hole. The first elastic member 141 is a compression spring, and the first end of the first elastic member 141 abuts against the bottom wall of the first mounting hole. The ejector rod 142 is provided inside the first mounting hole, and the ejector rod 142 abuts against the second end of the first elastic member 141. In the retracted state, the ejector rod 142 is retracted into the first mounting hole, and the first elastic member 141 is in the first compressed state; and in the stretched state, the ejector rod 142 stretches from the first mounting hole and abuts against the first frame body 110, and the first elastic member 141 is in the second compressed state.

It should be noted that an amount of compression of the first elastic member 141 in the first compressed state is greater than an amount of compression of the first elastic member 141 in the second compressed state. Mounting the ejector rod component 140 on the opening side of the first top cover component 120 has the same function as mounting the ejector rod component 140 on the first frame body 110, and the specific working principle will not be described in detail.

It may be understood that a mounting hole limit portion 143 is formed at a side wall of the first mounting hole, and an ejector rod limit portion 144 is formed at the ejector rod 142. In the stretched state, the ejector rod limit portion 144 abuts against the mounting hole limit portion 143; and in the retracted state, the ejector rod limit portion 144 is separated from the mounting hole limit portion 143. By providing the mounting hole limit portion 143 and the ejector rod limit portion 144, the first elastic member 141 is prevented from completely ejecting the ejector rod 142 out of the first mounting hole.

As shown in FIG. 22 and FIG. 23, the mounting hole limit portion 143 is the first snap tongue provided at a side wall of the ejector rod 142, and the first snap tongue is integrally formed with the ejector rod 142. A chute 145 extending along a depth direction of the first mounting hole is provided at the side wall of the first mounting hole, and the first snap tongue is slidably matched with the corresponding chute 145. By slidably matching the first snap tongue with the corresponding chute 145, in addition to guiding the ejector rod 142, it can also play a limiting role on the ejector rod 142, and the ejector rod 142 can only reciprocate along the depth direction of the first mounting hole within a predetermined range without axial rotation. The ejector rod limit portion 144 is a slot wall at an end of the chute 145 away from the bottom wall of the first mounting hole. In the stretched state, the first snap tongue abuts against the slot wall at the end of the chute 145 away from the bottom wall of the first mounting hole to limit the position of the ejector rod 142.

As shown in FIG. 22 and FIG. 23, four strip-shaped separation slots 146 extending along the depth direction of the first mounting hole are formed at the ejector rod 142, and two first snap tongues are symmetrically provided at a side wall of the ejector rod 142. The strip-shaped separation slot 146 is provided on both sides of each first snap tongue. By providing strip-shaped separation slots 146 on both sides of the first snap tongue, only one end of the first snap tongue is connected to the side wall of the ejector rod 142, and the first snap tongue is elastic in a radial direction of the ejector rod 142, which facilitates the installation and disassembly of the ejector rod 142.

As shown in FIG. 22 and FIG. 23, a first positioning post 147 is provided at the bottom wall of the first mounting hole, and the first end of the first elastic member 141 is sleeved on the outer periphery of the first positioning post 147. An end of the ejector rod 142 towards the first positioning post 147 is hollow; and an end of the ejector rod 142 towards the first positioning post 147 is sleeved on the second end of the first elastic member 141. By providing the first positioning post 147, the first elastic member 141 may be positioned to prevent the first end of the first elastic member 141 from deflecting during the extrusion process.

Figures 19, 20:
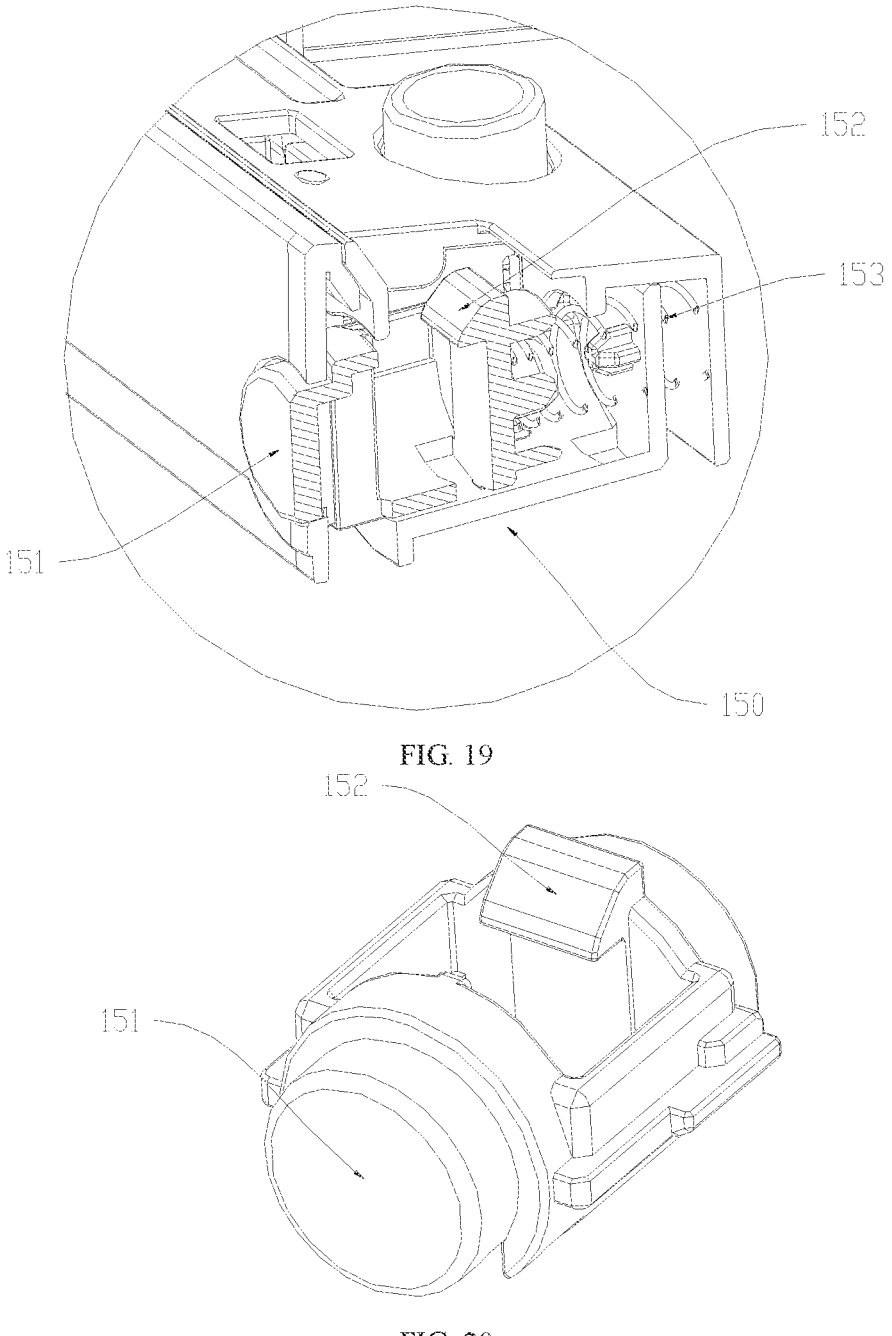
FIG. 19 is a first cross-sectional structural diagram of a locking component according to an embodiment of the present disclosure.
FIG. 20 is a three-dimensional schematic structural diagram of a button according to an embodiment of the present disclosure.

As shown in FIG. 19, FIG. 20 and FIG. 21, the top cover assembly further includes a locking component 150, the locking component 150 is switchable between a locked state and an unlocked state. In the locked state, the first top cover component 120 is locked to the first frame body 110 through the locking component 150; and in the unlocked state, the locking component 150 unlocks the locked state of the first top cover component 120.

As shown in FIG. 19, FIG. 20 and FIG. 21, the locking component 150 includes a button 151, a second elastic member 153 and a second snap tongue 154. A second mounting hole is provided at a side wall of the first frame body 110, and a through hole communicating with the second mounting hole is provided at a side of the first frame body 110 towards the first top cover component 120, and the through hole is used for allowing the second snap tongue 154 to enter and exit the second mounting hole.

The button 151 is provided inside the second mounting hole, and the button 151 is provided with a button limit portion 152, and the button limit portion 152 is matched with the second snap tongue 154 by a snap-fit. The second elastic member 153 is provided inside the second mounting hole, a first end of the second elastic member 153 abuts against the bottom wall of the second mounting hole, a second end of the second elastic member 153 abuts against the button 151, and the second snap tongue 154 is provided on the open side of the first top cover component 120. In the locked state, the button 151 is retracted into the second mounting hole, and the second snap tongue 154 is connected to the button limit portion 152 by a snap-fit; in the stretched state, the button 151 stretches out of the second mounting hole, and the second snap tongue 154 is separated from the button limit portion 152.

As shown in FIG. 1, FIG. 24, FIG. 26 and FIG. 27, the first top cover component includes the first housing 122, a second housing 123 and a first seal 124. The second housing 123 is provided at the first side of the first housing 122, and a side of the second housing 123 towards the first housing 122 has an opening. The first seal 124 is provided with at least two sealing surfaces, the first seal 124 is provided at the first side of the first housing 122, and a side of the opening is hermetically matched with the sealing surface of the first seal 124. In one embodiment, the first seal 124 is provided at the side of the opening, and the first side of the first housing 122 is hermetically matched with the sealing surface of the first seal 124.

By forming at least two sealing surfaces on the first seal 124, and by hermetically matching the sealing surface of the first seal 124 through the side of the opening or the first side of the first housing 122, at least two sealing structures may be formed. Even if one sealing structure fails, the other sealing structure may still play a sealing role, which effectively improves the sealing performance of the first top cover component and avoiding the problem of short circuits in a display panel and an electronic control console. Since at least two sealing surfaces are formed using one seal, compared with using seals for sealing, the number of seals is effectively reduced, simplifying the structure of the first cover component.

The first top cover component 120 is connected to the first frame body 110 through the flexible member 112, and the first top cover component 120 is switchable between the open state and the closed state. In the open state, the first top cover component 120 is located above the second top cover component, and an included angle between the first top cover component 120 and the second top cover component is less than a predetermined angle.

The first housing 122 is a rectangular plate-like structure, and the first housing 122 is provided with a mounting opening. A second side of the first housing 122 is an opening side of the first top cover component, and the first side of the first housing 122 is opposite to the second side of the first housing 122. An end of the flexible member 112 is connected to the first side of the first housing 122, and another end of the flexible member 112 is connected to the first frame body 110. The first housing 122 is switchable between the open state and the closed state. The flexible member 112 is a drawstring, and the flexible member 112 is used to connect the first housing 122 and the first frame body 110, the first housing 122 can be opened at a large angle, to facilitate the installation, maintenance, and testing of the water softening device.

Fasteners are provided at the first side of the first housing 122 at intervals, and snap tongues corresponding to the fasteners are provided at a side edge of the second housing 123, the snap tongues are connected with the fasteners by a snap-fit in one-to-one correspondence. The use of snap tongues and fasteners facilitates the installation and disassembly of the second housing 123. To further strengthen the connection between the second housing 123 and the first housing 122, screw holes are provided at intervals on the side edge of the second housing 123, and the second housing 123 is connected to the second housing 123 through screws inside the screw holes. The second housing 123 is fixed by using screws and fasteners to attach the second housing 123 to the first seal 124 closely, which increases the airtightness between the second housing 123 and the first housing 122.

Figures 24, 25:
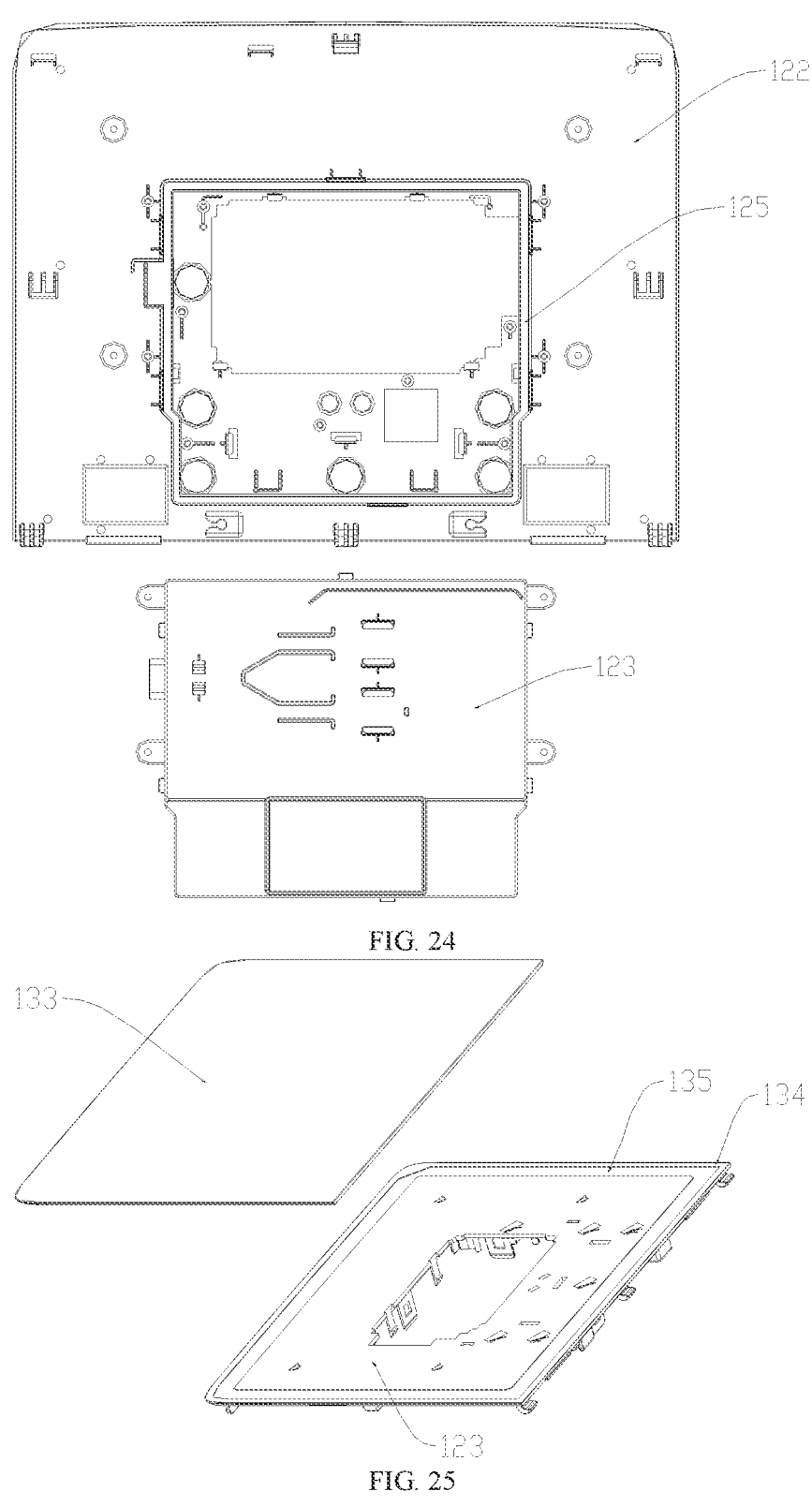
FIG. 24 is an exploded schematic structural diagram of a top cover component according to an embodiment of the present disclosure.
FIG. 25 is an exploded schematic structural diagram of a first housing and a light-transmitting panel according to an embodiment of the present disclosure.

As shown in FIG. 13 and FIG. 24, a receiving cavity is formed inside the second housing 123, the receiving cavity is used to mount a display component. The display component includes a control circuit board and a display electrically connected to each other. The first housing 122 is provided with the mounting opening, a size of the mounting opening is less than the size of the opening, and the display is embedded in the mounting opening.

As shown in FIG. 24, the first side of the first housing 122 is provided with a positioner 125, and the first seal 124 is provided inside the positioner 125. The positioner 125 is used to fix the first seal 124. The positioner 125 encloses around an outer periphery of the mounting opening, and the shape of the positioner 125 is the same to the shape of the opening. The positioner 125 may be circular or square, which is determined based on the shape of the opening.

It should be noted that the positioner 125 may be provided at the first side of the first housing 122, and may also be provided at the side of the opening. When the positioner 125 is provided at the side of the opening, a round of protruding ridges is provided on the first side of the first housing 122, and the shape of the protruding ridge is the same as the shape of the positioner 125.

As shown in FIG. 24, the positioner 125 is a positioning slot provided at the first side of the first housing 122, the positioning slot is integrally formed with the first housing 122, and the first seal 124 is snapped in the positioning slot. After the second housing 123 is mounted in place, the first seal 124 is not only hermetically matched with the side edge of the opening, but also hermetically matched with at least one slot wall and slot bottom of the positioning slot. By snapping the first seal 124 in the positioning slot, the first seal 124 can be mounted and disassembled conveniently, and the positioning slot may limit the first seal 124 during use, preventing the first seal 124 from displacing.

It should be noted that a height of the two slot walls of the positioning slot may be the same or different. The structure of the positioner 125 is not limited to the positioning slot, and the positioner 125 may also be a round of blocking sheets, the blocking sheets enclose around the periphery of the mounting opening, and are integrally formed with the first housing 122. The first seal 124 is provided on an inner side of the blocking sheet, i.e., the first seal 124 is provided at a side of the blocking sheet towards the mounting opening. After the second housing 123 is mounted in place, the first seal 124 is not only hermetically matched with the side edge of the opening, but also hermetically matched with inside of the blocking sheets and the first side of the first housing 122.

Figures 26, 27:
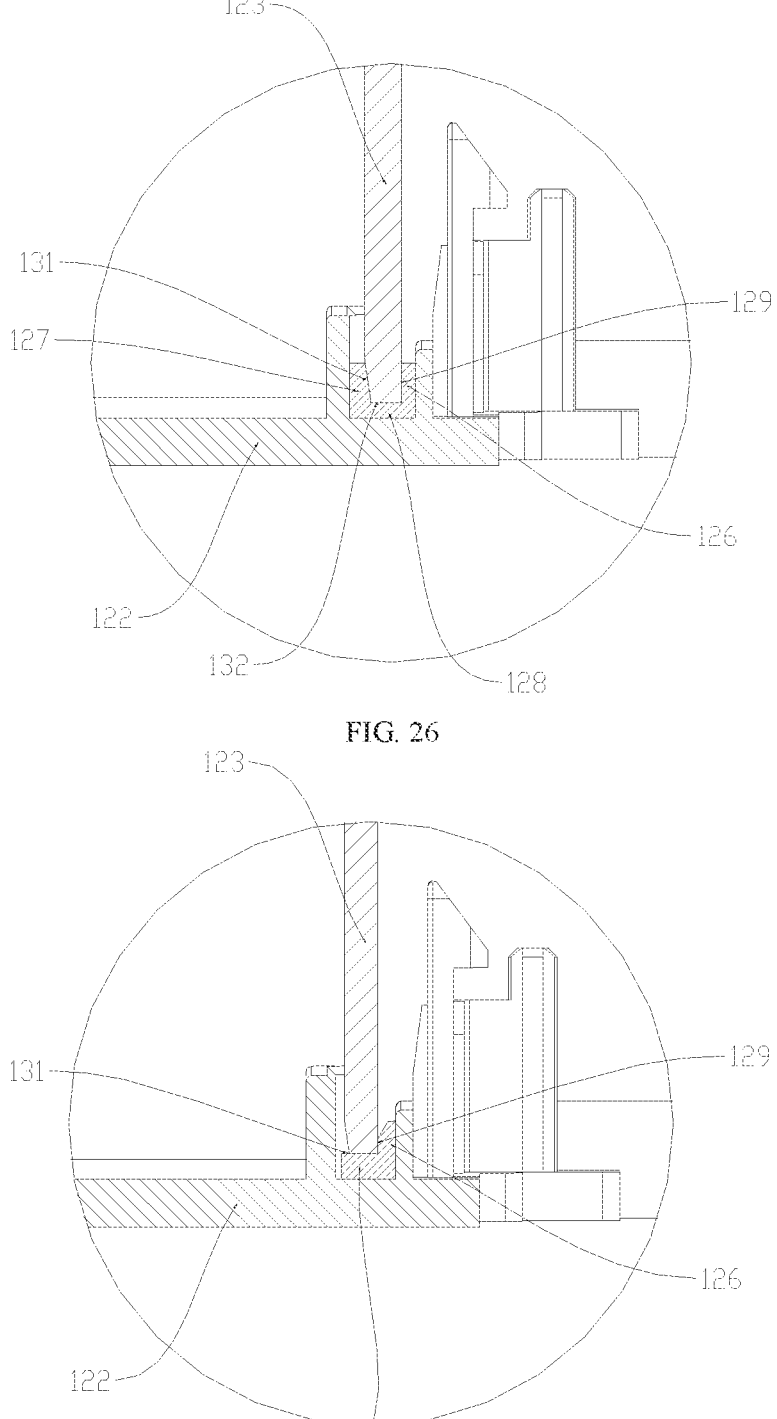
FIG. 26 is a schematic structural diagram of an assembly relationship between a first seal and an opening side according to an embodiment of the present disclosure.
FIG. 27 is a schematic structural diagram of an assembly relationship between a first seal and an opening side according to another embodiment of the present disclosure.

As shown in FIG. 27, the first seal 124 is snapped in the positioning slot, and the first seal 124 is provided with two sealing surfaces. The first seal 124 includes a first sealing portion 126 and a second sealing portion 127. A side of the second sealing portion 127 is connected to the side of the first sealing portion 126, the second sealing portion 127 is perpendicular to the first sealing portion 126, and the first seal 124 has an L-shaped cross-sectional area. The first sealing surface 129 is formed at the first sealing portion 126 towards the side edge of the opening, that is, the first sealing surface 129 is formed at the left side of the first sealing portion 126 in FIG. 27. The second sealing surface 131 is formed at the second sealing portion 127 towards the side edge of the opening, that is, the second sealing surface 131 is formed at the upper surface of the second sealing portion 127 in FIG. 27. When the second housing 123 is installed, a left side of the second housing 123 squeezes the first sealing surface 129 and is hermetically matched with the first sealing surface 129, and a right side of the first sealing portion 126 is hermetically matched with a slot wall. A lower surface of the side presses the second sealing surface 131 and is hermetically matched with the second sealing surface 131, and the lower surface of the second sealing portion 127 is hermetically matched with the slot bottom. Since two sealing structures are formed, the airtightness of the first top cover component is effectively improved.

The positioning slot is provided at the side of the opening, and a slot opening of the positioning slot faces the first side of the first housing 122. A round of protruding ridges are provided at the first side of the first housing 122, and the first seal 124 is snapped in the positioning slot. The structure of the first seal 124 is the same as the above embodiment. The first sealing surface 129 is formed at a side of the first sealing portion 126 towards the protruding ridges, and the second sealing surface 131 is formed at a side of the second sealing portion 127 towards the protruding ridges. Similarly, when the second housing 123 is installed, the protruding ridge presses the first sealing surface 129 and are hermetically matched with the first sealing surface 129. A side of the first sealing portion 126 away from the first sealing surface 129 is hermetically matched with the slot wall. The protruding ridges further squeeze the second sealing surface 131 and are hermetically matched with the second sealing surface 131. A side of the second sealing portion 127 away from the second sealing surface 131 is hermetically matched with the slot bottom.

The first sealing surface 129 is an inclined surface, and the first sealing portion 126 gradually becomes thicker along a direction in which the first sealing portion 126 approaches the second sealing portion 127. By providing the first sealing surface 129 as an inclined plane, the inclined surface may guide the side of the opening during the installation of the second housing 123, making it easier to mount the side edge of the opening in place.

It may be understood that a side edge of the opening towards the first sealing surface 129 is an inclined surface, and the side edge of the opening away from the first sealing surface 129 is a horizontal surface. The side edge of the opening has wedge-shaped cross-sectional area. When the side edge of the opening is just embedded in the positioning slot, since the thickness of the side edge is thin, the side may be easily embedded between the first sealing surface 129 and the slot wall of the positioning slot. As a depth of the side wall embedded in the positioning slot increases, the thickness of the side edge becomes thicker, and the side edge is hermetically matched with the first sealing surface 129, which effectively improves the sealing performance of the first top cover component.

As shown in FIG. 26, the first seal 124 is snapped in the positioning slot, and the first seal 124 is provided with three sealing surfaces. The first seal 124 includes the first sealing portion 126, the second sealing portion 127, and a third sealing portion 128. The second sealing portion 127 is disposed opposite to the first sealing portion 126, the second sealing portion 127 is parallel to the first sealing portion 126, a side of the third sealing portion 128 is connected to the first sealing portion 126, and the other side is connected to the second sealing portion 127. The first sealing portion 126, the second sealing portion 127, and the third sealing portion 128 form a seal having a groove-shaped cross-section.

As shown in FIG. 26, the side edge of the opening is embedded between the first sealing portion 126 and the second sealing portion 127, and the first sealing surface 129 is formed at a side of the first sealing portion 126 towards the side edge of the opening, that is, the first sealing surface 129 is formed at the left side of the first sealing portion 126. The second sealing surface 131 is formed at the second sealing portion 127 towards the side edge of the opening, that is, the second sealing surface 131 is formed at the right side of the second sealing portion 127. The third sealing surface 132 is formed at the third sealing portion 128 towards the side edge of the opening, that is, the third sealing surface 132 is formed at the upper surface of the third sealing portion 126. The first sealing surface 129 is hermetically matched with the right side of the side, and the first sealing portion 126 is hermetically matched with the right slot wall on a side away from the first sealing surface 129. The second sealing surface 131 is hermetically matched with the left side of the side, and the second sealing portion 127 is hermetically matched with the left slot wall on aside away from the second sealing surface 131. The third sealing surface 132 is hermetically matched with a lower surface of the side, and the lower surface of the third sealing portion 128 is hermetically matched with the slot bottom.

The positioning slot is provided at the side edge of the opening, a round of protruding ridges is provided at the first side of the first housing 122, and the first seal 124 is snapped in the positioning slot. The structure of the first seal 124 is the same as the previous embodiment. The protruding ridges are embedded between the first sealing portion 126 and the second sealing portion 127. The first sealing surface 129 is formed at a side of the first sealing portion 126 towards the protruding ridges, the second sealing surface 131 is formed at a side of the second sealing portion 127 towards the protruding ridges, and the third sealing surface 132 is formed at a side of the third sealing portion 128 towards the protruding ridges. The protruding ridges are hermetically matched with the three sealing surfaces respectively.

The first sealing surface 129 is an inclined surface, the second sealing surface 131 is horizontal surface, and a distance between the first sealing surface 129 and the second sealing surface 131 gradually decreases along the direction in which first sealing portion 126 approaches the third sealing portion 128. A width of the slot opening of the slot-type seal is larger, and a width of the slot bottom is smaller to conveniently embed the side edges of the opening or the protruding ridges into the slot-shaped seal.

As shown in FIG. 26, the second sealing surface 131 is an inclined surface, and the first sealing surface 129 is a horizontal surface. The distance between the first sealing surface 129 and the second sealing surface 131 gradually decreases along the direction in which first sealing portion 126 approaches the third sealing portion 128.

Both the first sealing surface 129 and the second sealing surface 131 are inclined surfaces, and the distance between the first sealing surface 129 and the second sealing surface 131 gradually decreases along the direction in which first sealing portion 126 approaches the third sealing portion 128.

It may be understood that to increase hermetically-matched area between the side edge of the opening and each sealing surface, the side edge of the opening is provided to have a wedge-shaped cross section. When the side edge of the opening is embedded between the first sealing portion 126 and the second sealing portion 127, the side edge of the opening may have a larger hermetically-matched area with the first sealing surface 129 and the second sealing surface 131.

As shown in FIG. 25, the first top cover component further includes a light-transmitting panel 133, the light-transmitting panel 133 is a plate-like structure made of light-transmitting materials. The light-transmitting panel 133 is provided at the second side of the first housing 122, and the light-transmitting panel 133 is hermetically matched with the second side of the first housing 122. The area of the light-transmitting panel 133 is larger than the area of the mounting opening to ensure that the mounting opening may be blocked. The light-transmitting panel 133 forms a sealed housing with the first housing 122 and the second housing 123.

A side edge of the second side of the first housing 122 is provided with a round of raised edge 134 surrounding the periphery of the light-transmitting panel 133. The shape of the raised edge 134 is the same as the shape of the light-transmitting panel 133, and the height of the raised edge 134 is the same as the thickness of the light-transmitting panel 133. A side of the raised edge 134 away from the first housing 122 and the side of the light-transmitting panel 133 away from the first housing 122 are in the same plane. Providing the raised edge 134 may not only limit the position of the light-transmitting panel 133, but also make the surface of the first top cover component smooth, improving the aesthetics of the first top cover component.

It may be understood that a side of the raised edge 134 towards the center of the first housing 122 is provided with a round of grooves 135. The grooves 135 are rectangular, and are suitable for receiving colloid for bonding the light-transmitting panel 133 to the first housing 122. By providing the grooves 135, more colloid may be filled between the light-transmitting panel 133 and the first housing 122, which improves the bonding strength between the light-transmitting panel 133 and the first housing 122 without increasing the total thickness between the light-transmitting panel 133 and the first housing 122.

The following describes a specific embodiment of the present disclosure in conjunction with FIG. 24 to FIG. 27. In FIG. 24 to FIG. 27, the first top cover component includes the first housing 122, the second housing 123, the first seal 124 and the light-transmitting panel 133. The first housing 122 has a rectangular-plate structure, and the first housing 122 is provided with a mounting opening. The first housing is connected to the first frame body 110 by the flexible member 112, the flexible member 112 is switchable between an open state and a closed state. The flexible member 112 is a drawstring, and the flexible member 112 is used to connect the first housing 122 and the first frame body 110, the first housing 122 can be opened at a large angle to facilitate the installation, maintenance, and testing of the water softening device. The first housing 122 and the first frame body 110 are both provided with snap slots 113, and two ends of the flexible member 112 are respectively connected to the corresponding snap slots 113. The limit block 114 is provided at the end of the flexible member 112 connected to the snap slot 113 by a snap-fit, and the width of the snap slot 113 is less than the width of the limit block 114. It is convenient to mount and disassemble the first housing 122 by matching the snap slot 113 with the flexible member 112 by a snap-fit.

The second housing 123 is provided on the first side of the first housing 122, and the receiving cavity is formed inside the second housing 123, the receiving cavity is used to mount the display component. The display component includes a control circuit board and a display electrically connected to each other. The size of the mounting opening is less than the size of the opening, and the display is embedded in the mounting opening. The side edge of the second housing 123 towards the first housing 122 opens. Fasteners are provided at the first side of the first housing 122 at intervals, and snap tongues corresponding to the fasteners are provided at the side edge of the second housing 123, and the snap tongues are connected with the fasteners by a snap-fit in one-to-one correspondence. The use of snap tongues and fasteners facilitates the installation and disassembly of the second housing 123. To further strengthen the connection between the second housing 123 and the first housing 122, screw holes are provided at intervals on the sides of the second housing 123, and the second housing 123 is connected to the second housing 123 through screws inside the screw holes. The second housing 123 is fixed using screws and fasteners to attach the second housing 123 to the first seal 124 closely, which increase the airtightness between the second housing 123 and the first housing 122.

As shown in FIG. 29, the regeneration assembly includes a salt well 500, a salt valve provided inside the salt well 500, and a salt dissolution grille located at the bottom of the first accommodating chamber 101. The water softening assembly 400 includes the resin tank 401 and a control assembly 600 connected to the resin tank 401. The salt well 500 is provided inside the first accommodating chamber 101, and the resin tank 401 communicates with the first accommodating chamber 101. The first accommodating chamber 101 is used to receive salt particles. In some embodiments, the resin tank 401 is provided inside the first accommodating chamber 101.

During operation, the calcium and magnesium ions in the water flowing through resin tank 401 are exchanged with the resin inside and adsorbed, the concentration of calcium and magnesium ions in the water is reduced and the water is softened. After the resin in resin tank 401 is filled with calcium and magnesium ions, the dissolved salt water in the first accommodating chamber 101 is sucked into resin tank 401 through the salt valve in salt well 500, and the resin in resin tank 401 is regenerated to repeatedly utilize the resin in resin tank 401.

The box body is provided with a salt adding opening communicating with the first accommodating chamber 101, and salt is added to the first accommodating chamber 101 inside the box body 200 through the salt adding opening. When salt is added during the installation and use of the water softening device, salt particles will accumulate in a mountain-like shape in the first accommodating chamber 101, which affects the loading capacity of salt particles in the first accommodating chamber 101 and the detection accuracy of the salt level sensor, to affect the salt dissolution effect.

In this regard, an embodiment of the present disclosure provides a grille component 170 for the water softening device. Referring to FIG. 36 to FIG. 42, the grille component 170 is provided at the second opening, the grille component 170 includes an outer frame 410 and circular partitions 420, circular partitions 420 are provided at intervals from the inside out, and the outer frame 410 is provided on an outside of circular partitions 420. A passage 430 through which salt particles pass is formed between each adjacent circular partition 420 and between the outer frame 410 and an outermost circular partition 420.

Figure 31:
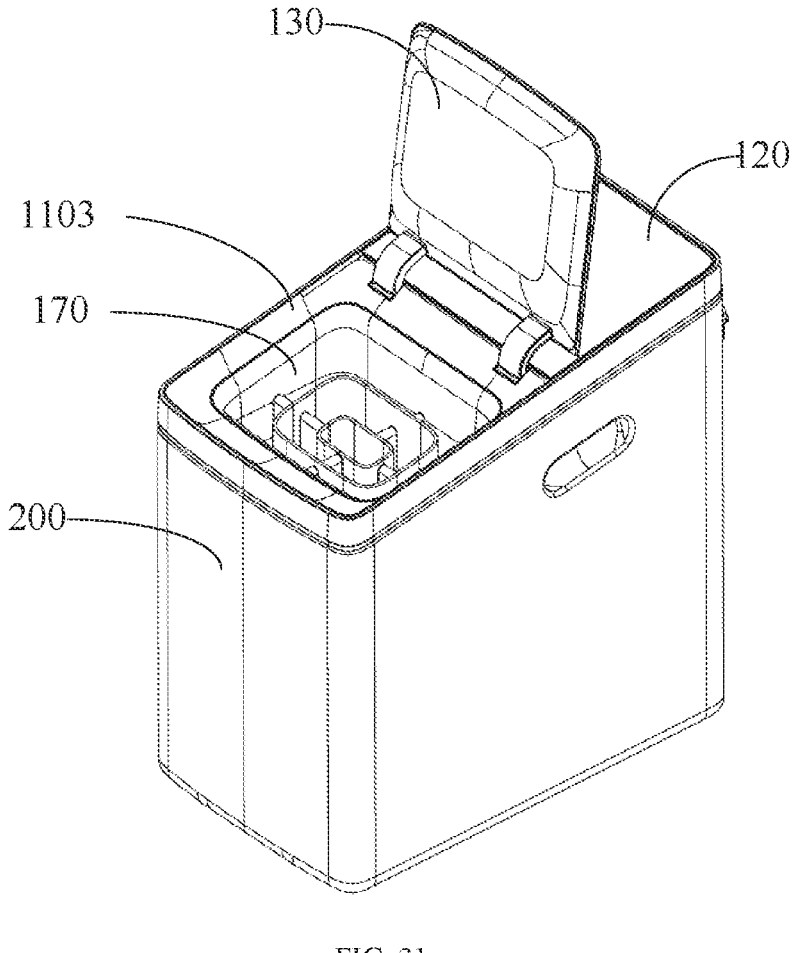
FIG. 31 is a three-dimensional schematic diagram of a water softening device shown in FIG. 30.
Figure 32:
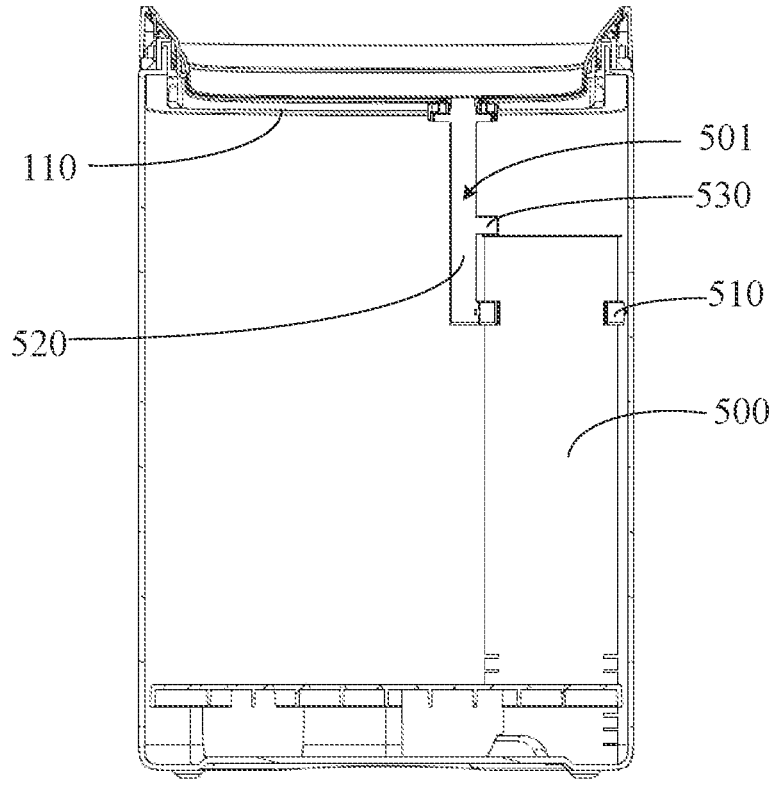
FIG. 32 is a third schematic structural diagram of a water softening device according to an embodiment of the present disclosure.
Figure 33:
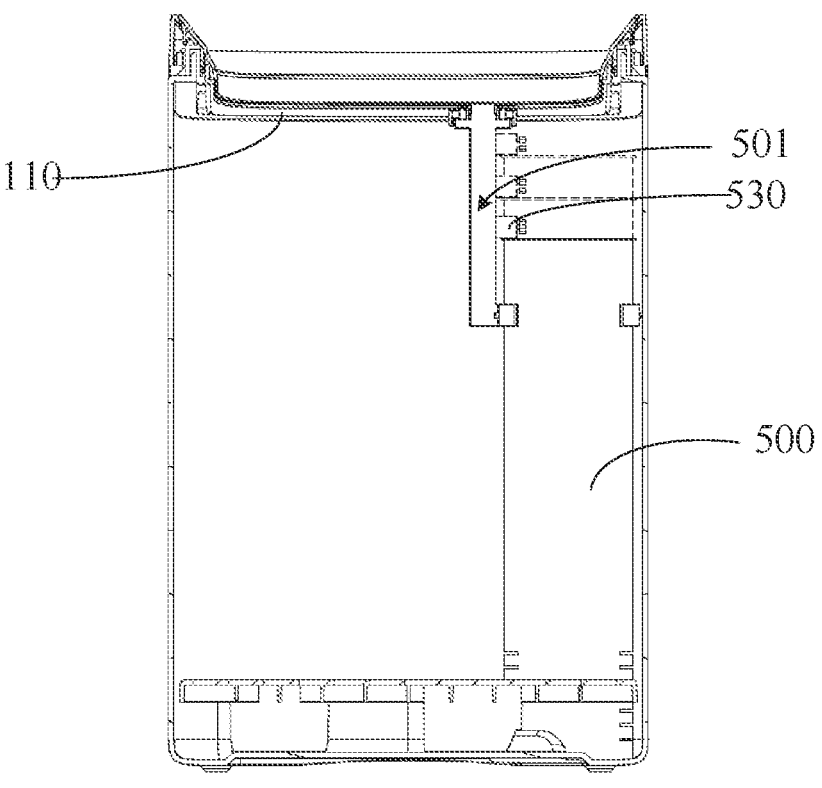
FIG. 33 is a fourth schematic structural diagram of a water softening device according to an embodiment of the present disclosure.
Figure 34:
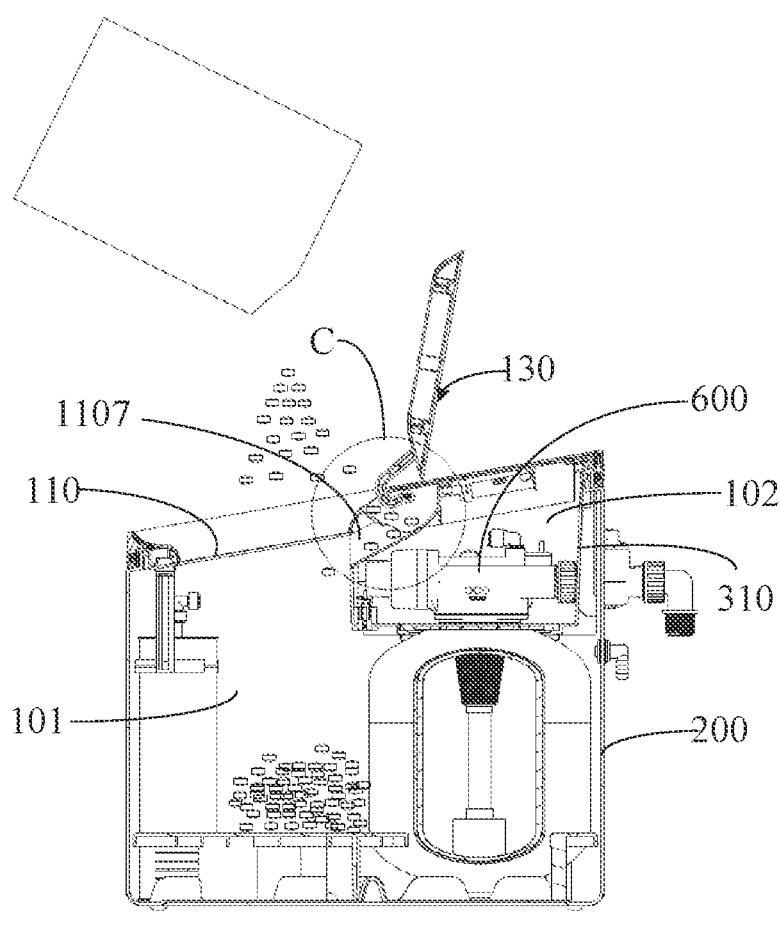
FIG. 34 is a fifth schematic structural diagram of a water softening device according to an embodiment of the present disclosure.

The grille component 170 in FIG. 31 includes outer walls, the outer walls are connected to form the outer frame 410. Circular partitions 420 are sleeved sequentially from the inside out. One passage 430 is formed inside the innermost circular partition 420, and one passage 430 is formed between each adjacent circular partition 420 among circular partitions 420. One passage 430 is formed between the outermost circular partition 420 and the outer frame 410. Thus, the grille component 170 forms passages 430 radially distributed from the inside out.

In the grille component 170 according to an embodiment of the present disclosure, passages 430 radially distributed from the inside out are formed by providing circular partitions 420 on the inner side of the outer frame 410, and providing the circular partitions 420 at intervals from the inside out. The grille component 170 may be mounted at the salt adding opening of the box body 200 and communicate with the first accommodating chamber 101 for receiving salt particles. When salt is poured into the salt adding opening, a large number of salt particles are dispersed by the grille component 170 and distributed into each of the passages 430, and dispersedly drops into the first accommodating chamber 101, and the salt particles are distributed more uniformly.

In some embodiments, a width of the passage 430) and a length of the passage 430 are not less than twice a maximum size of the salt particles. In such way, the salt particles may pass through passage 430 more smoothly, and the salt particles passing through passage 430 may effectively collide with the side walls of the passage 430, and the salt particles drops dispersedly into the first accommodating chamber 101.

A specific shape of the outer frame 410 may be adaptively provided according to a specific shape of the salt adding opening, and a cross-sectional shape of the outer frame 410 may be rectangular, circular, triangular, elliptical, etc. The embodiments of the present disclosure do not provide specific limitations on this. A cross-sectional shape of the circular partition 420 and the outer frame 410 may be the same or different. The cross-sectional shape of the circular partition 420 may also be rectangular, circular, triangular, elliptical, etc. The embodiments of the present disclosure do not provide specific limitations on this. The cross-section herein refers to a cross-section of the circular partition 420 and the outer frame 410) in an axial direction perpendicular to the circular partition 420.

Figures 35, 36:
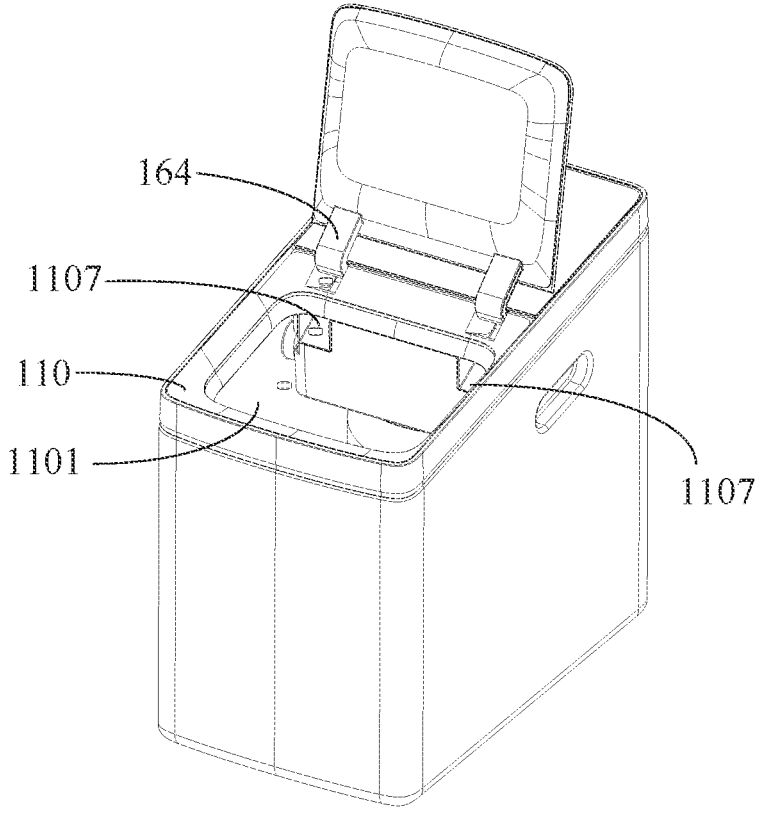
FIG. 35 is a three-dimensional schematic diagram of a water softening device shown in FIG. 34.
FIG. 36 is a first schematic structural diagram of a grille assembly according to an embodiment of the present disclosure.
Figure 38:
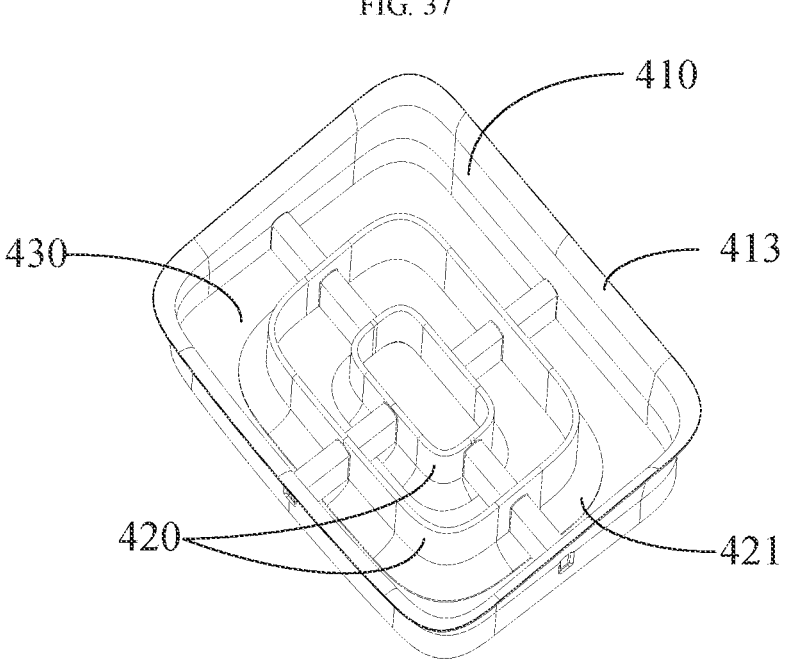
FIG. 38 is a second schematic structural diagram of a grille assembly according to an embodiment of the present disclosure.
Figures 39, 40:
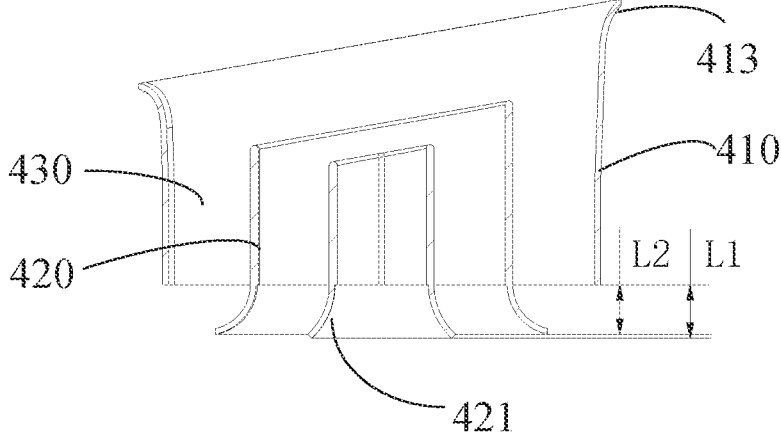
FIG. 39 is a cross-sectional diagram of a grille assembly shown in FIG. 38.
FIG. 40 is a third schematic structural diagram of a grille assembly according to an embodiment of the present disclosure.
Figure 41:
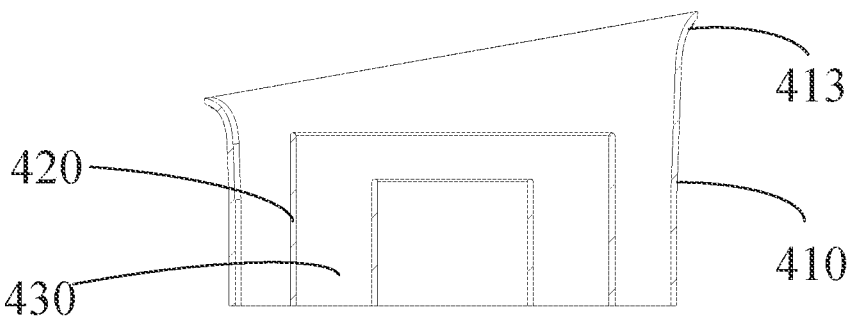
FIG. 41 is a cross-sectional diagram of a grille assembly shown in FIG. 40.
Figure 42:
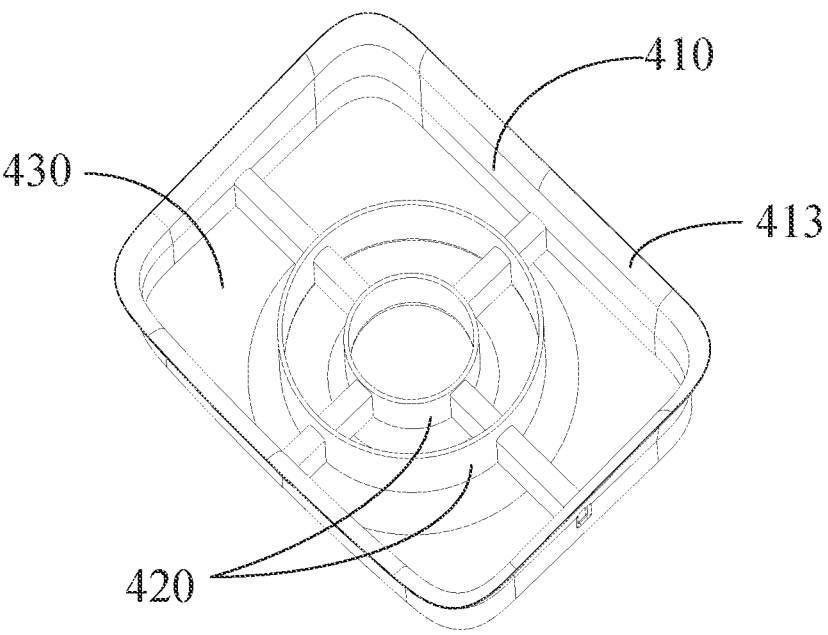
FIG. 42 is a fourth schematic structural diagram of a grille assembly according to an embodiment of the present disclosure.

For example, as shown in FIG. 36 and FIG. 38, both the outer frame 410 and the circular partition 420 have rectangular the cross-sectional shapes. For example, as shown in FIG. 40 and FIG. 42, the outer frame 410 has a rectangular the cross-sectional shape, and the circular partition 420 has a circular cross-sectional shape.

As shown in FIG. 36, FIG. 38, FIG. 40 and FIG. 42, the outer frame 410 is connected to the outermost circular partition 420, and two adjacent circular partitions 420 are connected to each other. Each of the passages 430 is provided with spokes 440, two adjacent circular partitions 420 are connected by spokes 440, and the outer frame 410 and the outermost circular partition 420 are connected by spokes 440. In such way, the strength of the grille component 170 may be increased, and the deformation of the outer frame 410 and the circular partition 420 may be reduced.

In some embodiments, spokes 440 within each of the passages 430 are uniformly distributed around the circumferential direction of the circular partition 420, spokes 440 within each of the passages 430 are radially distributed centered around the axis of the circular partition 420 towards the outer frame 410, and the structure of the grille assembly may be more uniform and stable within the cross-sectional range.

It may be understood that spokes 440 within each of the passages 430 are symmetrically distributed relative to the axis of the circular partition 420. For example, each salt pouring passage 430 is provided with four spokes 440, and the spokes 440 are distributed in a cross-shaped pattern. The number of spokes 440 may be set according to the size and structural strength required by the outer frame 410.

In some embodiments, spokes 440 within two adjacent passages 430 are provided in one-to-one correspondence, and spokes 440 provided correspondingly are collinear in a length direction of the spokes 440, and all spokes 440 of the grille component 170 are radially distributed towards the outer frame 410 centered around the axis of the circular partition 420.

Figure 43:
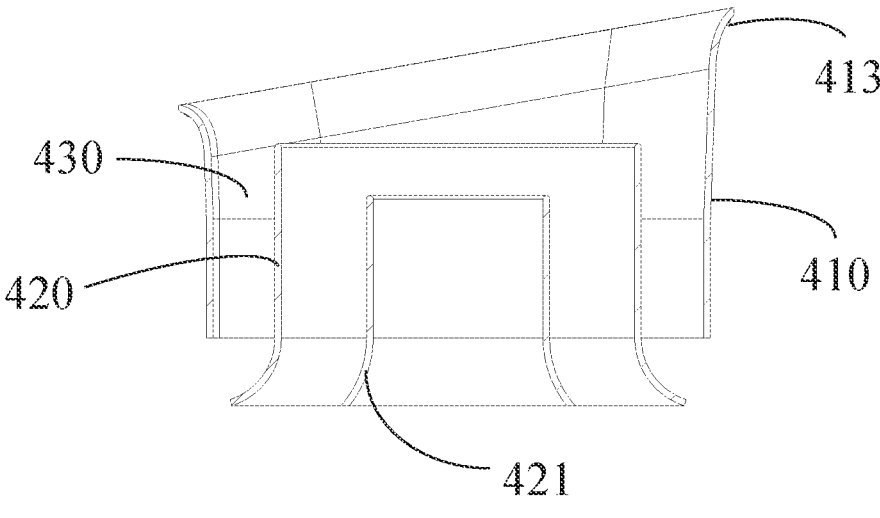
FIG. 43 is a cross-sectional diagram of a grille assembly shown in FIG. 42.

As shown in FIG. 39 and FIG. 43, the circular partition 420 has an outlet end corresponding to an outlet of the passage 430. The outlet end of the circular partition 420 is located outside the outer frame 410, and the circular partition 420 includes a flow guide segment 421 provided along an axis direction of the circular partition 420. An end of the flow guide segment 421 close to the outlet of the passage 430 forms the outlet end of the circular partition 420. The flow guide segment 421 is divergent in a direction towards the outlet end of the circular partition 420, i.e., a diameter of the flow guide segment 421 gradually increases in the direction towards the outlet end of the circular partition 420. The salt particles entering each of the passages 430 move along the passage 430 and collide back and forth between the side walls of the passage 430. Some salt particles may disperse and move towards an axial outer side of the circular partition 420 by the flow guide segment 421, and the salt particles passing through the grille component 170 may be laid in a larger area and more evenly into the first containment chamber 101.

In some embodiments, the side walls on either side of the flow guide segment 421 has a parabolic shape on a longitudinal section of the circular partition 420. The longitudinal section of the circular partition 420 referred to herein a cross section parallel to the axis of the circular partition 420. The flow guide segment 421 forms a trumpet-like structure on the longitudinal section of the circular partition 420 as a whole, which allows salt particles to move further towards the axial outer side of the circular partition 420 by the flow guide segment 421. The side walls on either side of the flow guide segment 421 may also be in a straight-line shape on the longitudinal section of the circular partition 420, that is, the entire flow guide segment 421 forms a conical structure on the longitudinal section of the circular partition 420.

Figure 37:
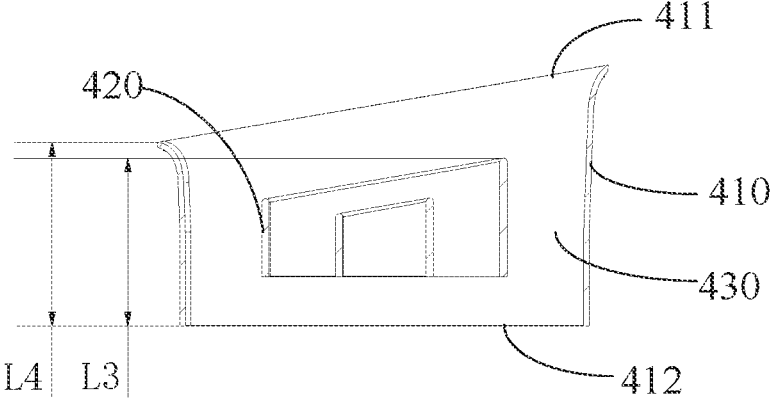
FIG. 37 is a cross-sectional diagram of a grille assembly shown in FIG. 36.

It should be noted that in a case that the aperture of the flow guide segment 421 remains unchanged in the direction towards the outlet end of the circular partition 420, the outlet end of the circular partition 420 may be located inside the outer frame 410, as shown in FIG. 36 and FIG. 37, and may also extend outside the outer frame 410).

As shown in FIG. 37 and FIG. 39, the outer frame 410 has a second end 412 corresponding to the outlet of the passage 430. A relative distance between the outlet end of the inner circular partition 420 and the second end 412 of the outer frame 410 is greater than a relative distance between the outlet end of the outer circular partition 420 and the second end 412 of the outer frame 410 in two adjacent circular partitions 420. In such way, salt particles may be reduced or prevented from bouncing back when collide with the outer circular partition 420 at the outlet end of the guide passage 430, enabling salt particles to move outward smoothly.

Taking the grille component 170 shown in FIG. 39 as a specific example, the number of circular partitions 420 is two. The relative distance between the outlet end of the inner circular partition 420 and the second end 412 of the outer frame 410 is L1, the relative distance between the outlet end of the outer circular partition 420 and the second end 412 of the outer frame 410 is L2, and L1>L2.

As shown in FIG. 37, FIG. 39, FIG. 41, and FIG. 43, the circular partition 420) has an inlet end corresponding to an inlet of the passage 430. The outer frame 410 has a first end 411 corresponding to the inlet of the passage 430 and the second end 412 corresponding to the outlet of the passage 430. The inlet end of the passage 430 is located between the first end 411 and the second end 412 of outer frame 410. The inlet end of the circular partition 420 is located inside the outer frame 410, and a relative distance between the inlet end of the circular partition 420 and the second end 412 of the outer frame 410 is less than a relative distance between the first end 411 and the second end 412 of the outer frame 410.

It should be noted that when the grille component 170 is in use, the circular partition 420 and the outer frame 410 are provided in a vertical direction. The inlet end of the circular partition 420 is located between the first end 411 and the second end 412 of the outer frame 410, and the highest position of the inlet end of the circular partition 420 is lower than the lowest position of the first end 411 of the outer frame 410, which may reduce or prevent salt particles from rolling out of the outer frame 410 during the salt pouring process. The interference between the circular partition 420 and the inner surface of the second top cover component 130 may also be avoided.

Taking the grille assembly shown in FIG. 37 as a specific example, the relative distance between the highest position of the inlet end of any circular partition 420 and the second end 412 of the outer frame 410 is L3, the relative distance between the lowest position of the first end 411 of the outer frame 410 and the second end 412 is L4, where L3<L4.

The embodiments of the present disclosure do not specify a height relationship between circular partitions 420. For example, as shown in FIG. 36 to FIG. 43, the relative distance between the inlet end of the inner circular partition 420 and the first end 411 of the outer frame 410 is less than the distance between the inlet end of the outer circular partition 420 and the first end 411 of the outer frame 410 in each adjacent circular partition 420, which allows the grille component 170 to be matched with an arched inner surface of the second top cover component 130. The relative distance between the inlet end of the inner circular partition 420 and the first end 411 of the outer frame 410 in two adjacent circular partitions 420 may also be greater than the distance between the inlet end of the outer circular partition 420 and the first end 411 of the outer frame 410.

As shown in FIG. 37 and FIG. 39, the first end 411 of the outer frame 410 is inclined relative to the second end 412. An end surface of the inlet end of each circular partition 420 corresponding to an inlet of the passage 430 is parallel to an end surface of the first end 411 of the outer frame 410, which may enhance the appearance consistency between the inlet end of the circular partition 420 and the first end 411 of the outer frame 410.

In some embodiments, the outer frame 410 includes a limit segment 413 extending along an axis direction of the outer frame 410. The limit segment 413 is divergent in a direction towards the inlet of the passage 430. In an embodiment, and the first end 411 of the outer frame 410 is formed at an end of the limit segment 413 close to the inlet of the passage 430. The limit segment 413 may also be a flange protruding from the outer side of the outer frame 410.

It may be understood that a circular flange extending towards the outer side of the outer frame 410 is provided at an end of the outer frame 410 close to the inlet of the passage 430. The limit segment 413 is used for to be matched with the salt adding opening on the box body, and the grille component 170 may be hung on the first frame body 110 through the limit segment 413, without connecting the first frame body 110 to the grille component 170 through other connectors, which conveniently assemble and disassemble the grille component 170.

Figure 30:
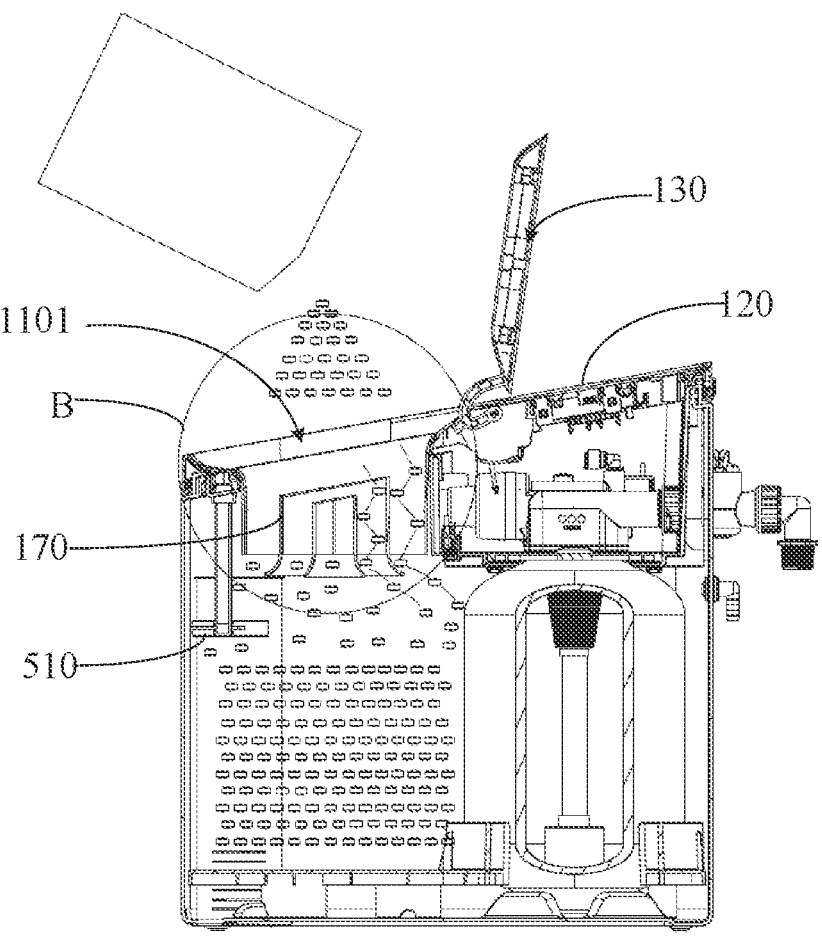
FIG. 30 is a second schematic structural diagram of a water softening device according to an embodiment of the present disclosure.

In some embodiments, as shown in FIG. 29 and FIG. 30, the first frame body 110 is provided with the salt adding opening, and the salt adding opening is connected to the first accommodating chamber 101. The grille component 170 is provided at the salt adding opening, and the salt adding opening and the passage 430) communicate with the first accommodating chamber 101.

A second opening 1101 is formed at the first frame body 110 (referring to FIG. 35), and may serve as the salt adding opening for the water softening device. The grille component 170) described in the above embodiments may also be considered as a component of the first frame body 110.

When salt is added during the installation and use of the water softening device, to make the salt particles to be flattened as possible in the first storage chamber 101, certain operations during the salt pouring process may cause the salt particles to roll out of the box body, bringing additional cleaning work to the user and affecting the user experience.

Figure 49:
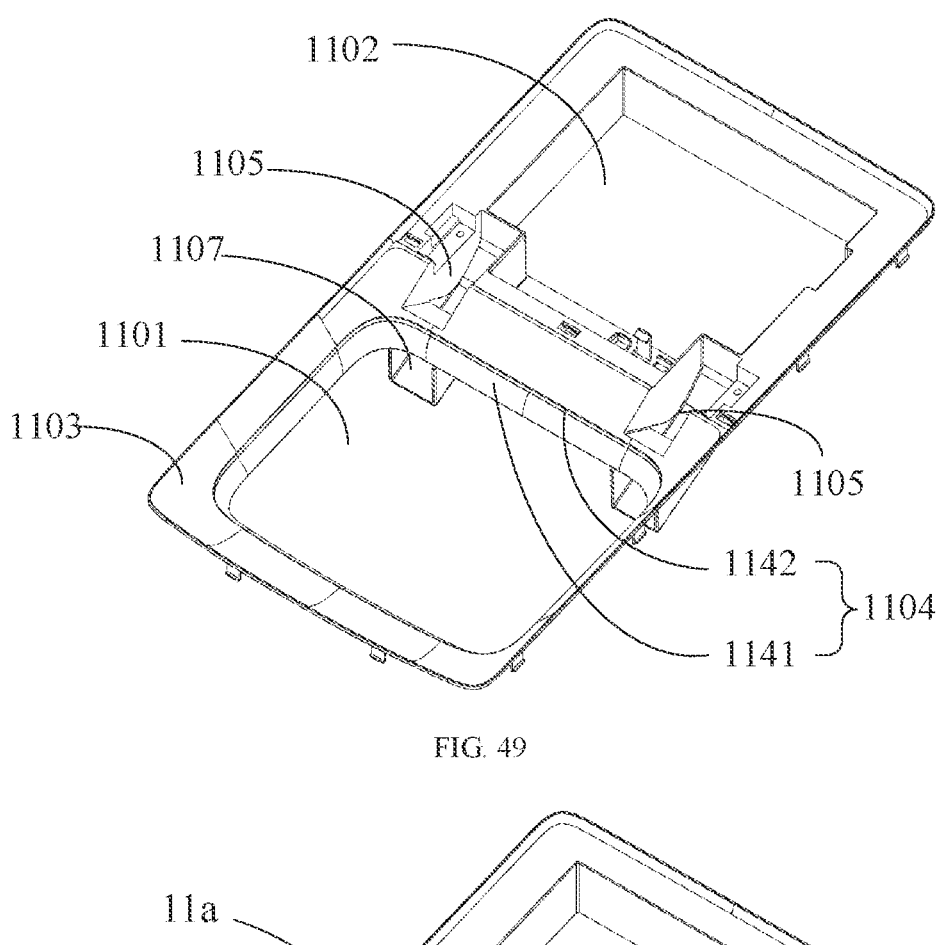
FIG. 49 is a first schematic diagram of the assembly of a flow guide member and a middle frame of a water softening device according to an embodiment of the present disclosure.
Figure 51:
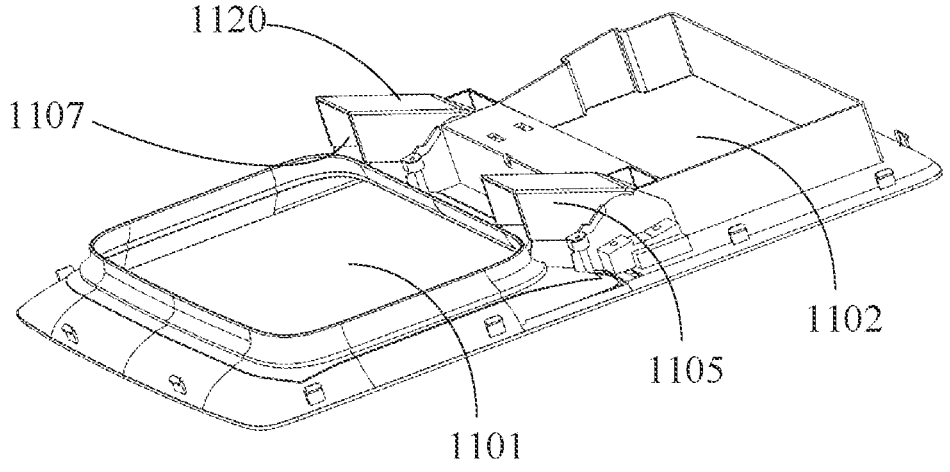
FIG. 51 is a schematic diagram of the assembly of a flow guide member and a middle frame of a water softening device, from another perspective, according to an embodiment of the present disclosure.

As shown in FIG. 49 and FIG. 51, the first frame body 110 includes a first side 11a and a second side 11b opposite to each other, as well as the second opening 1101 penetrating through the first side 11a and the second side 11b. The second side 11b of the first frame body 110 is connected to the top of the box body 200. A circular concave surface 1103 surrounding the second opening 1101 is provided at the first side 11a of the first frame body 110, and a height of the second opening 1101 relative to the box body 200 is less than a height of the circular concave surface 1103 relative to the box body 200. The outer frame 410 of the grille component 170 is provided at the second opening 1101 to communicate the passage 430 with the interior of the box body 200.

The first accommodating chamber 101 is formed between the first frame body 110 and the box body 200, and the second opening 1101 communicates with the first accommodating chamber 101. The second opening 1101 may form the salt adding opening for the water softening device. In some embodiments, the inner edge of the circular concave surface 1103 is adjacent to the outer edge of the second opening 1101.

The circular concave surface 1103 forms an opening structure around the second opening 1101. For example, the circular concave surface 1103 transitions in an arc from the end away from the second opening 1101 to the end close to the second opening 1101. For another example, the circular concave surface 1103 transitions in a straight line from the end away from the second opening 1101 to the end close to the second opening 1101, that is, the circular concave surface 1103 is a conical surface. On one hand, salt particles that fall onto the circular concave surface 1103 may slide into the salt adding opening along the circular concave surface 1103. On the other hand, the circular concave surface 1103 may be matched with the inner surface of the second top cover component 130 mounted on the first frame body 110, which effectively limits the movement of the second top cover component 130 and improves the reliability of the second top cover component 130.

For another example, the circular concave surface 1103 transitions in a straight line from the end away from the second opening 1101 to the end close to the second opening 1101. The circular concave 1103 is constructed as an inverted conical structure.

The first frame body 110 may be integrally formed with, fixedly connected, or detachably connected to the grille component 170. Passages 430 are formed inside the grille component 170. When salt is poured into the salt adding opening, a large number of salt particles are dispersed by the grille component 170 and distributed into the box body 200 through each of the passages 430. It should be noted that the grille component 170 may be a uniform grid-like structure, such as a honeycomb-like structure, or may be a grille component 170 described in any of the above embodiments to achieve better division effects.

In the water softening device according to an embodiment of the present disclosure, by providing the circular concave surface 1103 surrounding the second opening 1101 on the first side 11a of the first frame body 110 away from the box body 200 and forming the opening structure on the circum-
ference of the second opening 1101, the salt pouring area is
increased. Some salt particles falling on the periphery of the
second opening 1101 may be guided to the second opening
1101, which reduces the possibility of salt particles falling
outside the water softening device, and is beneficial in
maintaining the salt adding opening of the water softening
device clean. In one embodiment, salt particles may be
easily distributed to the edge passage 430 of the grille
component 170, which improves the distribution uniformity
of salt particles.

Figure 54:
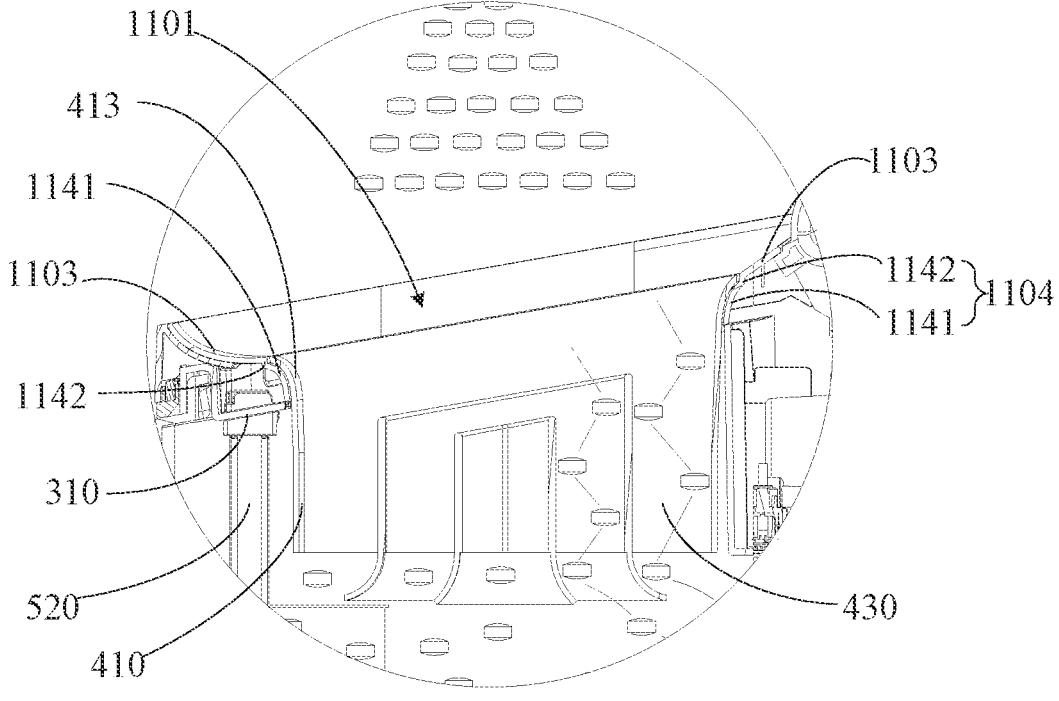
FIG. 54 is a partially enlarged diagram of part B in FIG. 30.

As shown in FIG. 30 and FIG. 54, the outer frame 410
passes through the second opening 1101, and the outer frame
410 includes a limit segment 413 extending along the axis
direction of the outer frame 410. The limit segment 413 gradually expands in a direction towards the inlet of the
passage 430. The first frame body 110 is provided with a
limiting structure (referring to a first stop segment 1141 and
a second stop segment 1142 in FIG. 49), and the limiting
structure is matched with the limit segment 413 to limit the
movement of the grille component 170 relative to the first
frame body 110 towards the box body 200.

When the water softening device is actually used, the
second opening 1101 faces upwards, and the grille compo-
nent 170 may be lowered from above the first frame body
110 into the second opening 1101. The first frame body 110
prevents the grille component 170 from continuing to move
towards the box body 200 relative to the first frame body 110
through a limit structure, that is, the grille component 170
may be hung on the first frame body 110. The grille
component 170 may be directly removed upwards during
disassembly. The limit structure may also be a bolt threaded
to the first frame body 110, and a first segment of the outer
frame 410 is detachably connected to the first frame body
110 through the bolt.

The limit structure is a circular limit plate 1104 commu-
nicating with the second opening 1101. An end of the
circular limit plate 1104 is connected to an end of the
circular concave surface 1103 close to the second opening
1101 and extends in a direction away from the circular
concave surface 1103. The circular limit plate 1104 has the
first stop segment 1141 extending along an axis direction of
the circular limit plate 1104. The first stop segment 1141 is
gradually reduced in a direction towards the outlet of the
passage 430, and an inner surface of the first stop segment
1141 is matched with an outer surface of the limit segment
413. The circular limit plate 1104 is fixedly connected to or
integrally formed with the first frame body 110. The first
stop segment 1141 is used to limit the movement of the limit
segment 413 relative to the first frame body 110 towards the
box body 200, and prevent the grille component 170 from
falling into the box body 200.

It may be understood that a circular limiting surface is
formed on an inner side of the first stop segment 1141.
During using, the limit segment 413 is carried on the circular
limiting surface. In the present embodiment, the grille
component 170 may be carried through the entire annular
limiting surface of the first stop segment 1141, to improve
the connection strength between the first frame body 110 and
the grille component 170. It is beneficial for the salt particles
on the circular concave surface to slide through the circular
concave surface 1103 and the first stop segment 1141 in
sequence into the passage 430 of the grille component 170.

In some embodiments, the circular limit plate 1104 has a
second stop segment 1142 extending along an axis direction
of the circular limit plate 1104, the second stop segment
1142 connects the circular concave surface 1103 and the first stop segment 1141, and the second stop segment 1142 is
used to limit an axis offset of the limit segment 413 relative
to the second opening 1101. It may be understood that a
circular limiting surface is formed at an inner side of the
second stop segment 1142, and the circular limiting surface
surrounds an outer end of the limit segment 413. A shape of
the circular limiting surface is matched with a shape of the
end of the limit segment 413, to limit the grille component
170 from shaking in the first frame body 110.

After water enters the water softening device, the water
may be accumulated on a surface of the housing of the water
softening device. The accumulated water may easily enter
the control assembly 600 and other electrical components
installed in the box body 200, which affects the performance
of the electrical component and even causes short circuit in
the electrical component. The safety performance of the
water softening device is affected.

Figure 53:
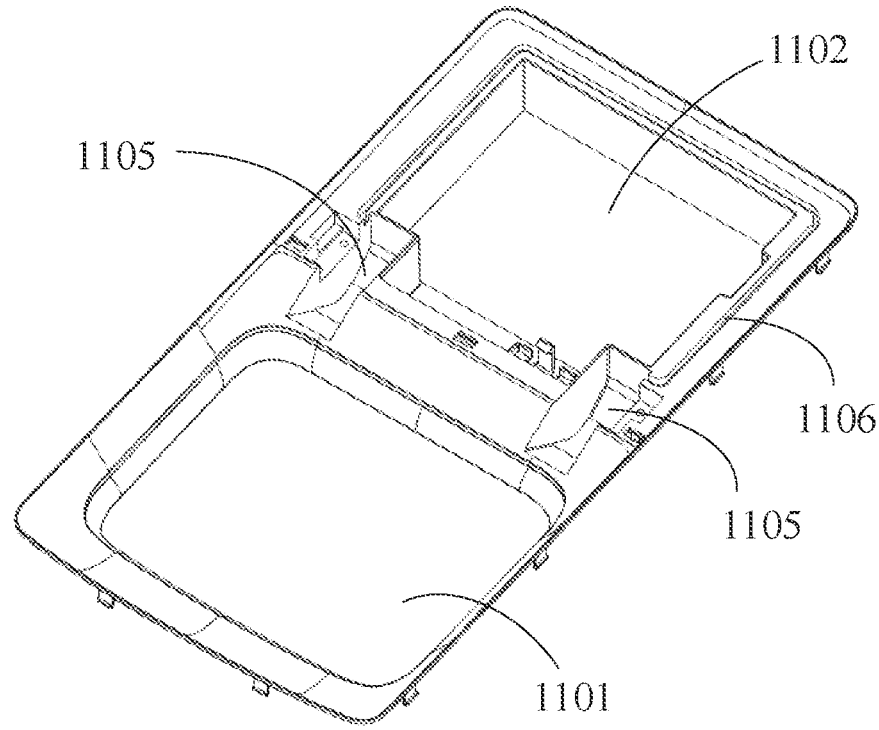
FIG. 53 is a schematic structural diagram of a middle frame of the water softening device according to an embodiment of the present disclosure.

To solve such problem, referring to FIG. 29 and FIG. 53,
the second side 11b of the first frame body 110 is detachably
connected to the inner frame body 310, and a second
accommodating chamber 102 is formed between the inner
frame body 310 and the top cover assembly 100. The first
side 11a of the first frame body 110 faces away from the box
body 200, and the second side 11b of the first frame body
110 faces a side of the box body 200.

The first frame body 110 is provided with a first opening
1102, a crank arm slot 1105 and a flow guide slot 1106. The
first opening 1102 communicates with the second accom-
modating chamber 102. The crank arm slot 1105 is separated
from the second accommodating chamber 102 and commu-
nicates with the first accommodating chamber 101, and the
flow guide slot 1106 communicates with the crank arm slot
1105. The flow guide slot 1106 is provided on the first side
11a of the first frame body 110 and at least a side of the first
opening 1102. The crank arm slot 1105 is used to receive the
crank arm 164 of the second top cover component 130, and
the crank arm 164 is rotatably mounted on the first frame
body 110.

The first opening 1102 is a maintenance opening for the
water softening device, and the control assembly 600 is
located in the second accommodating chamber 102. The
control assembly 600 may be maintained through the first
opening 1102. The second side 11b of the first frame body
110 faces the box body 200. Both the first opening 1102 and
the crank arm slot 1105 penetrate through the first side 11a
and the second side 11b.

In the embodiment of the present disclosure, by providing
a flow guide slot 1106 communicating with the crank arm
slot 1105 on the first side 11a of the first frame body 110, the
flow guide slot 1106 may converge water droplets splashed
onto the first side 11a of the first frame body 110 and guide
the converged water into the first accommodating chamber
101, which effectively prevents water from entering the
second accommodating chamber 102 from the first opening
1102, and avoids the risk of electric shock caused by
electrical components exposed to water.

The inner frame body 310 is disposed between the first
frame body 110 and the box body 200, and the inner frame
body 310 is located at the second side 11b of the first frame
body 110. The second accommodating chamber 102 is
formed between the inner frame body 310 and the first frame
body 110 and the second accommodating chamber 102 is
used to receive the control assembly 600. The first accom-
modating chamber 101 is formed between the inner frame
body 310 and the box body 200. The inner frame body 310
is provided with a third through opening corresponding to the second opening 1101, and the second opening 1101 communicates with the third through opening to form the salt adding opening.

In some embodiments, a resin tank 401 is provided inside the box body 200. A part of the resin tank 401 is located in the first accommodating chamber 101, and another portion thereof is located in the second accommodating chamber 102 and connected to the control assembly 600. The control assembly 600 is connected to the salt valves in the resin tank 401 and the salt well 500, respectively.

The number of the crank arm slots 1105 is two, and the flow guide slot 1106 is wound around a circumference of the first opening 1102. An end of the flow guide slot 1106 communicates with one of the crank arm slots 1105, and another end of the flow guide slot 1106 communicates with the other crank arm slot 1105. The flow guide slot 1106 is a U-shaped slot structure having both ends communicating with two crank arm slots 1105. For example, the first opening 1102 is rectangular, two crank arm slots 1105 are provided at a side of the first opening 1102, and the flow guide slot 1106 encloses the other three sides of the first opening 1102, which may effectively prevent accumulated water around the first opening 1102 from flowing into the second accommodating chamber 102.

In some embodiments, a depth of a part of the flow guide slot 1106 close to the crank arm slot 1105 is greater than a depth of a part of the flow guide slot 1106 away from the crank arm slot 1105. When the first side 11a of the first frame body 110 is basically in a horizontal state, a bottom of the flow guide slot 1106 may have a certain slope or gradient, which accelerates the drainage speed of the flow guide slot 1106.

In some embodiments, the first frame body 110 is inclined downwards in the first direction relative to a bottom surface of the box body 200, and the water inside the flow guide slot 1106 enters the crank arm slot 1105. An opposite direction indicated by an arrow in FIG. 29 is the first direction. By inclining the first frame body 110, the water flowing into the flow guide slot 1106 may automatically flow along the flow guide slot 1106 towards the crank arm slot 1105 under its own weight, which prevents water or droplets from entering the first opening 1102 as much as possible, and ensures the normal operation and power supply safety of the water softening device.

As shown in FIG. 29, an included angle α between the first direction shown in the present embodiment and the bottom surface of the box body 200 is 5° to 30°. For example, the angle α may be 5°, 10°, 20°, and 30°, and no specific limitations are provided herein.

In combination with FIG. 29 and FIG. 53, the first frame body 110 is further provided with a crank arm slot 1105, and the crank arm 164 of the second top cover component 130 is rotatably mounted on the first frame body 110. The crank arm slot 1105 is used to receive the crank arm 164 and provide avoidance for the rotation of the crank arm 164. When salt is added during product installation and use, salt particles are prone to fall into the crank arm slot 1105 and are difficult to remove, which may be prone to block the second top cover component 130 or corrode other components.

An embodiment of the present disclosure provides a box body, as shown in FIG. 34, FIG. 35, FIG. 49, FIG. 52 and FIG. 55. The first frame body 110 is provided with the second opening 1101 and the crank arm slot 1105, and the second opening 1101 communicates with the first accommodating chamber 101. A flow guide member 1120 is provided at a side of the first frame body 110 close to the box body 200 and a guide slot 1107 through which salt particles pass is formed between the flow guide member 1120 and the first frame body 110. The guide slot 1107 communicates with the crank arm slot 1105 and the first accommodating chamber 101. The crank arm slot 1105 is used to receive the crank arm 164 of the second top cover component 130, the crank arm 164 may be rotatably mounted on the first frame body 110, and the second opening 1101 is the salt adding opening.

By providing the flow guide member 1120 on the first frame body 110, the guide slot 1107 is formed, and the guide slot 1107 communicates with the crank arm slot 1105 and the first accommodating chamber 101. The salt particles that fall into the crank arm slot 1105 during salt adding operation may slide into the first accommodating chamber 101 along the guide slot 1107. The accumulation of salt particles in the crank arm slot 1105 is avoided, the crank arm 164 is not stuck, and the corrosion of salt particles on the components installed in the crank arm slot 1105 is avoided.

In some embodiments, a slot opening of the guide slot 1107 away from the crank arm slot 1105 faces a side where the second opening 1101 is located, which allows salt particles to slide down the guide slot 1107 into the salt pile below the second opening 1101.

Figure 50:
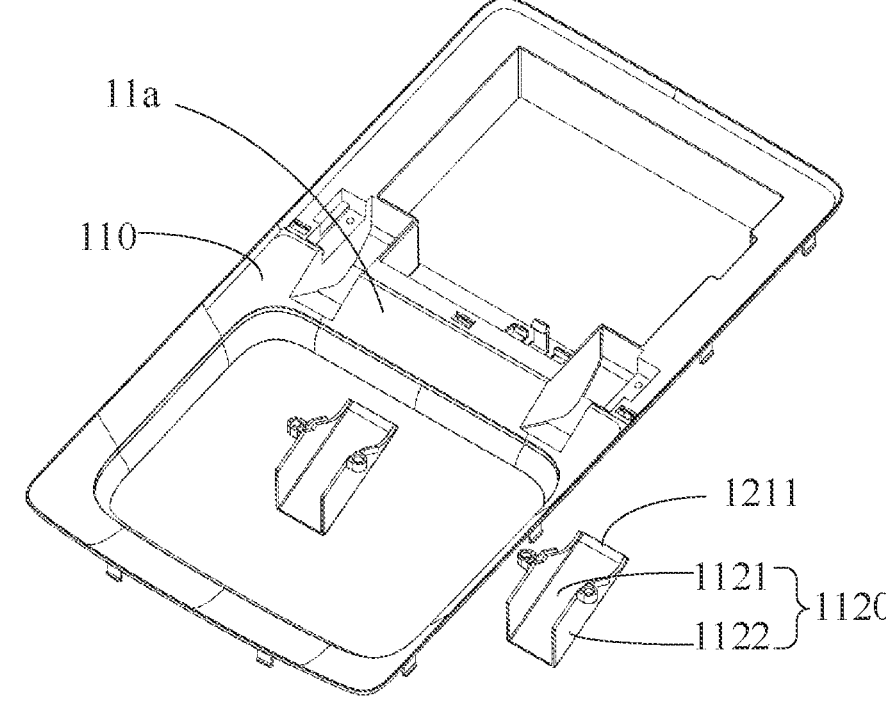
FIG. 50 is an explosion schematic diagram of a flow guide member and a middle frame shown in FIG. 49.
Figure 52:
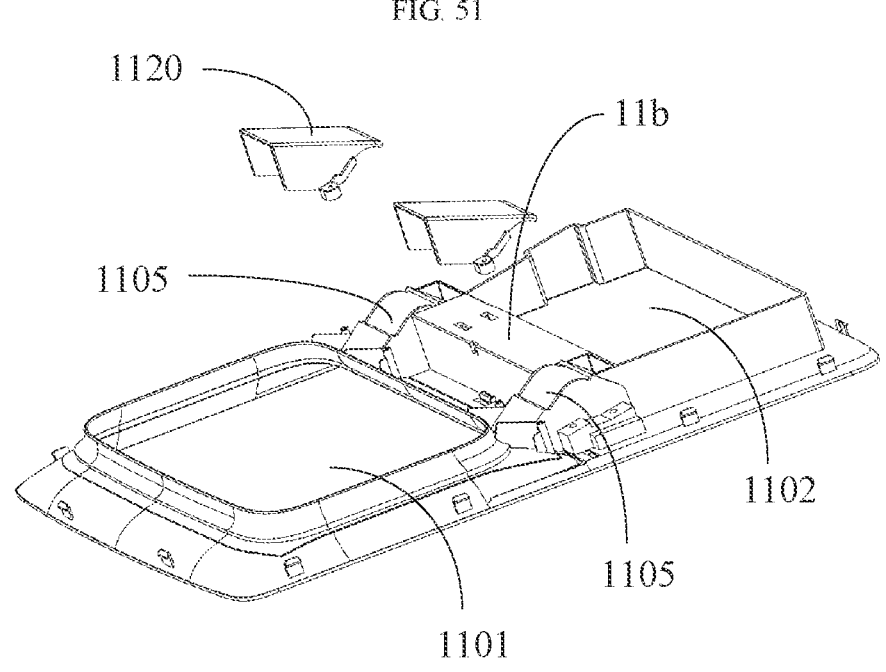
FIG. 52 is an explosion schematic diagram of a flow guide member and a middle frame shown in FIG. 51.

As shown in FIG. 50 to FIG. 52, the flow guide member 1120 includes a guide plate 1121 and two side plates 1122, the two side plates 1122 are connected to both sides of a flow guide direction of the guide plate 1121, and the two side plates 1122 are connected to the second side 11b of the first frame body 110 to form the guide slot 1107. The guide surface of the guide plate 1121 faces towards the crank arm slot 1105. In some embodiments, the side plate 1122 may be welded to the first frame body 110 or connected to the first frame body 110 through a bolt. The present embodiment simplifies the manufacturing process of the first frame body 110 by combining the separate first frame body 110 and the flow guide member 1120 to form the guide slot 1107.

Figure 55:
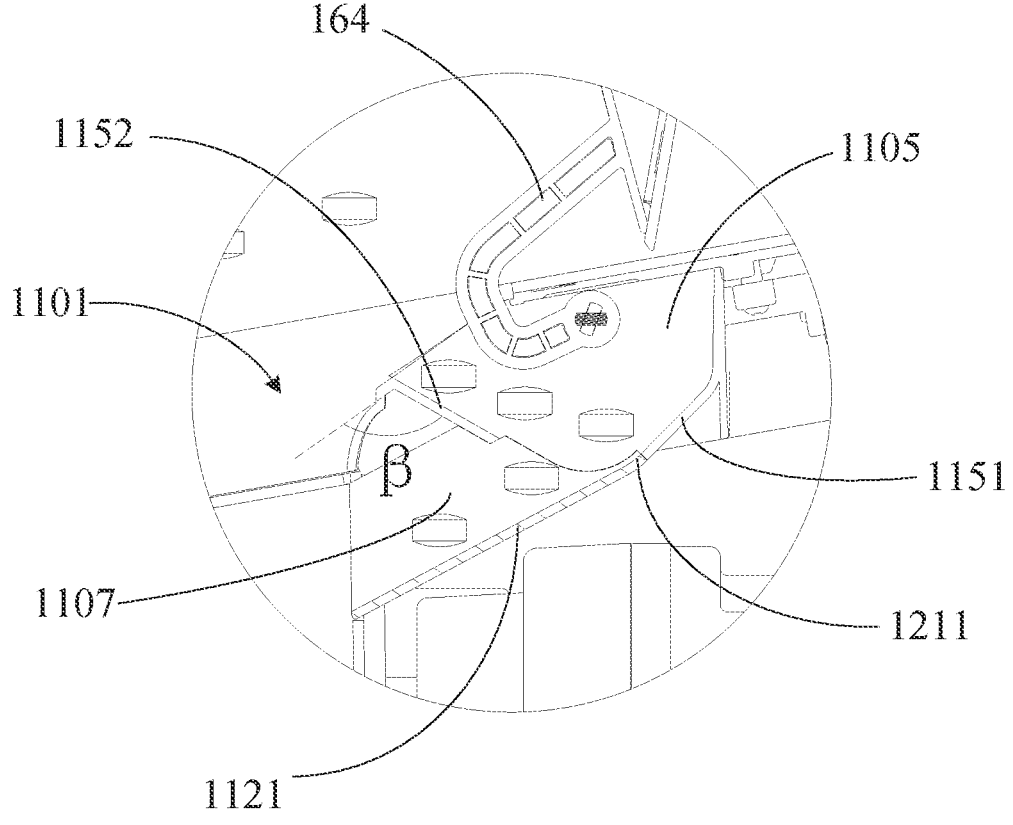
FIG. 55 is a partially enlarged diagram of part C in FIG. 34.

As shown in FIG. 55, a first slot wall 1151 away from the second opening 1101 is provided at the crank arm slot 1105, and an end of the first slot wall 1151 towards the inner side of the box body 200 is inclined and extends towards a direction close to the second opening 1101. An end of the guide plate 1121 close to the crank arm slot 1105 abuts with an end of the first slot wall 1151 towards the inner side of the box body 200, to connect the first slot wall 1151 with the guide plate 1121 to form a relatively smooth guide wall, and the salt particles may be smoothly guided.

In some embodiments, an arc-shaped segment 1211 is provided at an end of the guide plate 1121 close to the crank arm slot 1105. The guide plate 1121 is curved towards the guide surface of the guide plate 1211, and an end of the curved section 1211 abuts with an end of the first slot wall 1151 towards the inner side of the box body 200, and a position where the first slot wall 1151 is connected to the guide plate 1121 has an arc-shaped chamfer, the smoothness of the transition between the first slot wall 1151 and the guide plate 1121 is improved, and salt particles are smoothly guided.

Referring to FIG. 55, the crank arm slot 1105 is provided with a second slot wall 1152 close to the second opening 1101, and the second slot wall 1152 extends obliquely towards the inner side of the box body 200 in a direction away from the second opening 1101. In such way, the second slot wall 1152 is angled relative to the first side 11a of the first frame body 110, and a reinforced structure is formed at an opening side of the crank arm slot 1105, which improves the structural strength of the first frame body 110 at the crank arm slot 1105. For example, the second slot wall 1152 is connected to the circular concave surface 1103 in the above embodiment and connected to the circular concave surface 1103 on the first side 11a, and an included angle β between the second slot wall 1152 and the circular concave surface 1103 on the first side 11a is 90° to 130°.

A gap through which salt particles pass is formed between the second slot wall 1152 and the crank arm 164 of the second top cover component 130. The second slot wall 1152 may be the flow guide member to guide the salt particles falling into the gap inside the crank arm slot 1105, and then guided out by the guide slot 1107. In some embodiments, an end of the second slot wall 1152 close to the first frame body 110 of the box body 200 is opposite to the guide plate 1121.

In the embodiments of the present disclosure, there are crank arm slots 1105, and the number of flow guide members 1120 may be either one or more. When one flow guide member 1120 is provided, the guide plate 1121 spans crank arm slots 1105, to form the guide slot 1107, the guide slot 1107 communicates with crank arm slots 1105 simultaneously. When flow guide members 1120 are provided, crank arm slots 1105 and flow guide members 1120 are provided in a one-to-one correspondence manner, and the guide slot 1107 communicating with crank arm slots 1105 in a one-to-one correspondence manner is formed, which ensures that the first frame body 110 has a certain structural strength.

When the first side 11a of the first frame body 110 is provided with the flow guide slot 1106 as described in the above embodiment, the flow guide slot 1106 communicates with the crank arm slot 1105, and the water flowing from the flow guide slot 1106 to the crank arm slot 1105 may be discharged through the guide slot 1107 to avoid accumulation in the crank arm slot 1105. In some embodiments, the first frame body 110 is provided with the first opening 1102 communicating with the second accommodating chamber 102. The positional relationship between the flow guide slot 1106 and the first opening 1102 may be seen in the relevant embodiments mentioned above, and will not be repeated here.

In some embodiments, the first accommodating chamber 101 is formed between the inner frame body 310 and the box body 200, the second accommodating chamber 102 is formed between the inner frame body 310 and the first frame body 110, and the guide slot 1107 is separated from the second accommodating chamber 102.

The second accommodating chamber 102 is used for receiving the control assembly 600 of the water softening device. In the present embodiment, both water and salt particles entering the crank arm slot 1105 may be guided into the first accommodating chamber 101, and avoid entering the second accommodating chamber 102, and corrosion of the control assembly 600 inside the second accommodating chamber 102 caused by salt particles is avoided.

The second opening 1101 serves as the salt adding opening of the water softening device, and the second top cover component 130 is used to close or open the second opening 1101. The first end of the crank arm 164 is connected to an end of the second top cover component 130, and the second end of the crank arm 164 is rotatably connected to the first frame body 110 to cause the second top cover component 130 to flip between a first position at which the second opening 1101 is closed and a second position at which the second opening 1101 is opened. When the second top cover component 130 is in the first position, the crank arm 164 is received in the crank arm slot 1105.

An arc-shaped surface is provided at a peripheral side of the inner surface of the second top cover component 130, the arc-shaped surface is matched to the circular concave surface 1103 on the first frame body 110 to limit the second top cover component 130 and prevent the second top cover component 130 from shaking.

Figure 56:
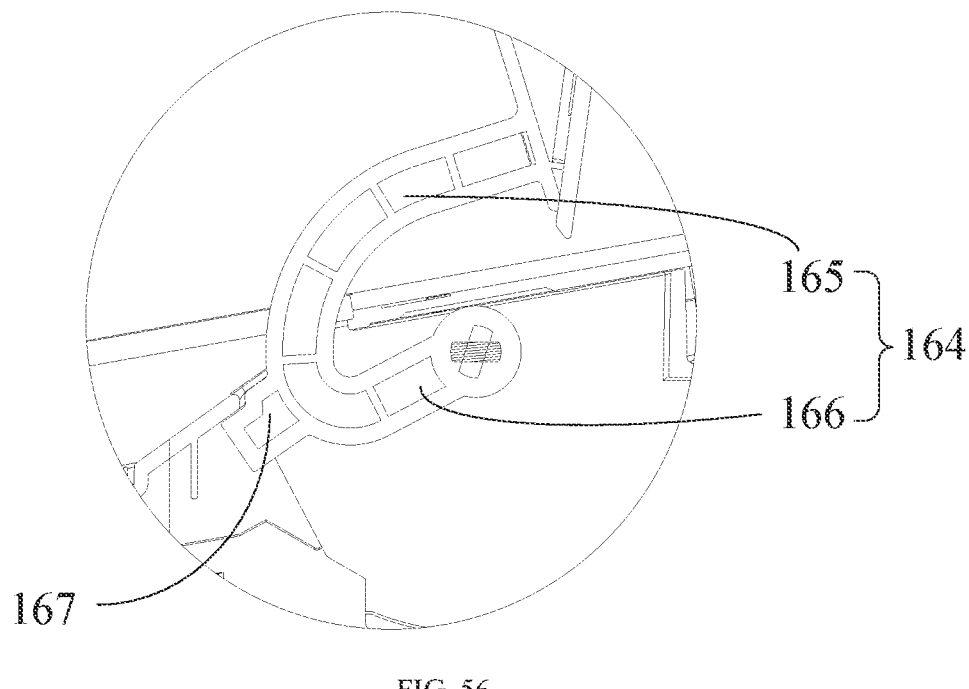
FIG. 56 is a partially enlarged diagram of part A in FIG. 29.

As shown in FIG. 29 and FIG. 56, the optimized design of the crank arm 164 may not only obtain a relatively large flip angle of the second top cover component 130 relative to the first frame body 110, but also make the second top cover component 130 as far away from the second opening 1101 as possible when reaching the maximum flip angle, and the convenience of salt adding operation is improved.

As shown in FIG. 56, the first frame body 110 is provided with an abut portion, and the crank arm 164 is provided with the stop portion 167. As the second top cover component 130 is in the open position, the second top cover component 130 is inclined relative to a vertical plane. Based on the abutting between the stop portion 167 and the abut portion, the second top cover component 130 may achieve a balance state. Without manual support from an operator, the second top cover component 130 may be stably maintained in the second position, and the state will not change again. Only when the second opening 1101 needs to be closed and driven by the operator, the second top cover component 130 is flipped from the second position to the closed position.

To control the flip angle of the second top cover component 130 relative to the first frame body 110, the stop portion 167 shown in the present embodiment is provided outside the crank arm 164. The abut portion is provided on the slot wall of the crank arm slot 1105, and is opposite to the outer side of the crank arm 164. Therefore, when the second top cover component 130 is in the first position, the crank arm 164 is received in the crank arm slot 1105, and the stop portion 167 is away from the abut portion. During the process that the second top cover component 130 is flipped relative to the first frame body 110 in a first rotation direction to reach the second position from the first position, the stop portion 167 gradually approaches the abut portion with the deflection of the crank arm 164. When the stop portion 167 abuts against the abut portion, the second top cover component 130 reaches the second position, and the second top cover component 130 is unable to continue flipping in the first rotation direction.

A salt well 500 is provided inside the box body 200, and the salt valve is provided inside the salt well 500. The salt valve is used to pump the salt water inside the salt box into the resin tank 401. The salt well 500 of the traditional water softening device is usually fixed to the side wall of the box body 200 by an expansion screw. It is difficult to mount and remove the expansion screw; and a head of the expansion screw will be exposed outside the water softening device, which affects the appearance thereof. When the box body 200 is deformed, the salt well 500 will be inclined, which affects the sealing performance of the salt valve and causes the salt valve to fail. The uneven thickness of the blow-molded box body 200 may easily make it difficult to align an expansion screw hole on the box body 200 to the salt well 500, and difficult to mount.

In this regard, an embodiment of the present disclosure also provides a salt well mounting component 501. As shown in FIG. 44 to FIG. 48, the salt well mounting component 501 includes a clamp 510 and a connecting arm 520, the connecting arm 520 is connected to a side of the clamp 510, and an axial direction of the clamp 510 is parallel to a length direction of the connecting arm 520. The connecting arm 520 is used to connect the first frame body 110 of the water softening device. The clamp 510 is used to hold outside the salt well 500 and connect the connecting arm 520. The salt well mounting component 501 is used to limit the salt well 500 to a vertical state.

As shown in FIG. 29, FIG. 30, FIG. 32 and FIG. 33, during using, an end of the connecting arm 520 away from the clamp 510 is connected to the first frame body 110, and the connecting arm 520 is provided vertically to keep the salt well 500 in the vertical state. The deformation of the box body 200 will not affect the first box 110. Even if the box body 200 is deformed, the salt well 500 may always be in the vertical state, which ensures the sealing performance of the salt valve inside the salt well 500 and prevents the failure of the salt valve due to the deformation of the box body 200.

In an embodiment, the salt well 500 may be tightly held by the clamp 510 to fixedly connect the salt well 500 to the first frame body 110. For example, the clamp 510 includes a first steel strip and a second steel strip that are connected to each other, and the first steel strip and the second steel strip are connected by a lock buckle to hold the salt well 500 tightly. The lock buckle is provided with an adjustment mechanism, and the adjustment mechanism is used to tighten the first steel strip and the second steel strip and may adapt to different specifications of the salt well 500. This may prevent the salt well 500 from moving upwards under the buoyancy of water when water is in the first accommodating chamber 101.

In another embodiment, the salt well mounting component 501 further includes a limit member 530) provided on the connecting arm 520. The clamp 510 is used to hold outside the salt well 500, and the limit member 530 may limit the movement of the salt well 500 towards an end of the connecting arm 520. The limit member 530 is protruded on the side of the connecting arm 520, and at least a part of the projection of the limit member 530 towards the clamp 510 in the length direction of the connecting arm 520 is located on an inner side of the clamp 510.

During using, the limit member 530 is located above the salt well 500 and abuts against an upper end of the salt well 500 to prevent salt well 500 from moving upwards. The salt well mounting component 501 according to an embodiment of the present disclosure utilizes the limit member 530 provided on the connecting arm 520 to limit the upward movement of the salt well 500, ensuring the sealing of the salt valve. In the present embodiment, by providing a limit member 530, the clamp 510 may not need to hold the salt well 500 tightly, and the clamp 510 may be in clearance fit with the salt well 500.

The limit member 530 may be integrally formed with the connecting arm 520, and may also be fixedly or detachably connected to the connecting arm 520. The clamp 510, the connecting arm 520) and the limit member 530 may be integrally formed. In some embodiments of the present disclosure, the limit member 530 has adjustable position in the length direction of the connecting arm 520, and the salt well mounting component 501 is suitable for salt wells 500 with different heights.

Figure 46:
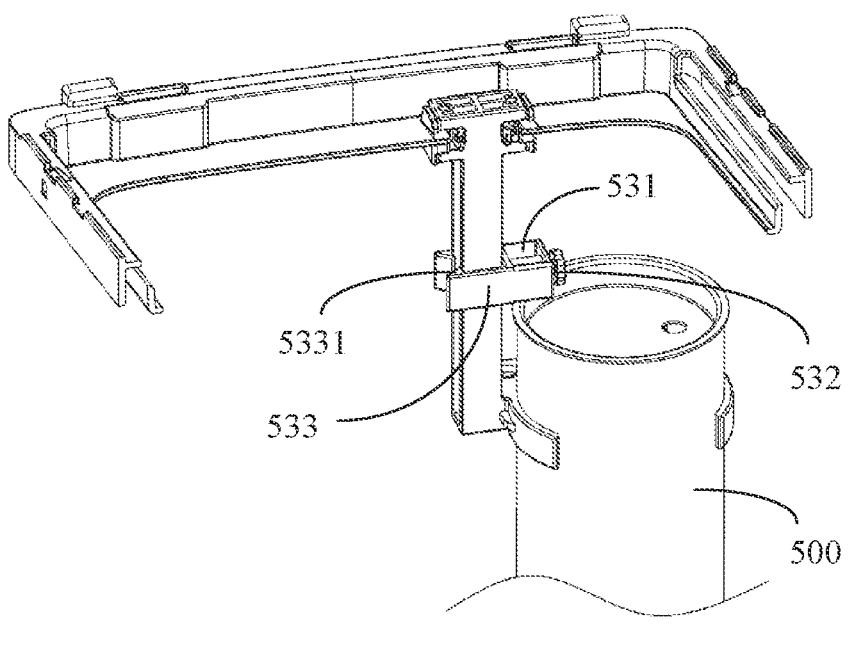
FIG. 46 is a schematic diagram of an assembly relationship between a salt well mounting component, a middle frame assembly 1, and a salt well according to an embodiment of the present disclosure.
Figure 47:
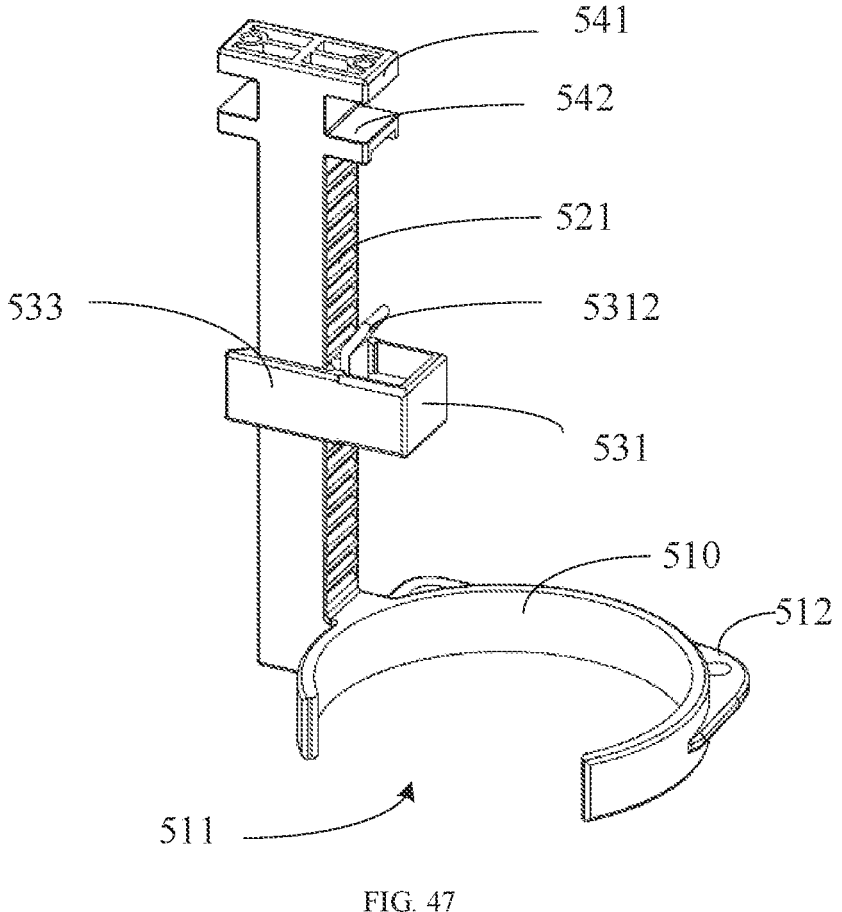
FIG. 47 is a schematic structural diagram of a salt well mounting component according to an embodiment of the present disclosure.

For example, as shown in FIG. 46 and FIG. 47, the limit member 530) includes a limit block 531 and a bolt 532. The limit block 531 is movable along the length direction of the connecting arm 520. The bolt 532 is threaded to the limit block 531 and abuts against the connecting arm 520. The limit block 531 is used to abut against the salt well 500. The limit block 531 is fastened to the connecting arm 520 through the bolt 532. When it is needed to adjust the position of the limit member 530, the bolt 532 is disassembled, then the limit block 531 is moved along the length direction of the connecting arm 520 to a designated position, and then the bolt 532 is fixed.

For another example, the limit member 530) includes the limit block 531, the limit block 531 is provided with a limit tooth 5311, and the connecting arm 520 is provided with a reverse rack 521. The limit tooth 5311 is matched with the reverse rack 521, and the reverse rack 521 is used to limit the movement of the limit tooth 5311 in a direction away from or close to the clamp 510.

The reverse rack 521 includes oblique teeth inclined towards a direction of the clamp 510, and the limit tooth 5311 is located between adjacent oblique teeth. The limit tooth 5311 has a certain elastic deformation capability, which may move towards the direction of clamp 510 under a certain external force, but is unable to move away from the clamp 510, to adjust the position of the limit block 531 in a single direction.

In some embodiments, the limit tooth 5311 is fixedly connected with a paddle 5312. When the limit block 531 is adjusted, the limit tooth 5311 may be separated from the reverse rack 521 by moving the paddle 5312 to relieve the restriction of the reverse rack 521 on the limit tooth 5311. This may reduce the force required to move the limit block 531. the limit block 531 Adjust to the designated position and release the paddle 5312, and the limit tooth 5311 is stuck between two reverse racks 521 and the positioning is completed.

Similarly, when oblique teeth are inclined in the direction away from the clamp 510, the limit tooth 5311 may move away from the clamp 510 under a certain external force, but is unable to move closer to the clamp 510. The adjustment will not be repeated here.

On the basis of the above embodiments, a side of the limit block 531 is provided with two opposite clamping claws 533, and the connecting arm 520 is sandwiched between the two clamping claws 533. An end of the clamping claw 533 away from the limit block 531 is provided with a limit claw 5331, and the connecting arm 520 is limited between limit claw 5331 and the limit block 531. The limit block 531 may be integrally formed with the clamping claw 533. When the limit member 530 is mounted, the connecting arm 520 may be directly snapped between the two clamping claws 533, and then fixed with the bolt 532 for convenient installation.

In the embodiment where the limit block 531 is fastened to the connecting arm 520 through the bolt 532, the bolt 532 is threaded onto a side of the limit block 531 away from the clamping claw 533 and abuts against the connecting arm 520. The limit block 531 may also be flexibly sleeved on the connecting arm 520, and the clamping claw 533 is no longer needed.

Figure 48:
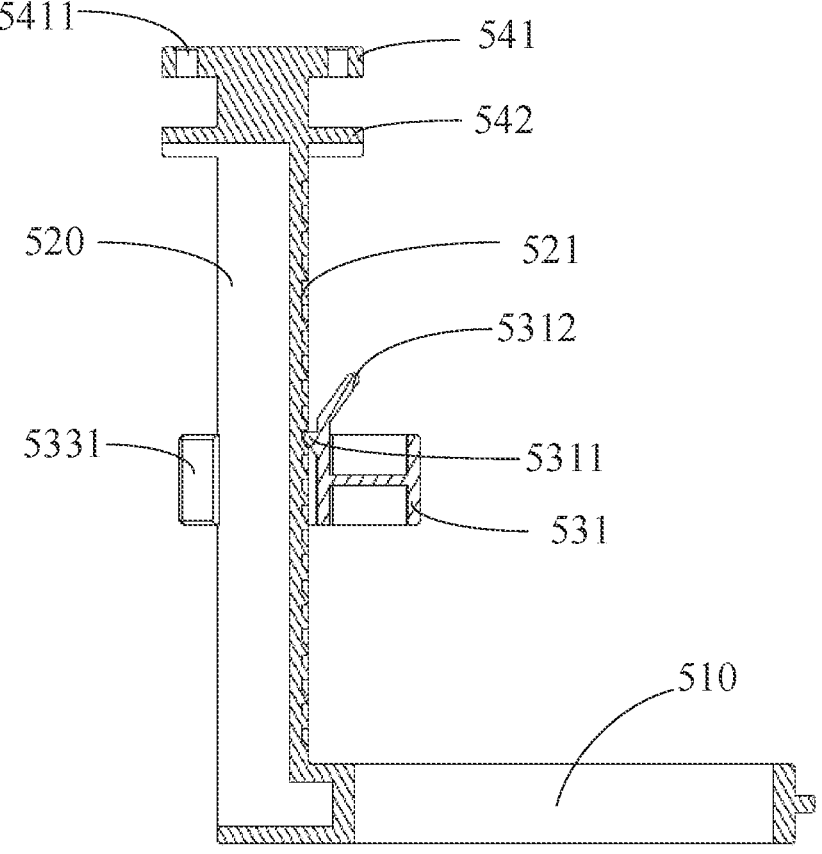
FIG. 48 is a cross-sectional diagram of a salt well mounting component in FIG. 47.

As shown in FIG. 47 and FIG. 48, at least one side of the connecting arm 520 away from an end of the clamp 510 is provided with a mounting structure 540, the mounting structure 540) includes a mounting portion 541 and a limit portion 542 protruding from the connecting arm 520, and the mounting portion 541 and limit portion 542 are provided along the length direction of the connecting arm 520 at intervals. The mounting portion 541 and the limit portion 542 are used to vertically limit the connecting arm 520 relative to the first frame body 110, as described in the following embodiments. The mounting structure 540 may be integrally formed with the connecting arm 520.

In some embodiments, the mounting portion 541 is provided with a first mounting hole 5411, the first mounting hole 5411 is used for connecting the connecting arm 520 to the first frame body 110 through fasteners penetrating through the first mounting hole 5411.

To conveniently connect and mount the salt well 500 and the clamp 510, in some embodiments of the present disclosure, a side of the clamp 510 is provided with a snap opening 511, the snap opening 511 is used for allowing the salt well 500 to pass through to hold outside the clamp 510. The snap opening 511 forms a snap opening of the clamp 510, and when the salt well 500 is mounted, the salt well 500 may be snapped into the inner side of the clamp 510 through deforming the clamp 510 to a certain extent.

The size of the snap opening 511 is determined by the shape deformation of the clamp 510 and the diameter of the salt well 500, as long as it may ensure that the salt well 500 may be snapped into the clamp 510. For example, a width of snap opening 511 is not less than half of a diameter of the salt well 500. In some embodiments, the clamp 510 is made of a plastic material to ensure a certain degree of elasticity and toughness, and the clamp 510 is integrally formed with the connecting arm 520.

In some embodiments, a reinforcing rib 512 is provided at a side of the clamp 510 away from the snap opening 511. The reinforcing rib 512 may improve the toughness of the clamp 510, reduce the possibility of irreversible deformation caused by disassembly and assembly of the clamp 510 with the salt well 500, maintain the external structure of the clamp 510, and prolong the service life of the clamp 510.

In some embodiments, a side of the reinforcing rib 512 away from the bayonet 511 is provided as a straight edge, which is spaced apart from the inner wall of the box body 200 in use. The straight edge structure of the reinforcing rib 512 may make the clamp 510 as close as possible to the inner wall of the box body 200, which reduces the installation space occupied by the salt well mounting component 501. The connecting arm 520 is connected to the clamp 510 on any side between the reinforcing rib 512 and the snap opening 511.

The connecting arm 520 may be assembled and connected to the first frame body 110. In one embodiment, the connecting arm 520 may be assembled and connected to the inner frame body 310.

In the embodiments of the present disclosure, the side wall of the first frame body 110 is protruded with a mounting plate 1133 extending towards an inner side of the first frame body 110, and at least a side of the connecting arm 520 away from the clamp 510 is provided with the mounting structure 540. The first frame body 110 is provided with the salt adding opening communicating with the box body 200. For example, the mounting plate 1133 is a plate-like structure extending from a side wall of the first frame body 110 towards the direction of the salt adding opening. The connecting arm 520 is mounted on the mounting plate 1133 through the mounting structure 540.

As shown in FIG. 48, the mounting structure 540 includes a mounting portion 541 and a limit portion 542 provided protrudedly on the connecting arm 520. The mounting portion 541 and the limit portion 542 are provided along the length direction of the connecting arm 520) at intervals, and the mounting plate 1133 is limited between the mounting portion 541 and the limit portion 542.

The mounting structure 540) and the connecting arm 520 form a U-shaped structure with an opening towards a side of the connecting arm 520. The mounting plate 1133 is limited to the opening of the U-shaped structure, and the connecting arm 520 is hung on the mounting plate 1133. In the present embodiment, the salt well mounting component 501 is conveniently mounted and positioned in the vertical direction by sandwiching the mounting plate 1133 between the mounting portion 541 and the limit portion 542. The upper and lower limiting modes may to some extent limit the left and right shaking of the connecting arm 520.

On a basis of vertically limiting the connecting arm 520 through the mounting structure 540, it is also necessary to horizontally limit the connecting arm 520. In some embodiments of the present disclosure, the mounting portion 541 is provided with the first mounting hole 5411, and the mounting plate 1133 is provided with a second mounting hole. The second mounting hole and the first mounting hole 5411 are correspondingly provided. The connecting arm 520 is connected to the mounting plate 1133 through a fastener 550 penetrating through the first mounting hole 5411 and the second mounting hole.

During installation, the mounting plate 1133 is inserted into the U-shape opening of the mounting structure 540), and the first mounting hole 5411 is aligned with the second mounting hole and the mounting plate 1133 and the mounting structure 540 are tightly connected through the fastener 550. The fastener 550 may be a bolt.

In some embodiments, the mounting portion 541 is located at a side of the limit portion 542 away from the clamp 510. The mounting portion 541 is located above the mounting plate 1133, and the limit portion 542 is located below the mounting plate 1133. In such way, it is convenient for manually fastening the fastener 550.

On a basis of vertically limiting the connecting arm 520 through the mounting structure 540), it is also possible to horizontally limit the connecting arm 520) through snap-fit. For example, the mounting plate 1133 is provided with a snap-fit structure, and the connecting arm 520) is connected to the mounting plate 1133 by a snap-fit through the snap-fit structure.

A second notch 1333 is provided on the mounting plate 1133, and the snap-fit structure includes two snap claws 1332 located on both sides of the second notch 1333. The connecting arm 520 is located within the second notch 1333 and is snapped between the two snap claws 1332. During installation, the connecting arm 520 may be snapped into the second notch 1333 by pressing the connecting arm 520, and the two snap claws 1332 limit the connecting arm 520 to the second notch 1333.

The mounting plate 1133 is provided with a snap-fit structure, and the mounting portion 541 is securely connected to the mounting plate 1133 through the fastener 550. The snap-fit structure may be used for initial positioning during installation, and then mounted with the fastener 550) to prevent the connection arm 520 from shaking due to the loosening of the snap claw 1332.

In a case that the mounting plate 1133 is provided with the second notch 1333, mounting structures 540 are provided on both sides of the connecting arm 520 opposite to each other, and the two mounting structures 540) are respectively connected to parts of the mounting plate 1133 located on both sides of the second notch 1333.

Figure 45:
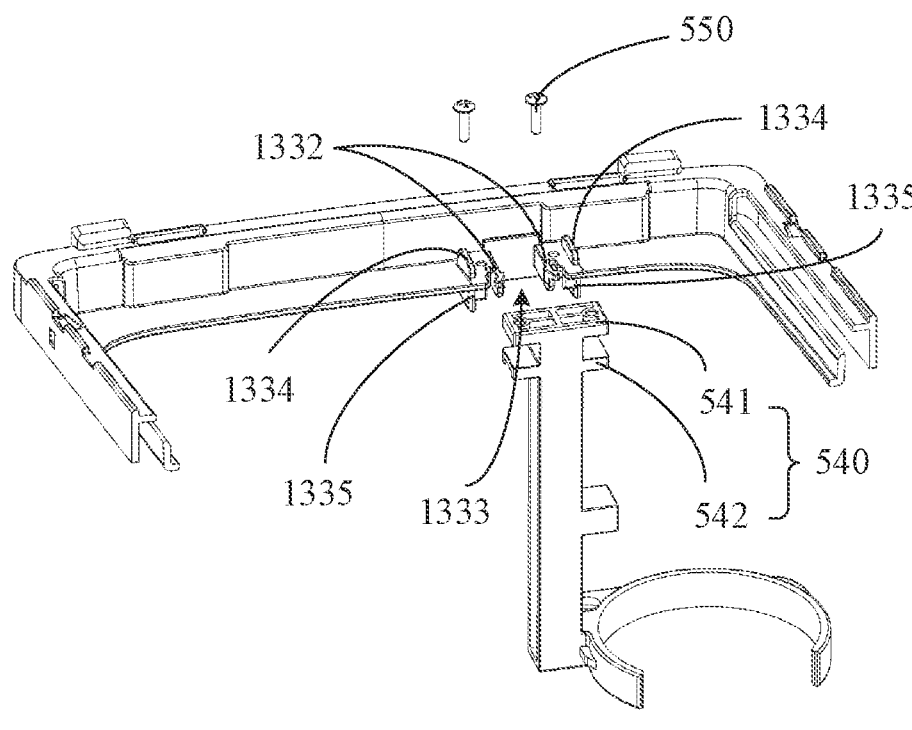
FIG. 45 is an explosion schematic diagram of a salt well mounting component and a middle frame assembly 1 in FIG. 44.

As shown in FIG. 45, FIG. 46 and FIG. 48, the two mounting structures 540 and the connecting arm 520) form an I-shaped structure. The mounting plates 1133 on both sides of the second notch 1333 are respectively limited between the mounting portion 541 and the limit portion 542 of the two mounting structures 540. This may increase the connection strength between the connecting arm 520 and the mounting plate 1133, and more effectively prevent the connecting arm 520 from shaking horizontally.

In some embodiments, first positioning blocks 1334 are provided at both sides of the second notch 1333 of the mounting plate 1133, and the mounting portion 541 is limited between the two first positioning blocks 1334. In one embodiment, second positioning blocks 1335 are provided at both sides of the second notch 1333 of the mounting plate 1133, and the limit portion 542 is limited between the two second positioning blocks 1335.

A distance between the two first positioning blocks 1334 is equal to a width of the mounting portion 541. A distance between the two second positioning blocks 1335 is equal to a width of the limit portion 542. The two first positioning blocks 1334 and/or the two second positioning blocks 1335 are conducive to rapidly align the first mounting hole 5411 with the second mounting hole, which improves assembly efficiency.

The present embodiment may further limit the mounting portion 541 to a specific position in the second direction through the snap claw 1332 and/or the fastener 550. The first direction and the second direction are perpendicular to each other. Without providing the fastener 550, the two first positioning blocks 1334 and/or the two second positioning blocks 1335 may prevent the connection arm 520 from shaking in the first direction caused by the loosening of the snap claw 1332.

Figure 44:
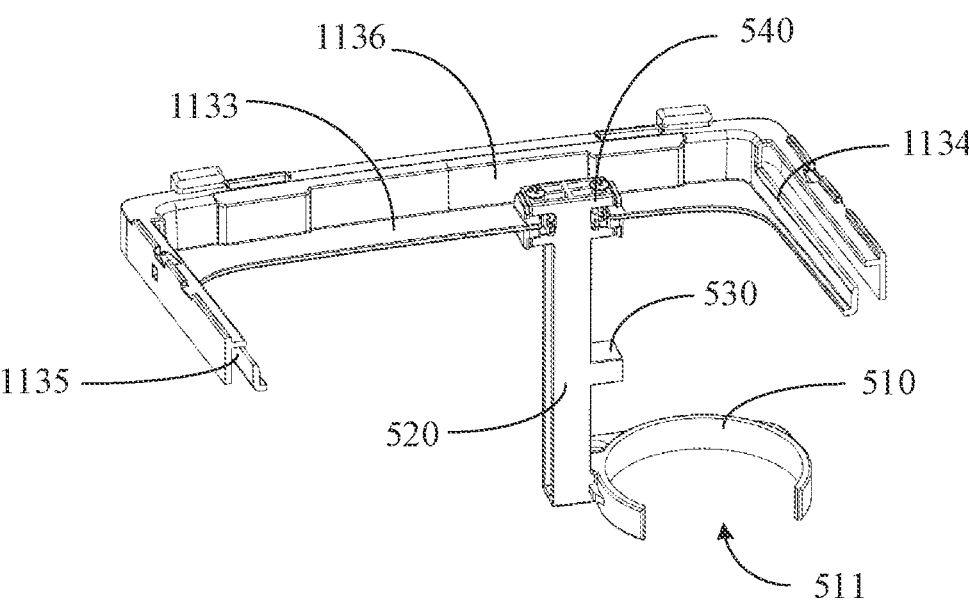
FIG. 44 is a schematic diagram of an assembly relationship between a salt well mounting component and a middle frame assembly 1 according to an embodiment of the present disclosure.

As shown in FIG. 44, in the embodiments of the present disclosure, the first frame body 110 includes a first sidewall 1134, a second sidewall 1135, and a third sidewall 1136. The first sidewall 1134 and the second sidewall 1135 are provided opposite to each other, and the third sidewall 1136 is connected to the first sidewall 1134 and the second sidewall 1135. The mounting plate 1133 is protrudedly provided on the third sidewall 1136 and connected to the first sidewall 1134 and the second sidewall 1135.

By connecting the mounting plate 1133 between the adjacent three sidewalls, a mutually supported structure is formed between the mounting plate 1133 and the three sidewalls. The mounting plate 1133 not only serves to mount the connecting arm 520, but also strengthens the structural strength of the first frame body 110. Under the support of the first sidewall 1134, the second sidewall 1135 and the third sidewall 1136, the structural stability of the mounting plate 1133 is higher, and not easy to deform under the gravity of the salt well mounting component 501. The mounting plate 1133 and the first sidewall 1134, the second sidewall 1135, and the third sidewall 1136 described in the above embodiment are provided in the middle frame.

What is claimed is:

1. A water softening device, comprising:
   a box body, wherein a first accommodating chamber is formed inside the box body, and a box opening communicating with the first accommodating chamber is formed at a top of the box body;
   an inner frame assembly, provided at the box opening of the box body;
   a top cover assembly, provided on an upper part of the inner frame assembly and connected to the inner frame assembly, wherein the top cover assembly comprises a first frame body provided with a first opening and a second opening;
   a regeneration assembly, provided inside the first accommodating chamber and detachably connected to the top cover assembly; and
   a water softening assembly, provided inside the first accommodating chamber and detachably connected to the inner frame assembly,
   wherein the regeneration assembly is connected to the first frame body through a salt well mounting component,
   wherein the salt well mounting component comprises:
   a clamp;

a connecting arm, connected to a side of the clamp, wherein an axial direction of the clamp is parallel to a length direction of the connecting arm, and the connecting arm is connected to the first frame body; and
   a limit member, provided on the connecting arm, wherein the clamp surrounds outside the regeneration assembly, and the limit member is used to limit a movement of the regeneration assembly towards an end of the connecting arm.

2. The water softening device of claim 1, wherein the top cover assembly further comprises:
   a first top cover component, wherein the first top cover component is connected to the first frame body through a flexible member, and is switchable between an open state and a closed state; and
   a second top cover component, wherein the second top cover component is connected to the first frame body and covers the second opening;
   wherein in the closed state, the first top cover component covers the first opening; and in the open state, the first top cover component is located above the second top cover component, and an included angle between the first top cover component and the second top cover component is less than a predetermined angle.

3. The water softening device of claim 2, wherein the flexible member is detachably connected to at least one of the first frame body and the first top cover component.

4. The water softening device of claim 2, wherein the top cover assembly further comprises:
   an ejector rod component, provided on the first frame body,
   wherein the ejector rod component is switchable between a stretched state and a retracted state, wherein in the retracted state, the first top cover component covers the first opening; and in the stretched state, the ejector rod component abuts against the first top cover component, and an opening gap exists between an opening side of the first top cover component and the first frame body.

5. The water softening device of claim 2, wherein the top cover assembly further comprises:
   a grille component, comprising an outer frame and a plurality of circular partitions,
   wherein the outer frame is provided at the second opening, the plurality of circular partitions are sequentially provided from inside to outside at intervals, the outer frame is annularly provided outside the plurality of circular partitions, and passages through which salt particles pass are formed between each adjacent two circular partitions, as well as between the outer frame and an outermost circular partition.

6. The water softening device of claim 5, wherein each of the passages is provided with a plurality of spokes, each adjacent two circular partitions are connected through the plurality of spokes and the outer frame is connected to an outermost circular partition through the plurality of spokes, and the plurality of spokes in each of the passages are uniformly spaced around a circumference of the circular partition.

7. The water softening device of claim 1, wherein an upper surface of the top cover assembly is inclined downwards in a first direction.

8. The water softening device of claim 2, wherein the second top cover component is connected to the first frame body through a crank arm component, and a flip angle of the second top cover component relative to the first frame body is greater than 90°.

9. The water softening device of claim 1, wherein the limit member has an adjustable position in a length direction of the connecting arm.

10. The water softening device of claim 1, wherein the limit member comprises a limit block and a bolt, the limit block is movable along the length direction of the connecting arm, and the bolt is connected to the limit block and abuts against the connecting arm.

11. The water softening device of claim 2, wherein the inner frame assembly comprises an inner frame body and a flexible fixing disc, wherein the inner frame body is detachably connected to the box opening of the box body and the top cover assembly, respectively; the inner frame body is provided with a third opening communicating with a receiving cavity, and the flexible fixing disc is provided at the third opening and detachably connected to the inner frame body; and the flexible fixing disc is sleeved on the water softening assembly.

12. The water softening device of claim 11, wherein the flexible fixing disc is provided with a central hole and a plurality of notches, wherein the water softening assembly comprises a resin tank, and an upper end of the resin tank is sleeved on the central hole, the plurality of notches are provided along a circumference of the central hole, and an opening end of the notch is formed on a wall of the central hole.

\* \* \* \* \*